(12) United States Patent
Akita et al.

(10) Patent No.: US 6,369,687 B1
(45) Date of Patent: Apr. 9, 2002

(54) IRON CORE ASSEMBLY AND METHOD FOR PRODUCING THE SAME

(75) Inventors: Hiroyuki Akita; Yuji Nakahara; Nobuaki Miyake; Ken-Ichi Azuma; Takashi Anamura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,249

(22) Filed: Jun. 29, 1999

(30) Foreign Application Priority Data

| Jun. 30, 1998 | (JP) | 10-184304 |
| Oct. 30, 1998 | (JP) | 10-309786 |
| Mar. 4, 1999 | (JP) | 11-056778 |

(51) Int. Cl.$^7$ ............................................. H01F 27/24
(52) U.S. Cl. ........................................ 336/234; 310/216
(58) Field of Search ............................... 310/216–218; 336/234, 233, 212

(56) References Cited

U.S. PATENT DOCUMENTS

| 4,048,605 A | * | 9/1977 | McCollum ................... 336/176 |
| 5,583,387 A | * | 12/1996 | Takeuchi et al. ............. 310/217 |
| 5,729,072 A | * | 3/1998 | Hirano et al. ................ 310/258 |
| 5,859,486 A | * | 1/1999 | Nakahara et al. ............ 310/254 |
| 5,986,377 A | * | 11/1999 | Yamada et al. .............. 310/216 |

FOREIGN PATENT DOCUMENTS

| JP | 54-007421 | 1/1979 |
| JP | 56-78358 | 6/1981 |
| JP | 62-95947 | 5/1987 |
| JP | 3-078447 | 4/1991 |
| JP | 7-194072 | 7/1995 |
| JP | 7-222383 | 8/1995 |
| JP | 8-19196 | 1/1996 |
| JP | 8-186958 | 7/1996 |
| JP | 8-075468 | 10/1996 |
| JP | 9-046979 | 2/1997 |
| JP | 9-117112 | 5/1997 |
| JP | 9-308143 | 11/1997 |
| JP | 10-155248 | 6/1998 |
| JP | 10-178750 | 6/1998 |
| JP | 10-201146 | 7/1998 |

* cited by examiner

Primary Examiner—Lincoln Donovan
Assistant Examiner—Tuyen Nguyen
(74) Attorney, Agent, or Firm—Burns, Doane, Swecker & Mathis, LLP

(57) ABSTRACT

The magnetic performance, rigidity and mechanical precision of an iron core assembly can be improved. A plurality of plate-shaped core segments are disposed in succession to form a plurality of first and second core members respectively. Edge portions of adjacent core segments of the first and second core members are coupled with each other. The first and second core members are alternately laminated one over another in such a manner that first inter-segment positions each defined between adjacent two first core segments of the first core member are offset from second inter-segment positions each defined between adjacent two second core segments of the second core member in a longitudinal direction of the first and second core members, with those edge portions of the respective first and second core segments which adjoin each other in a laminating direction in which the first and second core members are laminated being overlapped each other. The core segments of the first and second core members are rotated relative to each other through the coupling means so as to form an enclosed or ring-like configuration.

22 Claims, 35 Drawing Sheets

FIG. 19
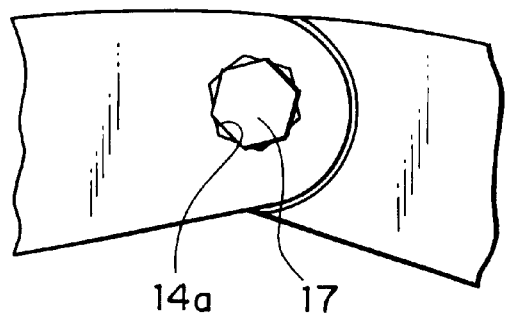
FIG. 20(A)  FIG. 20(B)
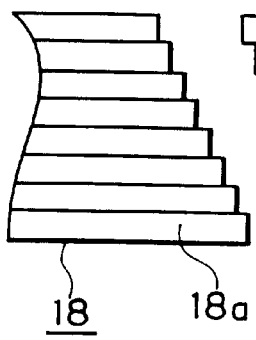 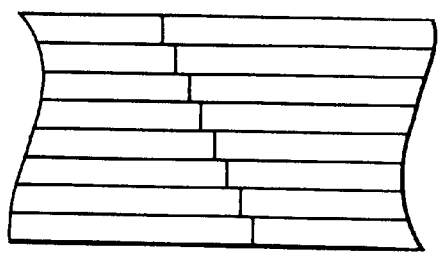
FIG. 21(A)  FIG. 21(B)
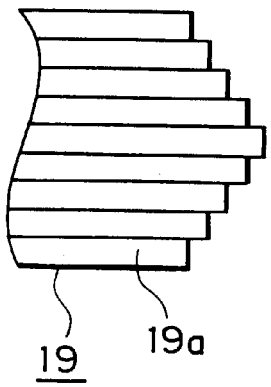 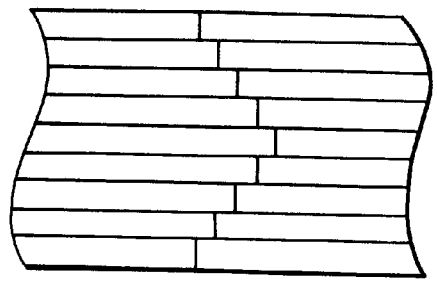

Prior Art

IRON CORE ASSEMBLY AND METHOD FOR PRODUCING THE SAME

BACKGROUND OF THE INVENTION

1. Field of the Invention

The present invention relates to an iron core assembly which generally forms a major or essential part of an electric motor, a transformer and the like, and it also relates to a method of producing such an iron core assembly.

2. Description of the Related Art

For example, an iron core assembly of the type mentioned above has been used in a conventional electric motor, as disclosed in Japanese unexamined patent publication (laid-open) No. 9-191588. As shown in FIGS. 58 and 59, such a kind of conventional iron core assembly comprises a predetermined number of core members 1 stacked or laminated one over another, each core member 1 being formed of a plurality of core segments 1a which are connected together by way of a plurality of thin portions 1b. In order to improve winding property or efficiency, the stacked core members 1 in their states as shown in FIG. 59 are wound with wires 2 by means of a winding machine (not shown), and the respective thin portions 1b thereof are then bent properly to form an annular or ring-shaped core assembly as shown in FIG. 58.

Since a conventional iron core assembly is constructed in the above-described manner, when a ring-shaped iron core assembly is formed, every two adjacent core segments 1a facing each other through a thin portion 1b, and end faces of each edge portion of core segments 1a located on opposite ends of each core member 1, will undesirably produce some rough surface portions and some working size errors during a press punching process. As a result, every two adjacent core segments 1a will have to be brought together with an undesirable clearance of several micrometers ($\mu$m) to ten-odd micrometers ($\mu$m) formed therebetween. Due to the existence of such kind of clearances, a magnetic resistance will undesirably be increased, resulting in a problem that the magnetic performance of the iron core assembly is deteriorated.

Further, since each of the core members 1 forming an iron core assembly is usually provided on the surface thereof with a skin layer. Such a kind of skin layer is useful in hampering the passing of magnetic flux therethrough so as to inhibit a possible eddy current loss. For this reason, if there is no such kind of skin layer existing on the end faces of punched portions, an undesired eddy current will occur over the entire area of each end face of each core segment 1a in the laminating direction. Because of the occurrence of the eddy current, an undesired iron loss will happen, thus undesirably affecting a desired magnetic performance.

Moreover, on each of the above end faces, since a holding force intended to act against an external force in parallel with the end faces is relatively weak, the iron core assembly as a whole has only low rigidity. In particular, if an electric motor is a type in which a force caused by magnetism exerts on its iron core assembly, it will be difficult to ensure a required strength for the motor.

In addition, since each thin portion 1b is bent in a manner such that a circular configuration is formed as a whole, it is difficult to mechanically ensure high precision for an electric motor. Further, since bending treatment has to be performed for several times in order to form the desired circular configuration, some cracks will possibly occur in the thin portions 1b, resulting in some problems in which not only the mechanical strength is reduced, but also desired magnetic performance is deteriorated because the cracks will cause an increase in the magnetic resistance of a magnetic circuit.

SUMMARY OF THE INVENTION

In view of the above, the present invention is intended to obviate the above-discussed problems encountered with the conventional iron core assemblies, and has for its object to provide an improved iron core assembly of the character described and a method of manufacture thereof which are suitable for mass production and which are capable of inhibiting a possible increase in the magnetic resistance and a possible occurrence of an eddy current so as to obtain improved magnetic performance, thereby ensuring improved rigidity and increased mechanical precision for the iron core assembly.

Bearing the above object in mind, according to a first aspect of the present a plurality of layers (sometimes referred to herein as "core members") of plate-shaped core segments having end portions, said core segments disposed in planar succession in each of the plurality of layers; and couplers (sometimes referred to herein as "coupling means") coupling the end portions of the core segments of a first of the plurality of layers to the end portions of the adjacent core segments of a second of the plurality of layers; wherein said core segments of the first layer are laminated to the core segments of the second layer in such a manner that the end portions of the core segments of the first layer are offset from the end portions of adjacent core segments of the second layer which adjoin each other in a laminating direction that is perpendicular to the planar direction, and wherein said core segments are rotatable relative to each other through said couplers so as to form an enclosed or ring-like configuration.

With this arrangement, it is possible to provide an iron core assembly which is suitable for mas production and can be improved in its magnetic performance and mechanical strength.

In a preferred form of the first aspect of the invention, the coupling means couples together edge portions of those core segments which adjoin each other in the laminating direction of the first and second core members. Thus, it is possible to further improve the magnetic performance and mechanical strength of the iron core assembly.

In another preferred form of the first aspect of the invention, the coupling means comprises: first concave and convex portions respectively formed on a top surface and a back surface of each of the first core segments of the first core member at one end edge portion thereof; and second concave and convex portions respectively formed on a front surface and a bottom surface of each of the second core segments of the second core member at the other end edge portion thereof. The first concave and convex portions are engageable with the second concave and convex portions thereby to couple the edge portions of those core segments which adjoin each other in the laminating direction of the first and second core members.

With this arrangement, it is possible to improve not only the magnetic performance and mechanical strength, but also durability of the iron core assembly against bending operations upon assembling.

In a further preferred form of the first aspect of the invention, the first concave and convex portions are engageable with the second concave and convex portions through clearances. Accordingly, it becomes easy to rotate coupling portions of the iron core assembly.

In a yet further preferred form of the first aspect of the invention, the coupling means comprises: a first hole formed in one end edge portion of each first core segment of the first core member; a second hole in the other end edge portion of each second core segment of the second core member; and a pin member passing through the first and second holes in the laminated first and second core segments in the laminating direction of the first and second core members in such a manner as to allow relative rotation of the first and second core segments.

With this arrangement, it is possible not only to improve the magnetic performance and mechanical strength, but also further expedite rotation of the iron core assembly upon assemblage thereof, thus ensuring improved assembling precision.

In a still further preferred form of the first aspect of the invention, each first core segment of the first core member has one end face at least partially formed into a convex arc-shaped configuration and the other end face at least partially formed into a concave arc-shaped configuration, with the convex arc-shaped one end face of each first core segment being disposed in abutment with the other concave arc-shaped end face of a first core segment adjoining in a direction in which the first core segments are disposed in succession; each second core segment of the second core member has one end face at least partially formed into a concave arc-shaped configuration and the other end face at least partially formed into a convex arc-shaped configuration, with the concave arc-shaped one end face of each second core segment being disposed in abutment with the other convex arc-shaped end face of a second core segment adjoining in a direction in which the second core segments are disposed in succession; and a center of rotation of the coupling means which couples the edge portions of mutually adjacent core segments of the same core member with each other is disposed at a location which is substantially on a bisector for an angle formed by widthwise centerlines of mutually adjacent two core segments of the same core member and which is outwardly away from an intersection of the widthwise centerlines. With this arrangement, it is possible to expedite press-punching operation without deteriorating the magnetic performance of the iron core assembly.

In a further preferred form of the first aspect of the invention, a center of rotation of the coupling means which rotates each core segment is disposed at a location which is substantially on a bisector for an angle formed by widthwise centerlines of mutually adjacent two core segments of the same core member and which is outwardly away from an intersection of the widthwise centerlines. Thus, press-punching operation can be further improved without affecting the magnetic performance of the iron core assembly.

In a further preferred form of the first aspect of the invention, the coupling means couples adjacent edge portions of successively disposed adjacent core segments of the same first or second core member with each other. Accordingly, it is possible to further improve the magnetic performance and mechanical strength of the iron core assembly.

In a further preferred form of the first aspect of the invention, the coupling means comprises opposing end faces of mutually adjacent edge portions of successively disposed core segments of the first or second core members, the opposing end faces being formed into an articulated configuration. Thus, assembling precision can be further improved, in addition to enhancing the magnetic performance and mechanical strength.

In a further preferred form of the first aspect of the invention, the first core member and the second core member are laminated to form a laminated core unit which has opposite ends formed into complementary stepped configurations in which edge portions of mutually opposed core segments at the opposite ends of the laminated are superposed each other in a stepwise fashion in the laminating direction. Thus, it is possible to improve efficiency in assembling operation.

In a further preferred form of the first aspect of the invention, the first core member and the second core member are laminated to form a laminated core unit which is formed at opposite ends thereof with a concave portion and a convex portion which are formed on core segments mutually adjoining each other in the laminating direction and which are detachably engageable with each other. Accordingly, assembling efficiency can be further improved.

In a further preferred form of the first aspect of the invention, rotation restricting means is provided on opposing end faces of adjacent edge portions of successively disposed core segments of the first or second core member for restricting rotation of the coupling means when the laminated first and second core members are formed into the enclosed or ring-like configuration. Accordingly, it becomes possible to position the first or second core member in an easy manner, thus further improving the assembling efficiency.

In a further preferred form of the first aspect of the invention, reverse-rotation restricting means is provided on opposing end faces of adjacent edge portions of successively disposed core segments of the first or second core member for restricting reverse rotation of the coupling means. Accordingly, wire winding operation can be expedited, thereby improving assembling efficiency.

According to a second aspect of the present invention, there is provided an iron core assembly comprising: a first plurality of layers (sometimes referred to herein as "core members") of core segment blocks having end portions, said core segment blocks disposed in planar succession in each of the plurality of layers, said core segment blocks each having a plurality of plate-shaped core segments laminated one over another; couplers (sometimes referred to herein as "coupling means") for coupling the end portions of the core segment blocks of a first of the plurality of layers to the end portions of the core segment blocks of a second of the plurality of layers; wherein said core segment blocks of the first layer are laminated to the core segment blocks of the second layer in such a manner that the end portions of the core segment blocks of the first layer are offset from the end portions of adjacent core segment blocks of the second layer which adjoin each other in a laminating direction that is perpendicular to the planar direction, and wherein said core segment blocks are rotatable relative to each other through said couplers so as to form an enclosed or ring-like configuration.

With this arrangement, the magnetic performance and mechanical strength of the iron core assembly can be improved, and the number of component parts of the core assembly can be reduced, thus enhancing productivity. Beside, when the core segment blocks are to be rotated tooth by tooth, such rotation becomes easy due to reduced friction.

In a preferred form of the second aspect of the invention, the coupling means couples together edge portions of those core segment blocks which adjoin each other in the laminating direction of the first and second core members. Thus, the magnetic performance and mechanical strength can be further improved.

In another preferred form of the second aspect of the invention, the coupling means comprises: a first hole formed in one end edge portion of each first core segment block of the first core member; a second hole in the other end edge portion of each second core segment block of the second core member; and a pin member passing through the first and second holes in the laminated first and second core segment blocks in the laminating direction of the first and second core members in such a manner as to allow relative rotation of the first and second core segment blocks. Accordingly, beside the fact that the magnetic performance and mechanical strength can be improved, it becomes further easy to effect rotation of the core segment blocks, thereby enhancing assembling precision.

In a further preferred form of the second aspect of the invention, edge portions of successively disposed core segment blocks of the first or second core member have opposing end faces one of which is formed into a convex arc-shaped configuration, and the other of which is formed into a concave arc-shaped configuration, a convex arc-shaped end face of one of the mutually adjacent core segment blocks being disposed in abutment with a concave arc-shaped end face of the other of the mutually adjacent core segment blocks which is adjacent the one core segment block of the same core member. Thus, the magnetic performance can be further improved.

According to a third aspect of the present invention, there is provided an iron core assembly comprising: a first laminated core unit; and a second laminated core unit. The first laminated core unit comprises: a first core member having a plurality of plate-shaped first core segments disposed in succession; a second core member having a plurality of plate-shaped second core segments disposed in succession; and first coupling means for coupling edge portions of adjacent core segments of the first and second core members. The first and second core members are alternately laminated one over another in such a manner that first inter-segment positions each defined between adjacent two first core segments of the first core member are offset from second inter-segment positions each defined between adjacent two second core segments of the second core member in a longitudinal direction of the first and second core members, with those edge portions of the respective first and second core segments which adjoin each other in a laminating direction in which the first and second core members are laminated being overlapped each other. The second laminated core unit comprises: a third core member having a plurality of plate-shaped third core segments disposed in succession; a fourth core member having a plurality of plate-shaped fourth core segments disposed in succession; and second coupling means for coupling edge portions of adjacent core segments of the third and fourth core members. The third and fourth core members are alternately laminated one over another in such a manner that third inter-segment positions each defined between adjacent two third core segments of the third core member are offset from fourth inter-segment positions each defined between adjacent two fourth core segments of the fourth core member in a longitudinal direction of the third and fourth core members, with those edge portions of the respective third and fourth core segments which adjoin each other in a laminating direction in which the third and fourth core members are laminated being overlapped each other. The core segments of the first and second core units are rotated relative to each other through the first and second coupling means so as to form an enclosed or ring-like configuration.

With the above arrangement, the entire laminated core can be divided into a plurality of core units each having such a size as suitable for assembling operation, thus improving assembling efficiency.

According to a fourth second aspect of the present invention, there is provided an iron core assembly comprising: a first laminated core unit which comprises: a first core member having a plurality of plate-shaped first core segments disposed in succession; a second core member having a plurality of plate-shaped second core segments disposed in succession; and coupling means for coupling edge portions of adjacent core segments of the first and second core members. The first and second core members are alternately laminated one over another in such a manner that first inter-segment positions each defined between adjacent two first core segments of the first core member are offset from second inter-segment positions each defined between adjacent two second core segments of the second core member in a longitudinal direction of the first and second core members, with those edge portions of the respective first and second core segments which adjoin each other in a laminating direction in which the first and second core members are laminated being overlapped each other. A second laminated core unit has a plurality of plate-shaped core segments laminated one over another. The core segments of the first laminated core unit are rotated relative to each other through the coupling means thereby to combine the first and second core units so as to form an enclosed or ring-like configuration. Thus, just like the above, the entire laminated core can be divided into a plurality of core units each having a size suitable for assembling operation, and hence assembling efficiency can be improved.

According to a fifth aspect of the present invention, there is provided a method for producing an iron core assembly, the method comprising the steps of: disposing a plurality of plate-shaped first core segments in succession to form first core members; disposing a plurality of plate-shaped second core segments in succession to form second core members; alternately laminating first and second core members one over another in such a manner that first inter-segment positions each defined between adjacent two first core segments of each first core member are offset from second inter-segment positions each defined between adjacent two second core segments of each second core member in a longitudinal direction of the first and second core members, with those edge portions of the respective first and second core segments which adjoin each other in a laminating direction in which the first and second core members are laminated being overlapped each other; coupling edge portions of adjacent core segments of the first and second core members through coupling means; and rotating the core segments of the first and second core members relative to each other through the coupling means so as to form an enclosed or ring-like configuration. Thus, an improved iron core assembly can be obtained which has improved magnetic performance and mechanical strength.

According to a sixth aspect of the present invention, there is provided a method for producing an iron core assembly, the method comprising the steps of: laminating a plurality of plate-shaped first core segments one over another to form first core segment blocks; laminating a plurality of plate-shaped second core segments one over another to form second core segment blocks; successively disposing the first core segment blocks in a line to provide first core members; successively disposing the second core segment blocks in a line to provide second core members; alternately laminating first and second core members one over another in a direction in which the first and second core segments are laminated, in such a manner that first inter-block positions each defined between adjacent two first core segment blocks of each first core member are offset from second inter-block positions each defined between adjacent two second core segment blocks of each second core member in a longitudinal direction of the first and second core members, with those edge portions of the respective first and second core segments which adjoin each other in a direction in which the first and second core members are laminated being overlapped each other; coupling edge portions of respective adjacent core segment blocks of the first and second core members through coupling means; and rotating the core segment blocks of the first and second core members relative to each other through the coupling means so as to form an enclosed or ring-like configuration.

With this arrangement, as described above, the magnetic performance and mechanical strength of the iron core assembly can be improved, and the number of component parts of the core assembly can be reduced for improved productivity. Moreover, when the core segment blocks are to be rotated tooth by tooth, it becomes easy to effect such rotation due to reduced friction.

According to another aspect of the present invention, an iron core assembly includes a plurality of layers of independent plate-shaped core segments having end portions, said core segments disposed in planar succession in each of the plurality of layers; and couplers coupling the end portions of the core segments of a first of the plurality of layers to adjacent ones of the end portions of the core segments of the first layer; wherein said core segments of the first layer are laminated to the core segments of the second layer in such a manner that the end portions of the core segments of the first layer are offset in a planar direction from the end portions of adjacent core segments of the second layer which adjoin each other in a laminating direction that is perpendicular to the planar direction, and wherein said core segments of said first and second layers are rotatable relative to each other through said couplers so as to form an enclosed or ring-like configuration.

According to yet another aspect of the present invention, an iron core assembly includes a plurality of layers of independent plate-shaped core segments, each of the core segments having first and second end portions, said core segments disposed in planar succession in each of the plurality of layers; the core segments of a first of the plurality of layers are laminated to the core segments of a second of the plurality of layers in such a manner that the end portions of the core segments of the first layer are offset from the end portions of the core segments of the second layer in a longitudinal planar direction of said layers of core segments, and so that each of the first end portions of the core segments of the first layer overlaps a first end portion of one of the core segments of the second layer and each of the second end portion of the core segments of the first layer overlaps an end portion of another one of the core segments of the second layer; and couplers at the end portions of said core segments are rotatably engaged to each other through said end portions so as to form an enclosed or ring-like configuration.

The above and other objects, features and advantages of the present invention will more readily apparent from the following detailed description of preferred embodiments of the invention when taken in conjunction with the accompanying drawings.

BRIEF DESCRIPTION OF THE DRAWINGS

FIG. 19 is a view similar to FIG. 18, but illustrating a different operating state.

FIGS. 20(A) and 20(B) are cross sectional views showing the structure of an iron core assembly constructed according to a fourth embodiment of the present invention, wherein FIG. 20(A) illustrates that edge portions of core segments at opposite ends of a laminated core unit are opposing to each other, and FIG. 20(B) illustrates that edge portions of core segments at opposite ends of a laminated core unit are placed in abutting engagement with each other.

FIGS. 21(A) and 21(B) are views similar to FIGS. 20(A) and 20(B), respectively, but showing a modified structure of an iron core assembly constructed according to a fourth embodiment of the present invention.

DESCRIPTION OF THE PREFERRED EMBODIMENTS

In the following, several presently preferred embodiments of the present invention will be described while referring to the accompanying drawings.

Embodiment 1

Figure 1:
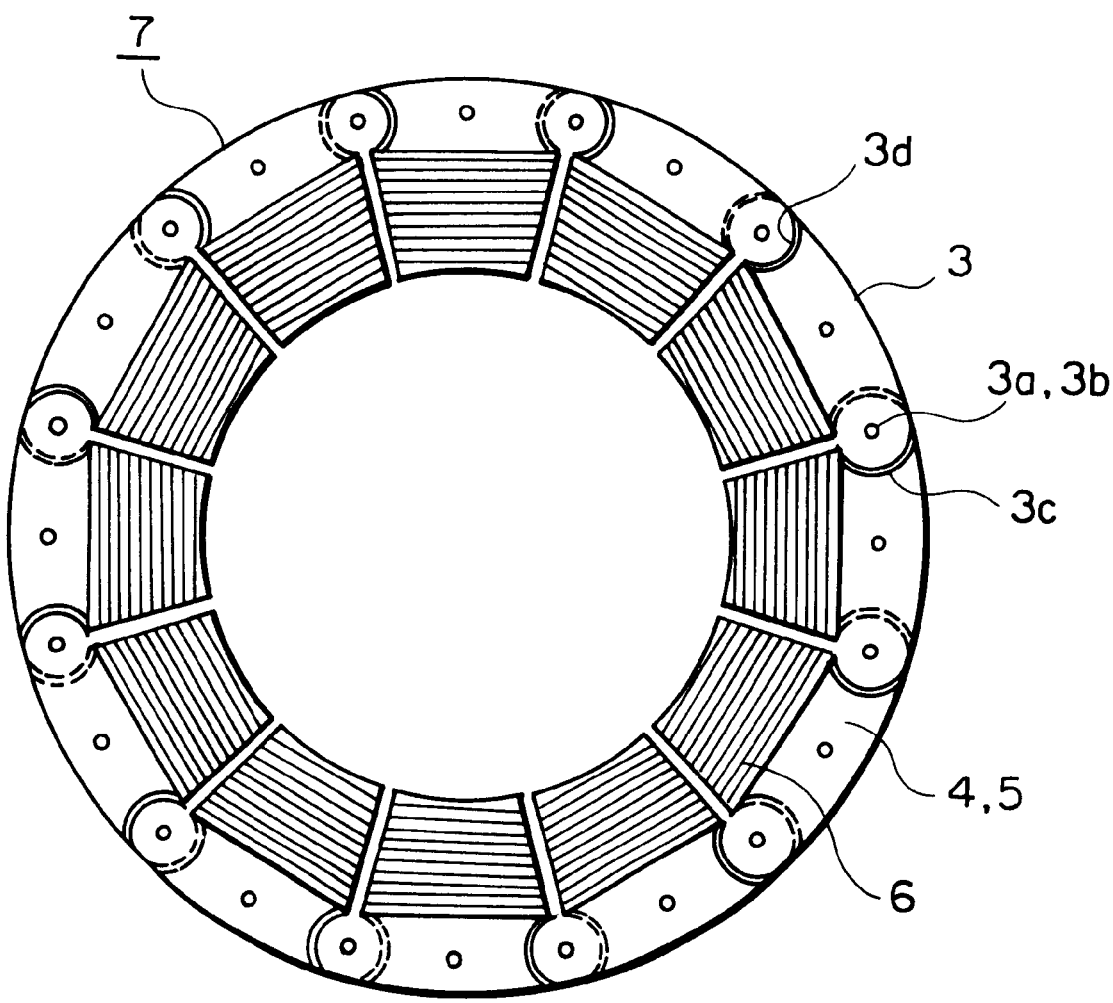
FIG. 1 is a plan view schematically illustrating the structure of an iron core assembly constructed according to a first embodiment of the present invention.
Figure 2:
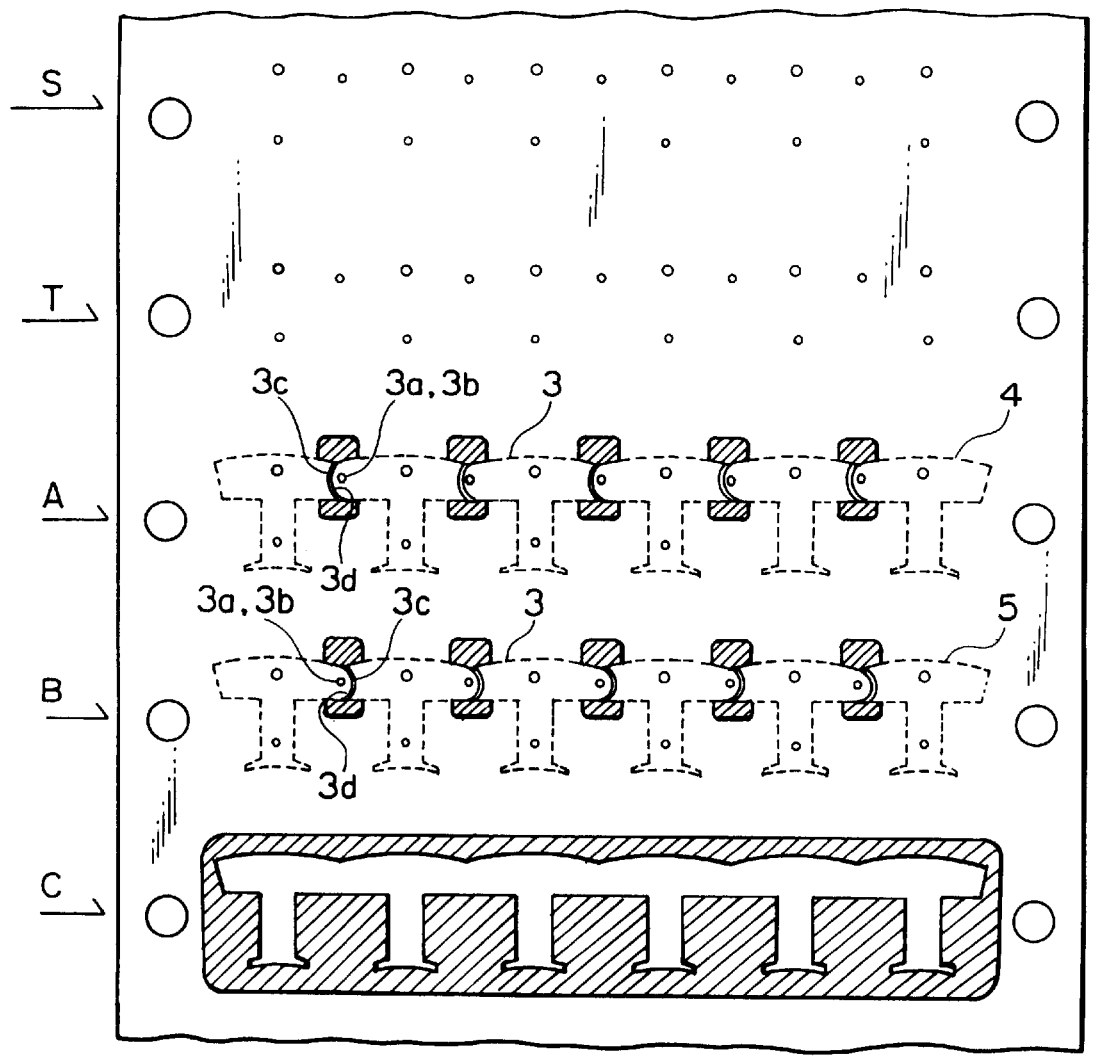
FIG. 2 is a plan view schematically illustrating a process for forming core members shown in FIG. 1, by means of press punching.
Figure 3:
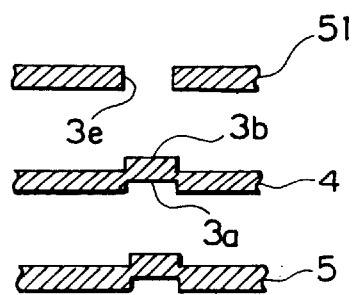
FIG. 3 is a cross sectional view schematically illustrating the structure of coupling portions of the core members obtained in the process shown in FIG. 2.
Figure 4:
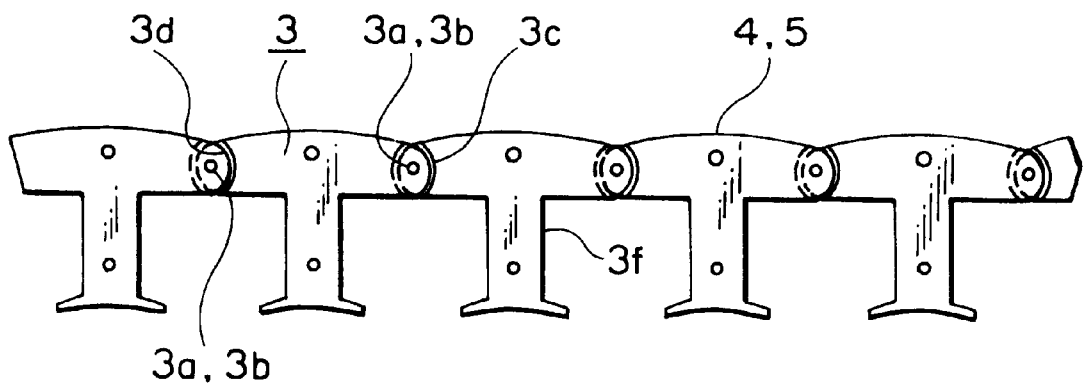
FIG. 4 is a plan view schematically illustrating a state in which the core members obtained in the process shown in FIG. 2 are laminated.
Figure 5:
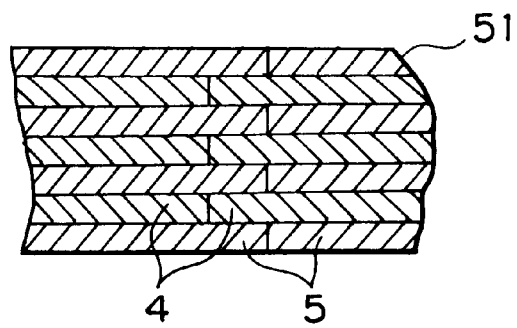
FIG. 5 is a cross sectional view schematically illustrating the structure of edge portions of the core segments laminated in a manner as shown in FIG. 2.

Referring to the drawings and first to FIG. 1, there is schematically illustrated the structure of an iron core assembly constructed according to a first embodiment of the present invention. FIG. 2 schematically shows in a plan view a process for forming core members shown in FIG. 1, by means of press punching. FIG. 3 schematically shows in cross section the structure of the coupling portions of the core members obtained in the process of FIG. 2. FIG. 4 schematically shows in a plan view a condition in which the core members obtained in the process of FIG. 2 are connected together. FIG. 5 schematically shows in cross section the structure of edge portions of the core segments stacked or laminated in a manner as shown in FIG. 2.

Referring to the above identified figures, a plurality of planar or flat generally T-shaped core segments 3 are each made of a plate-shaped magnetic material. Every two adjacent core segments 3 are connected with each other by virtue of a concave portion 3a and a convex portion 3b which are formed on the front and back surfaces of adjacent two core segments 3 to cooperate with each so as to serve as a coupling means in the form of a joint. Each flat T-shaped core member 3 has an elongated magnetic pole piece and a head or cross piece integrally formed therewith. The cross piece of each flat T-shaped core member 3 has one end face 3c formed into a convex arc-shaped configuration, which is concentric with the concave portion 3a and the convex portion 3b. The cross piece of each flat T-shaped core member 3 has the other end face 3d formed into a concave arc-shaped configuration complementary in shape to the convex arc-shaped end face 3c so as to be in fitting engagement therewith. As shown in FIG. 2, a first layer or core member 4 comprises a plurality of core segments 3 which are continuously and serially disposed in a line with the respective end faces 3c, 3d of every two adjacent ones being in contact with each other. Similarly, a second layer or core member 5 comprises a plurality of core segments 3 which are continuously and serially disposed in a line with the respective end faces 3c, 3d of every two adjacent ones being in contact with each other, but the direction of each core segment 3 of the second core member 5 is opposite to that of each core segment 3 of the first core member 4, that is to say, each core segment 3 of the second core member 5 is disposed in a mirror image relation with respect to that of the first core member 4. More specifically, the convex arc-shaped end face 3c and the concave arc-shaped end face 3d of each core segment 3 of the second core member 5 are disposed just opposite to those of each core segment 3 of the first core member 4. Each core segment 3 of the first core member 4 is formed on its opposite surfaces at one end of its cross piece with a first connection means in the form of a concave portion 3a and a convex portion 3b, respectively, and likewise each core segment 3 of the second core member 5 is formed on its opposite surfaces at the other end of its cross piece with a second connection means in the form of a concave portion 3a and a convex portion 3b, respectively.

As shown in FIGS. 3, 4 and 5, a plurality of first core members 4 and a plurality of second core members 5 are alternately disposed in parallel with respect to one another and stacked or laminated one over another. The first and second core members 4, 5 are disposed in such a manner that interstices or inter-segment spaces or gaps between every two adjacent core segments 3 of the first core members 4 are displaced from those between every two adjacent core segments 3 of the second core members 5 in a longitudinal direction or along the length thereof with one end of the cross piece of each first core segment 3 being overlapped on the other end of the cross piece of an associated second core segment 3 which is disposed adjacent the first core segment 3 in a stacking direction in which the first and second core members 4, 5 are stacked or laminated. The concave portion 3a and the convex portion 3b of each first core segment 3 at one end of its cross piece are placed into fitting engagement with the convex portion 3b and the concave portion 3a, respectively, of an associated second core segment 3 at the other end of its cross piece which is disposed adjacent the first core segment 3 in the stacking direction, thus connecting the mutually adjacent first and second core segments 3 together in a rotatable or turnable manner with respect to each other. As illustrated in FIG. 1, a wire 6 is wound around the magnetic pole tooth or piece 3f (see FIG. 1) of each core segment 3. The respective core segments 3 of the first and second core members 4, 5 thus rotatably connected through engagement of the concave and convex portions 3a, 3b are then rotated or turned around the engaged concave and convex portions to form an annular iron core assembly, generally designated at a reference numeral 7. Here, note that in FIG. 1, the opposite ends of the laminated first and second core members 4, 5 are simply abutted against each other to be connected together, and for this reason, any connection means such as convexes and concaves are omitted or unprovided there.

In the following, a detailed description will be given in order to explain a method of producing an iron core assembly in accordance with the first embodiment of the present invention.

At first, in a position indicated at an arrow T in FIG. 2, convex and concave portions for pressure engagement are press-punched on the front and back surfaces of a core member at three locations per core segment. In this first step, as depicted in FIG. 3, the concave and convex portions 3a, 3b are formed on the opposite end edges of each core segment 3, and two concave and convex portions for connection of stacked or laminated core members 4, 5 are also formed at the center of each core segment 3, i.e., at the widthwise center of the leg and the longitudinal center of the cross piece. Then, in a position indicated at arrow A in FIG. 2, as a second step for forming the first core members 4, a plurality of hatched portions in the figure are press-punched to be removed, so as to form end faces 3c and 3d as well as their surrounding portions. Then, in a position shown by arrow B in the figure, as a second step for forming the second core members 5 which have concave and convex portions formed at the process step T, a plurality of hatched portions in the figure are press-punched to be removed, so as to form end faces 3c and 3d and their surrounding portions.

Subsequently, in the position indicated at arrow C, in those portions of each core segment which have the opposite end faces 3c, 3d formed at the process step A and the opposite end faces 3c, 3d formed at the process step B, hatched portions shown in FIG. 1 are press-punched in succession in an alternate manner to provide the first and second core members 4, 5, which are then stacked in succession in a mold.

In a position indicated arrow S, three through holes per core segment are formed therein by way of press-punching at the same locations as the concave and convex portions formed at the process step T. In this manner, three through holes 3e are formed in each of the core segments 3 which will be the uppermost ones when the first and second core members 4, 5 have been stacked. Thereafter, in a position indicated at an arrow B, as a second step for processing a third core member 51, hatched portions-shown in FIG. 1 in those portions of each core segment 3 in which the through holes 3e have been formed at the process step S are press-punched to provide opposite end faces 3c, 3d and their surrounding portions. Finally, in the position indicated at an arrow C, hatched portions shown in FIG. 1 in those portions of each core segment 3 in which the opposite end faces 3c, 3d have been formed at the process step B are press-punched to provide a third core member 51, which is then stacked on the laminated first and second core members as an uppermost layer in a mold. For example, the thickness of each plate-shaped core segment is 0.5 mm and the number of core segments stacked is 150 sheets.

In FIG. 2, the core segments 3 at the opposite ends of the first core member 4 or the second core member 5 are not aligned in part with the intermediate core segments 3 at their edge portions. This is to expedite abutting engagement or connection of the end core segments 3, which constitute the ends of the stacked or laminated first and second core members 4, 5. This is true of the following embodiments.

The first and second core members 4, 5 are stacked or laminated alternately within a mold with the third core member 51 being disposed thereon as the uppermost layer. During stacking, each pair of two mutually facing concave portion 3a and convex portion 3b and each pair of two mutually facing through holes 3e and convex portion 3b are caused to be engaged with each other in a stacking or laminating direction of core segments 3, thereby forming an integrally connected arrangement, as shown in FIG. 4. Further, the magnetic pole tooth or leg 3f of each core segment 3 of the mutually laminated core members 4, 5 and 51 is wound by a wire 6 (not shown) in a condition shown in FIG. 4. Subsequently, by properly rotating or turning the adjacent core segments 3 relative to each other about mutually engaged concave and convex portions 3a, 3b as well as through holes 3e and convex portions 3b, an annular or ring-shaped iron core assembly 7 is completed.

As described above, according to the first embodiment, since every two adjacent edge portions are stacked or laminated together in a manner such that they are overlapped one over another in the laminating direction of the core segments 3, the surface area on each connection (overlapped edge portions) between two adjacent core segments 3 can be increased, thereby making it possible to inhibit an increase in the magnetic resistance thereof and thus improving the magnetic performance of the iron core assembly. Further, since the end faces 3c and 3d of the punched core segments 3 are alternately diverged or displaced to an extent corresponding to an overlapped area thereof so as to be decoupled in the laminating direction (i.e., the end faces 3c, 3d of the respective core segments 3 being made discontinuous), it is allowed to reduce an area on which the end faces 3c and 3d are existing in the same plane. As a result, it is possible to inhibit the occurrence of eddy current, thereby reducing an iron loss and hence improving the magnetic performance of the iron core assembly.

Further, a force acting in the laminating direction on the iron core assembly 7 is supported by the alternately overlapped portions of the respective core segments 3, so that the rigidity of the iron core assembly 7 and hence the mechanical strength thereof can be improved. Also, as shown in FIG. 5, the plurality of first and second core members 4, 5 may be alternately overlapped one over another so that a magnetic path passing through the first and second core members 4, 5 is formed in the laminating direction of the first and second core members 4, 5 in the overlapped portions of the edge portions of adjacent core segments 3 disposed in the laminating direction, thereby improving the magnetic performance of the core assembly.

Figure 6:
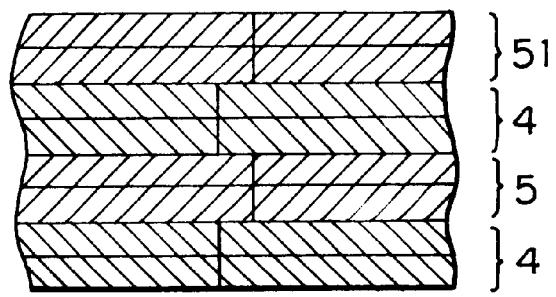
FIG. 6 is a view similar to FIG. 5, but illustrating a modified structure of edge portions of the core segments.

As illustrated in FIG. 6, a plurality (e.g., 2–10, and 2 in the illustrated embodiment) of first or second core members 4, 5 may be stacked or laminated to form a group of laminated core members. In this case, a plurality of groups of laminated first core members 4 and a plurality of groups of laminated second core members 5 are alternately laminated together with one group of the first core members 4 lying over another group of the second core members 5. With such an arrangement, the greater the number of core members forming one group, friction between adjacent core segments 3 can be reduced when the respective core segments are rotated or turned about their associated connectors (e.g., the engaged concave and convex portions). In addition, when the laminated first and second core members 4, 5 are shaped into an enclosed or ring-like configuration with their opposite ends being connected with each other, the greater the number of laminated first core members or second core members for one group, it becomes the easier to place the ends of the first and second core members into fitting engagement with respect to each other, improving the productivity of the core assembly.

In addition, by properly rotating the engaging sections of adjacent core segments including a concave portion 3a and a convex portion 3b relative to each other, the mutually laminated first and second core members 4, 5 may be bent to form a generally ring-shaped configuration. In this way, it is allowed to perform such bending for several times without causing any deterioration in its mechanical strength. Moreover, since the end faces 3c, 3d of each plate-shaped core segment 3 are each formed into an arc-shaped configuration in a concentric relation with respect to both the associated concave portion 3a and convex portion 3b, it is easy to rotate or turn the mutually engaged concave and convex portions and hence the adjacent core segments relative to each other, making it possible to improve an operational efficiency when winding a wire to form a desired coil thereon.

Nevertheless, though not shown in the drawings, if an appropriate clearance is properly formed in the engaging sections comprising a concave portion 3a and a convex portion 3b, such a clearance may be effectively used to absorb an accumulated error which would otherwise possibly occur during the above-mentioned press punching processing. Further, such a kind of clearance is also useful in expediting relative rotation between engaged concave and convex portions 3a, 3b.

Figure 7:
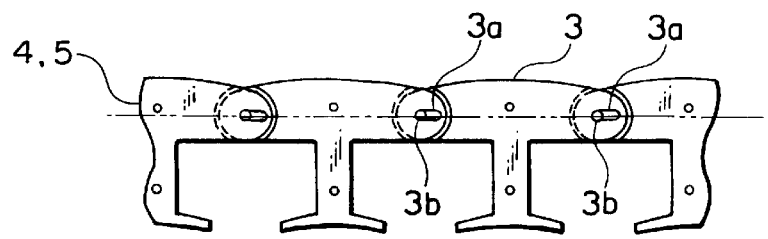
FIG. 7 is a view similar to FIG. 4, but illustrating a modified form of core members.
Figure 8:
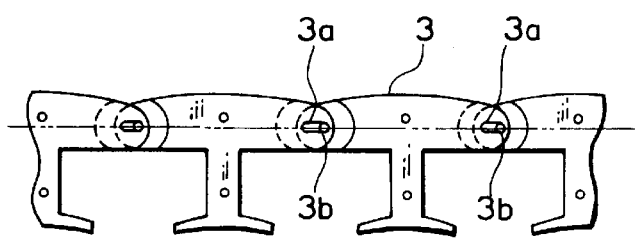
FIG. 8 is a view similar to FIG. 7, but illustrating a different operating state of the core members.

Further, as shown in FIG. 7, the concave portion 3a on each core segment 3 may be elongated in the longitudinal direction of the first or second core member 4, 5, it is possible for each convex portion 3b to move a little along and within the elongated said concave portion 3a in its longitudinal direction. In this manner, as seen from FIG. 8, it is possible to further enlarge an interval between every two adjacent core segments 3, thus further improving an efficiency in the operation of winding a wire to form a coil. Here, note that a chain dot line in FIG. 7 or 8 shows that a core segment is permitted to move along the chain dot line within the elongated length of a concave portion 3a.

Figure 9:
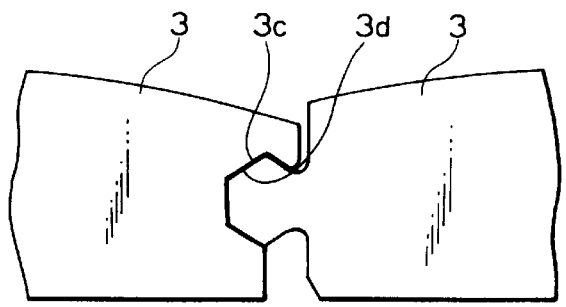
FIG. 9 is an enlarged plan view of adjacent core segments according to the first embodiment, showing a connected state of edge portions thereof.
Figure 10:
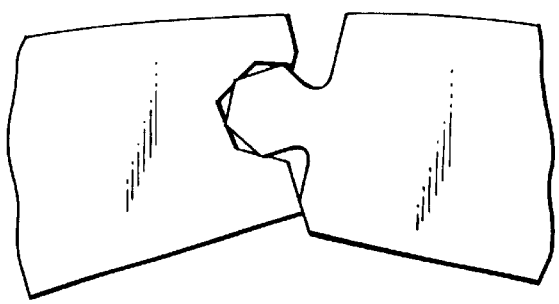
FIG. 10 is a view similar to FIG. 9, but illustrating a different operating state of the core segments.

Further, as illustrated in FIG. 9, the end faces 3c, 3d of a core segment 3 may be formed into some polygonal shapes, so that when adjacent core segments 3 of first and second core members 4, 5 are properly rotated relative to each other about mutually engaged concave and convex portions 3a, 3b so as to bend the first and second core members 4, 5, corners of adjacent end faces 3c, 3d may be abuttingly engaged with each other to be deformed to some extent, as shown in FIG. 10, so that they are firmly fixed together, thereby increasing the rigidity of the iron core assembly 7 and hence improving the mechanical strength thereof.

Embodiment 2

Figure 11:
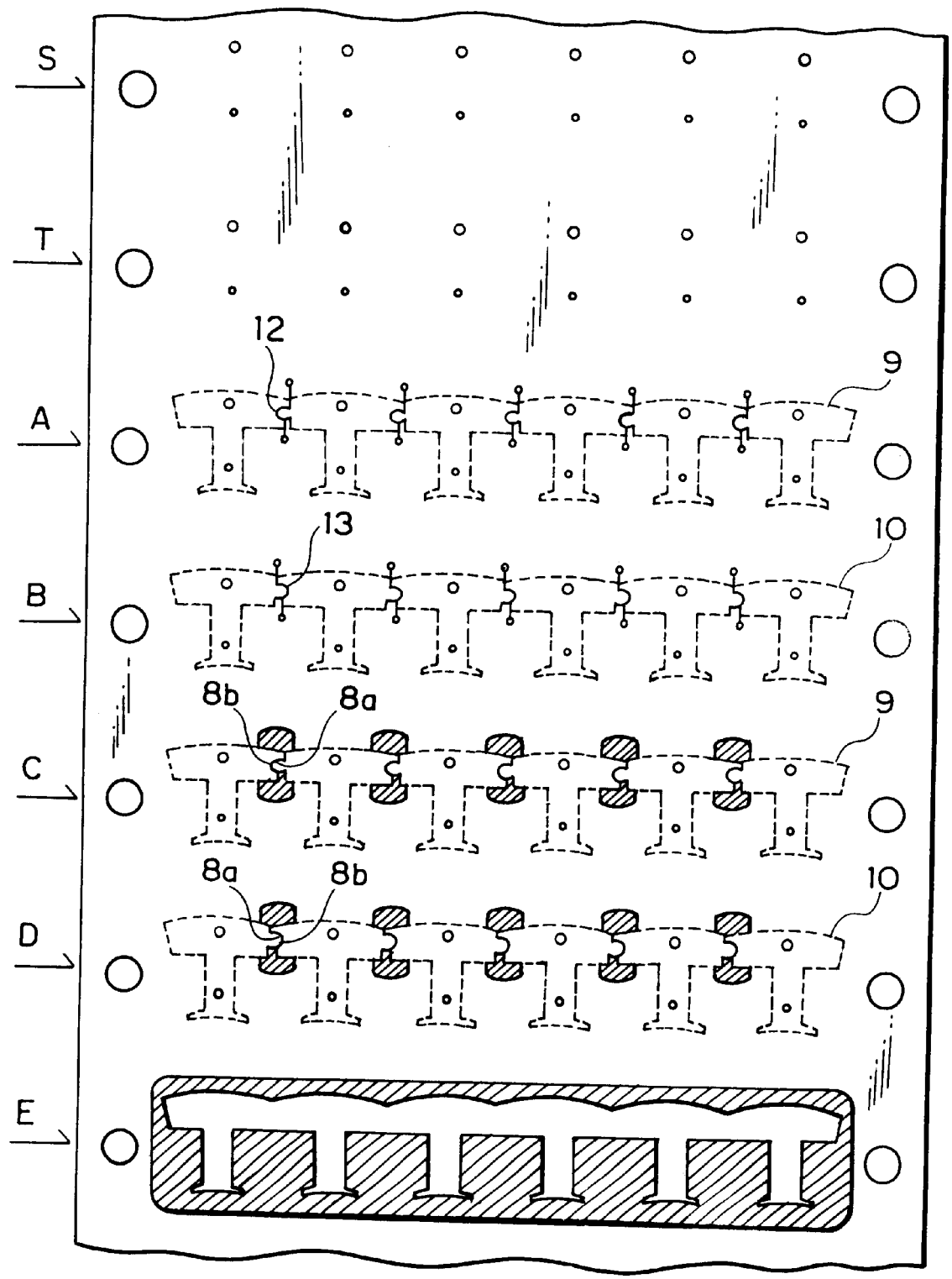
FIG. 11 is a plan view illustrating a process for forming core members for an iron core assembly by way of press punching, according to a second embodiment of the present invention.
Figure 12:
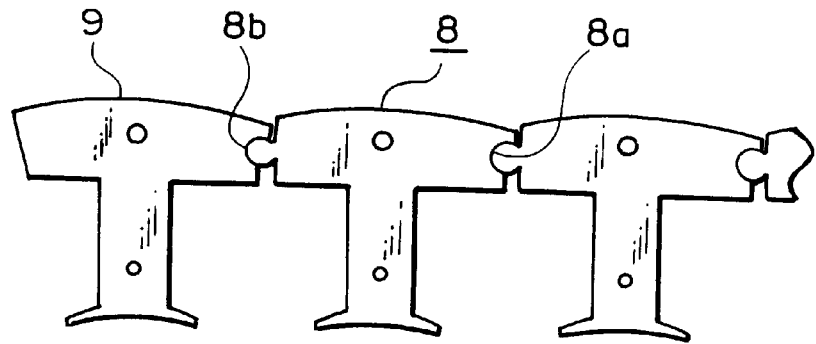
FIG. 12 is a plan view illustrating the structure of a first core member made in the process of FIG. 11.
Figure 13:
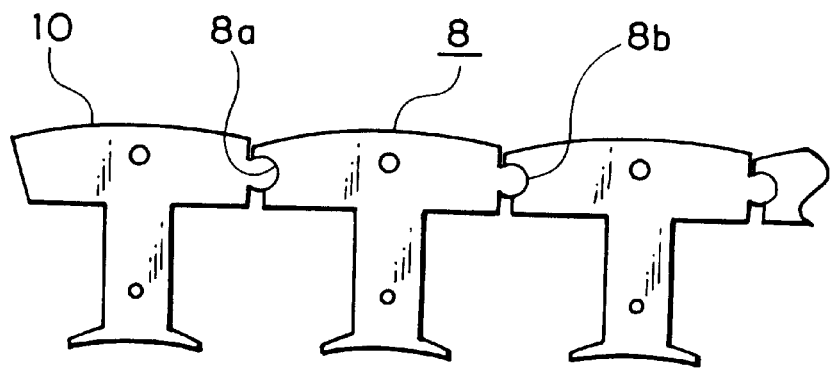
FIG. 13 is a plan view illustrating the structure of a second core member made in the process of FIG. 10.
Figure 14:
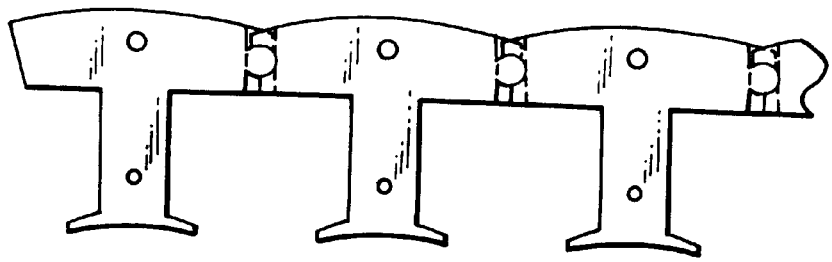
FIG. 14 is a plan view illustrating that the first and second core members shown in FIG. 11 and FIG. 12 are laminated alternately.
Figure 15:
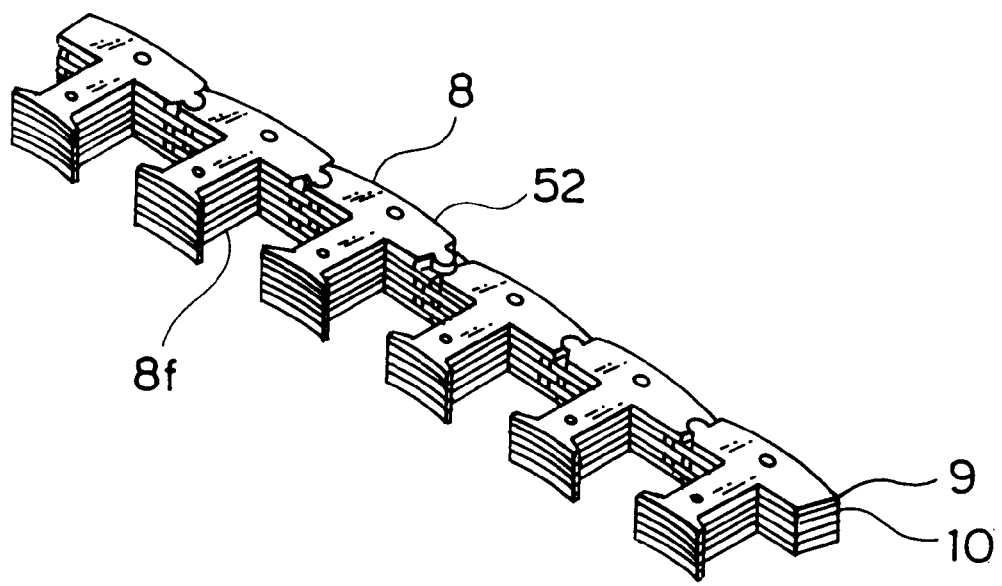
FIG. 15 is a perspective view of the laminated first and second core members shown in FIG. 14.
Figure 16:
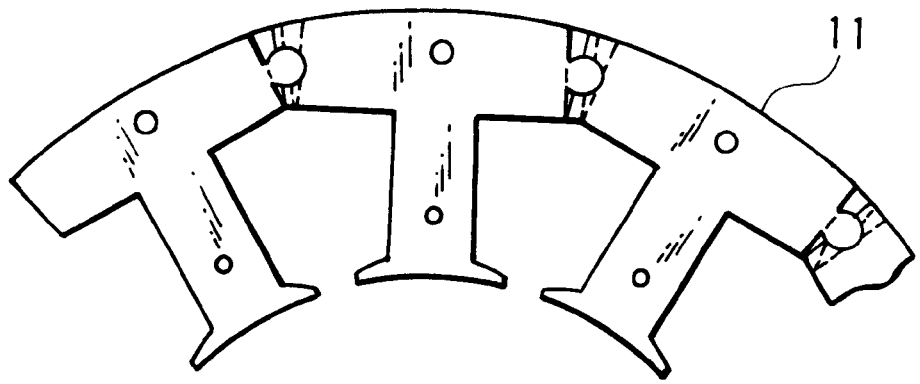
FIG. 16 is a plan view illustrating a part of the structure of an iron core assembly constructed according to the second embodiment.

FIGS. 11 through 16 relate to a second embodiment of the present invention. FIG. 11 illustrate a process for forming several types of core members for an iron core assembly by way of press punching, according to the second embodiment. FIG. 12 is a plan view showing the structure of first core members fabricated in a process of FIG. 11. FIG. 13 is a plan view showing the structure of second core members fabricated in a process of FIG. 11. FIGS. 14 and 15 are a plan view and a perspective view, respectively, showing that the first core members and the second core members may be stacked or laminated in an alternate manner. In FIG. 15, three core segments 8 from the right-hand end of an uppermost layer are removed. FIG. 16 is a plan view showing part of the structure of an iron core assembly fabricated according to the second embodiment.

In these figures, a reference numeral 8 represents a plurality of plate-shaped core segments. Like the previously mentioned first embodiment, each core segment 8 comprises a tooth or leg and a head or cross piece, but in this second embodiment, the cross piece has one end thereof formed into a generally circular-shaped concave portion 8*a* and the other end thereof formed into a generally circular-shaped convex portion 8*b* which is complementary in shape to its concave portion 8*a* and engageable with a similar concave portion 8*a* of an adjacent core segment 8. These concave and convex portions 8*a* and 8*b*, once engaged together, may be separated from each other only in the laminating direction. thereby forming an articulated structure serving as a coupling means or mechanism. As shown in FIG. 12, a first core member 9 comprises a plurality of core segments 8 which are articulately connected with one another side by side through engagements between adjacent concave portions 8*a* and convex portions 8*b*. Similarly, as shown in FIG. 13, a second core member 10 comprises a plurality of core segments 8 which are articulately connected with each other side by side through engagements between adjacent concave portions 8*a* and convex portions 8*b* which are all disposed in just an opposite or reversed direction to those of the first core member 9. Specifically, a core segment 8 of the first core member 9 has a convex portion 8*b* formed at one end thereof (e.g., at the left-hand end in FIG. 12) and a concave portion 8*a* formed at the other end thereof (e.g., at the right-hand end in FIG. 12), whereas a core segment 8 of the second core member 10 has a concave portion 8*a* formed at one end thereof (e.g., at the left-hand end in FIG. 13) and a convex portion 8*b* formed at the other end thereof (e.g., at the right-hand end in FIG. 13).

As shown in FIGS. 14 and 15, the first and second core members 9, 10 are laminated together in an alternate manner and disposed such that respective inter-segment positions or clearances (i.e., interstices between mutually confronting or engaging concave and convex portions 8*a*, 8*b* of adjacent core segments 8) of the first core member 9 are displaced from those of the second core member 10 in the longitudinal direction with adjacent edge portions of those core segments which adjoin each other in the laminating direction being overlapped one another. The first and second core members 9, 10 thus laminated are articulately bended about the concave-convex engagements 8*a*, 8*b* which are rotated or turned relative to each other, thereby forming an annular or ring-shaped iron core assembly.

In the following, a detailed description will be given to explain how to produce an iron core assembly in accordance with the second embodiment of the present invention.

At first, in a position indicated at arrow T in FIG. 11, as a first step for forming a first and a second core member 9, 10, on the front and back surfaces of an iron sheet or plate-shaped material, there are formed, by way of press punching, two concave and convex portions per core segment 8, which are adapted to be press fitted or engaged with corresponding ones in an adjacent core segment 8 at a later stage. In this first step, two concave and convex portions for connection of adjacent core segments 8 of first and second core members 9, 10 to be laminated as shown in FIG. 15 are thus formed in a portion corresponding to the center of each core segment 8, i.e., one in the longitudinal center of the head or cross piece and the other in the widthwise center of the magnetic pole tooth or leg. Then, in a position indicated at arrow A in FIG. 11, as a second step for forming the first core member 9, a plurality of cuts 12 are provided to define the contours of the concave portions 8*a* and the convex portions 8*b*. Subsequently, in a position indicated at arrow C in FIG. 11, as a third step, a plurality of hatched parts surrounding the cut portions in the figure are press-punched to be removed, so as to form peripheries of the respective concave portions 8*a* and convex portions 8*b*. Further, in the position indicated at arrow B in FIG. 11, as a second step for forming the second core member 10, similar to the step indicated at arrow A, a plurality of cuts 13 are provided to those portions on which concave and convex portions 8*a*, 8*b* have been formed at the step indicated at arrow T, thus defining the contours of the concave portions 8*a* and the convex portions 8*b*. Then, in a position indicated at arrow D in FIG. 11, as a third step, a plurality of hatched portions surrounding the cut parts in the figure are press-punched to be removed, so as to form peripheries of the respective concave portions 8*a* and convex portions 8*b*.

Thereafter, in a position indicated at arrow E in FIG. 11, portions including the concave portions 8*a* and the convex portions 8*b* formed in the position indicated at arrow C and portions including the concave portions 8*a* and the convex portions 8*b* formed in the position indicated at arrow D are successively processed in an alternate manner such that the hatched portions shown in the figure are alternately press-punched so as to be removed, thereby forming the first core member 9 and the second core member 10. The first core members 9 and the second core members 10 thus formed are then placed in a mold and successively laminated therein.

Moreover, in a position indicated at arrow S, two through-holes per core segment are press-punched through the plate-shaped material at the same locations as those of concave and convex portions formed at the step indicated at arrow T, thereby forming two through-holes per core segment 8 in a third core member 52 (see FIG. 15) which constitutes a top or uppermost layer of the laminated first and second core members 9, 10. Then, in the position indicated at arrow B, as a second step for forming the third core member 52, a plurality of cuts 13 are provided to those portions on which concave and convex portions 8*a*, 8*b* have been formed at the step indicated at arrow S, thus defining the contours of the concave and convex portions 8*a*, 8*b*. Then, in a position indicated at arrow D in FIG. 11, as a third step, a plurality of hatched portions surrounding the cut parts in the figure are press-punched to be removed, so as to form peripheries of the respective concave portions 8*a* and convex portions 8*b*. Thereafter, in a position indicated at arrow E in FIG. 11, portions including the concave portions 8*a* and the convex portions 8*b* formed in the position indicated at arrow D are successively processed so that the hatched portions shown in the figure are press-punched so as to be removed, thereby forming the third core member 52, which is then placed in the mold and stacked on the laminated first and second core members 9, 10 as the top or uppermost layer.

In the mold, the concave and convex portions confronting with each other in the laminating direction of the respective core segments 8 are press-fitted or engaged with each other and caulked for preventing them from being slipped off, thus providing an integral unit. Subsequently, under the condition shown in FIG. 15, the magnetic pole tooth 8*f* of each core segment 8 is wound with a wire (not shown) so as to form a coil thereon. After that, as shown in FIG. 16, the core members are bent about the engaged concave and convex portions 8*a*, 8*b* through relative rotation thereof so as to form a ring-shaped configuration, thus completing the iron core assembly 11.

In this way, according to the second embodiment of the present invention, each core segment 8 are formed at its opposite ends with a concave portion 8a and a convex portion 8b, which are rotatably engaged with each other so as to rotatably connect adjacent core segments 8 with each other in an articulated manner. By properly rotating the mutually engaged concave portions 8a and the convex portions 8b relative to each other, adjacent core members 9 and 10 can be bent properly so as to form a ring-shaped iron core assembly, which is of course easily rotatable and at the same time permits an improved precision in assembling an iron core of this kind.

Embodiment 3

Figure 17:
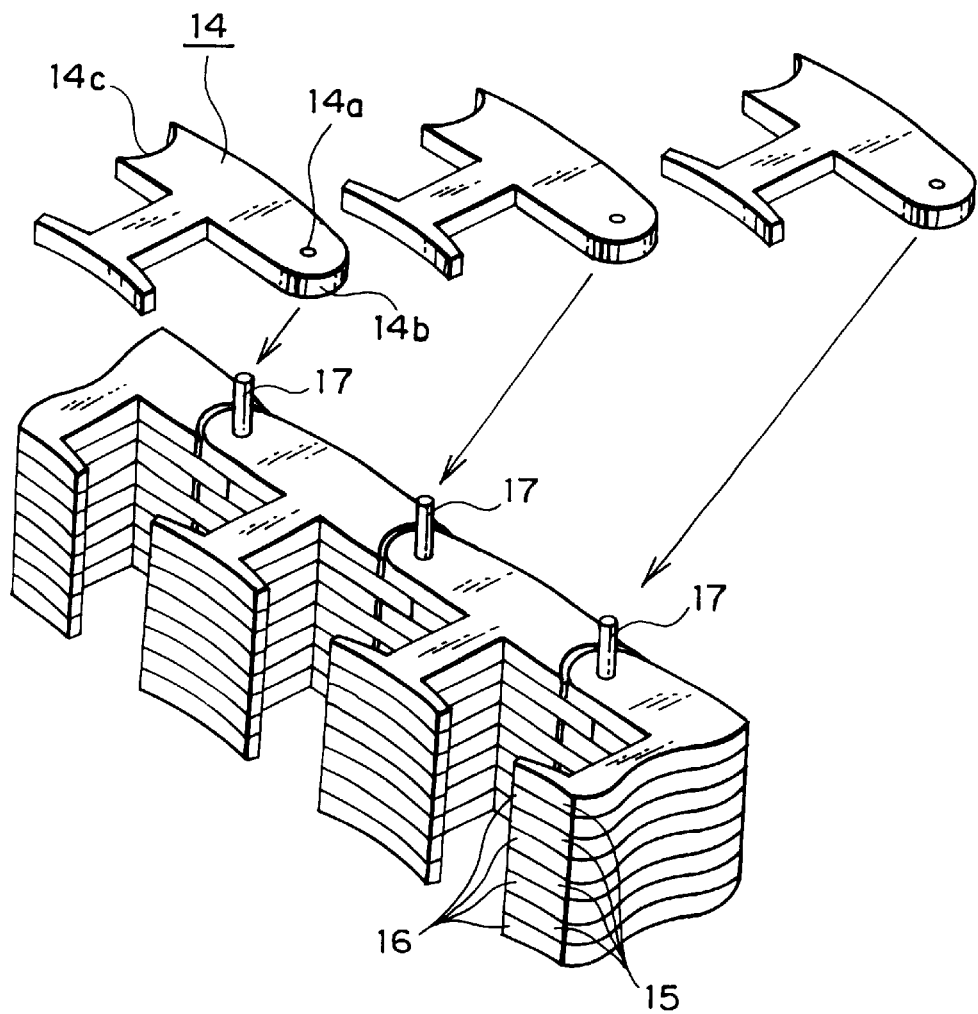
FIG. 17 is a developed perspective view schematically illustrating the structure of essential portions of an iron core assembly constructed according to a third embodiment of the present invention.
Figure 18:
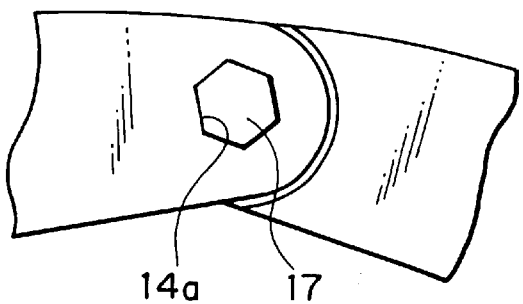
FIG. 18 is an enlarged plan view schematically illustrating a modified form of an iron core assembly according to the third embodiment.

FIG. 17 is a developed perspective view schematically illustrating the structure of major or essential portions of an iron core assembly produced according to a third embodiment of the present invention. FIG. 18 is a plan view schematically showing the essential portions of an iron core assembly according to a modified form of the embodiment of FIG. 17. FIG. 19 is also a view similar to FIG. 18, but showing a different state of the essential portions of the modified iron core assembly of FIG. 17.

In the figures identified above, a reference numeral 14 represents a plurality of T-shaped planar core segments made of a magnetic material. Each T-shaped core segment comprises a magnetic pole tooth or leg and a head or cross piece. On one end of the cross piece of each core segment 14 is formed a through hole 14a and an end face 14b having a circular arc shape with the through hole 14a as its arc center. The other end of the cross piece of each core segment 14 is formed into a circular arc-shaped concave end face 14c which is complementary in shape to and engageable with a circular arc-shaped convex end face 14b of an adjacent core segment 14. A first core member or layer 15 comprises a plurality of core segments 14 which are successively disposed in a line side by side with one end face 14b of a core segment 14 confronting with the other end face 14c of another adjacent core segment 14 with an appropriate clearance formed therebetween. Similarly, a second core member or layer 16 comprises a plurality of core segments 14 which are successively disposed in a line side by side in a different manner from the first core member 15, i.e., in just an opposite or reversed relation with the first core member 15 in the longitudinal direction. Each core segment 14 of the first core member 15 has a through hole 14a formed through one end edge portion thereof, i.e., at one end of its cross piece, whereas each core segment 14 of the second core member 16 has a through hole 14a formed through the other end edge portion thereof, i.e., at the other end of its cross piece.

As seen from FIG. 17, a plurality of first core members 15 and a plurality of second core members 16 are alternately laminated one over another with inter-segment positions of the first core members 15 (i.e., clearances between mutually confronting end faces 14b, 14c of adjacent core segments 14) being displaced from those of the second core members 16 in the longitudinal direction, so that end or edge portions of the cross pieces of respective core segments 14 adjoining in the laminating direction thereof are overlapped one over another. A plurality of pin members 17 are each inserted into a plurality of aligned through holes 14a in laminated respective core segments 14 to rotatably or articulately connect together the laminated core segments (i.e., alternately laminated first and second core members 15, 16) adjoining each other in the laminating direction. Such pin members 17 can be prevented from sliding off by caulking on opposite ends thereof. In this regard, note that each of the pin members 17 may comprise a bolt-and-nut combination. The through holes 14a in the core segments 14 of the first and second core members 15, 16 and the pin members 17 together constitute a coupling means or mechanism. The core segments 14 are properly rotated at the pin members 17, so that the first core members 15 and the second core members 16 may be bent into a ring-shaped configuration, thereby providing a desired iron core assembly, and at the same time permitting an improvement in precision when assembling an iron core assembly of this kind.

However, as shown in FIGS. 18 and 19, if the inner surface of each through hole 14a and the outer surface of each pin member 17 are formed into polygonal shapes, when the two kinds of core members 15 and 16 are bent into a ring-shaped configuration, it is possible to further improve the rigidity of the iron core assembly and its mechanical strength by fixing the polygonal outer surface of each pin member 17 into the polygonal inner surface of each through hole 12a, as shown in FIG. 19.

Embodiment 4

FIGS. 20(A) and 20(B) show the structure of essential portions of an iron core assembly constructed according to a fourth embodiment of the present invention, wherein FIG. 20(A) is a cross sectional view illustrating a state in which the edge portions of two adjacent groups of core segments are facing each other, and FIG. 20(B) is a cross sectional view illustrating a state in which the edge portions of the two adjacent groups of core segments have been engaged with each other. FIGS. 21 (A) and 21 (B) show a modified structure of the iron core assembly of FIGS. 20(A) and 20(B) constructed according to the fourth embodiment of the present invention, wherein FIG. 21 (A) is a cross sectional view illustrating a state in which the edge portions of two adjacent groups of core segments are facing each other, and FIG. 21(B) is a cross sectional view illustrating a state in which the edge portions of the two adjacent groups of core segments have been engaged with each other. FIGS. 20(A), 20(B) and FIGS. 21 (A), 21 (B) respectively show different structures effective to expedite abutment of the opposite end portions of laminated core members in forming laminated core segments into a ring-shaped configuration through relative rotation thereof.

In the above figures, a reference numeral 18 represents an iron core comprising a plurality of successively laminated core segments 18a having their mutually confronting end edge portions successively laminated or overlapped one over another in a stepwise manner in the laminating direction, as shown in FIGS. 20(A) and 20(B). Further, a reference numeral 19 represents an iron core comprising a plurality of successively laminated core segments 19a having their mutually confronting end edge portions successively laminated or overlapped one over another in a V-shaped manner in the laminating direction, as shown in FIGS. 21 (A) and 21 (B).

In this way, according to the fourth embodiment of the present invention, since the edge portions of the confronting ends of two adjacent groups of core segments 18a of a laminated core are successively overlapped one over another in the laminating direction so as to form a stepwise or stairway configuration, as shown in FIGS. 20(A) and 20(B), there would be no limitation for the two groups of mutually confronting core segments 18a to move in the laminating direction. Therefore, during the above-mentioned bending operation, even if an undesired catch occurs in any of the above edge portions, such a catch is allowed to easily escape in the laminating direction. As a result, it is sure to easily eliminate a possible catch and smoothly perform a predetermined bending operation, so as to form a properly laminated structure for an iron core assembly and at the same time to improve a desired operational efficiency when assembling an iron core assembly of this kind. In addition, the core segments 18 at the confronting ends of the laminated core are engaged with one another in a surface-to-surface contact manner so magnetic resistance at the confronting ends of the laminated core can be reduced.

Further, since the edge portions of the confronting ends of two adjacent groups of core segments 19a of a laminated core are successively overlapped one over another so as to form a V-shaped configuration in the laminating direction, as shown in FIGS. 21 (A) and 21 (B), there will be a desired limitation for the positions of some core segments 19a on the center of the whole lamination which corresponds to a crest of the V-shaped configuration. In this manner, during the above-mentioned bending operation, even if an undesired catch occurs in any of the above edge portions, such a catch may be eliminated by adding a vibration in the laminating direction, thus making it possible to perform the bending operation in an easy and smooth manner and at the same time improve a desired operational efficiency when assembling an iron core assembly of this kind. Also, the core segments 19 at the confronting ends of the laminated core are engaged with one another in a surface-to-surface contact manner, reducing magnetic resistance at the confronting ends of the laminated core.

Embodiment 5

FIGS. 22(A) through 22(D) are plan views schematically illustrating a method for assembling essential portions of an iron core assembly constructed according to a fifth embodiment of the present invention. FIGS. 23(A) through 23(D) are cross sectional views taken along an alternate long and short dash line in FIGS. 22(A) through 22(D), respectively, as seen in the direction of arrows.

In these figures, reference numerals 20 and 21 represent a first core member and a second core member which are successively laminated together. of the first and second core members 20, 21, there are formed holes 22a and projections 23a. The projections 23b are engageable in the holes 22a but are also freely disengageable therefrom. In FIG. 22, the second core member 21 is represented by hatched portions.

In the following, an explanation will be given to describe the method for assembling an iron core assembly having end portions as constructed above.

Figure 22A:
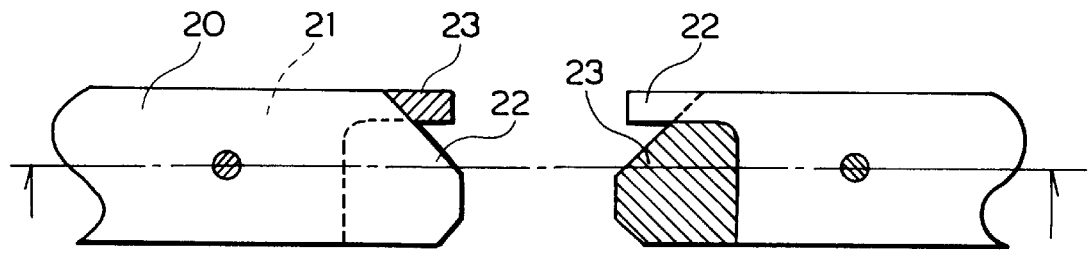
FIGS. 22(A) through 22(D) are plan views illustrating a method for assembling essential portions of an iron core assembly according to a fifth embodiment of the present invention.
Figure 22B:
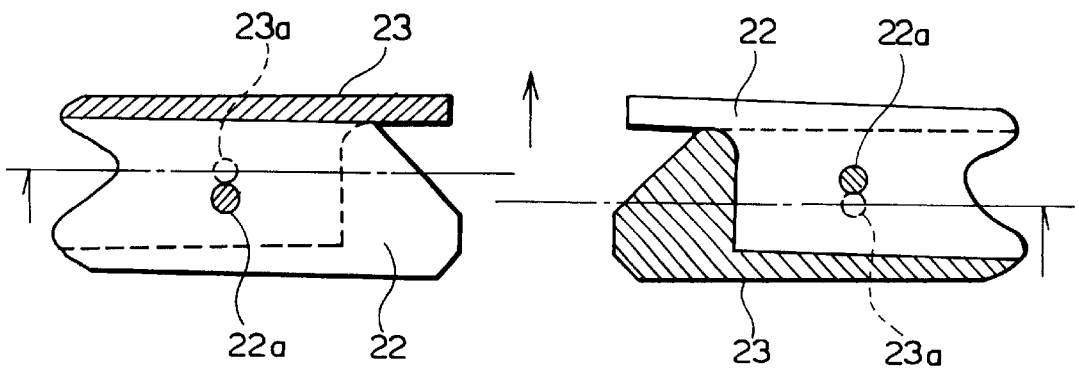
Figure 23A:
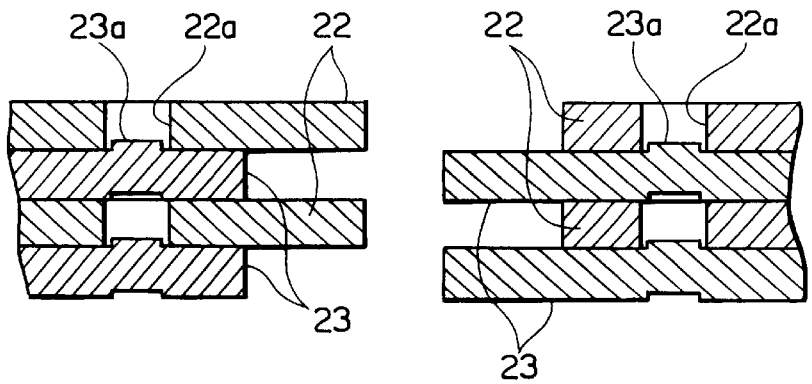
FIGS. 23(A) through 23(D) are cross sectional views corresponding to FIGS. 22(A) through 22(D), respectively, illustrating the same assembling method.
Figure 23B:
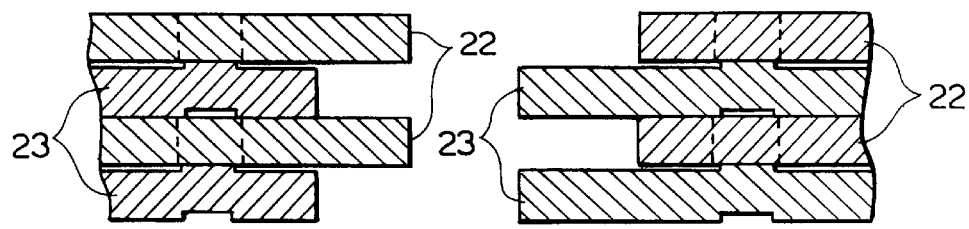

At first, starting from the conditions shown in FIG. 22(A) and FIG. 23(A), the edge portions of respective core segments 22, 23 of the first and second core members 20,21 at their opposite ends are caused to rotate with connection points (not shown) of their coupling means (e.g., concave and convex portions 3a, 3b in FIG. 3) serving as rotating centers. At this time, as shown in FIG. 22(B) and FIG. 23(B), the edge portions of core segments of odd number 23 at one end (i.e., the left-hand side in these figures), and the edge portions of core segments 22 of even number at the other end (i.e., the right-hand side in these figures), are all caused to shift a little in a direction shown by an arrow in FIG. 22(B).

Figure 22C:
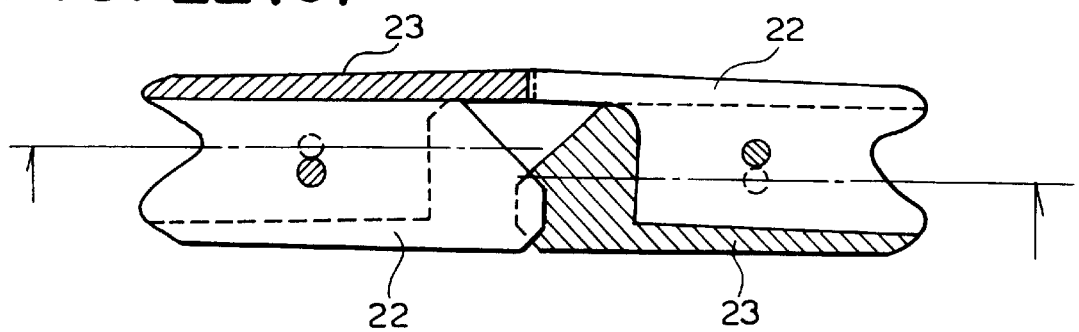
Figure 22D:
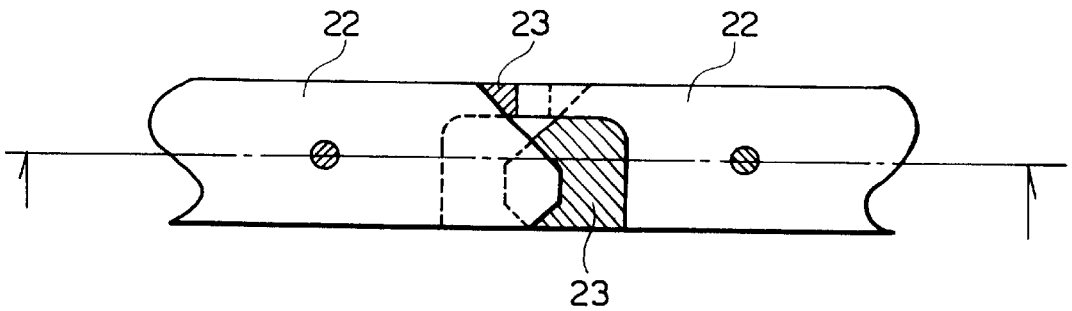
Figure 23C:
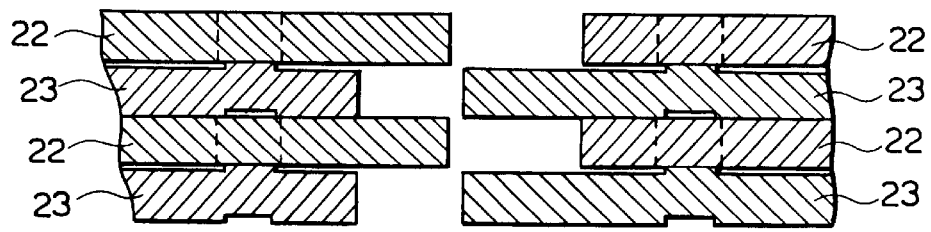
Figure 23D:
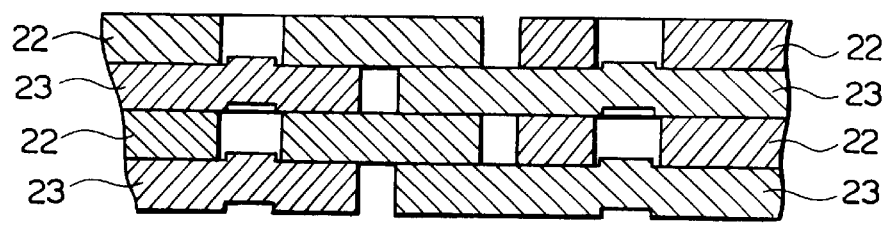

As a result, a hole 22a in each core segment 22 and a projection 23a in each core segment 23 which have been engaged together are separated from each other, so that each projection 23a is moved toward a position not involving a hole 22a so as to abut against a side surface of an adjacent core segment 23, thus increasing a clearance between mutually adjacent core segments 22, 23 corresponding to a distance by which the projection 23a has been moved to come out of the hole 22a. Next, as shown in FIG. 22(C) and FIG. 23(C), the core segments 22, 23 at the opposite ends are drawn or moved toward each other, so that the edge portions thereof are alternately overlapped one over another with their projected edges at one end being inserted into corresponding recesses defined between adjacent projected edges at the other end, thereby forming a ring-shaped iron configuration, as depicted in FIGS. 22(D) and 23(D). Then, the adjacent core segments 22, 23 of the first and second core members 20, 21 are again moved relative to one another in a direction just opposite or reverse to the direction indicated at an arrow in FIG. 22(B), so that the projections 23a on the core segments 23 are inserted or engaged into the corresponding holes 22a in the core segments 22, thus completing an assembling operation.

As described above, according to the fifth embodiment of the present invention, on corresponding positions of respective core segments 22, 23 of the laminated first and second core members 20, 21 there are formed holes 22a and projections 23a. The projections 23b can be placed into or out of engagement with the holes 22a. In assembling operation, the projections 23a are detached or disengaged from the holes 22a so as to enlarge widthwise clearances between adjacent core segments 22, 23. As a result, the abutting engagements between the first and second core members 20, 21 can be made easily, thereby improving an operational efficiency when assembling an iron core assembly of this type.

Embodiment 6

Figure 24:
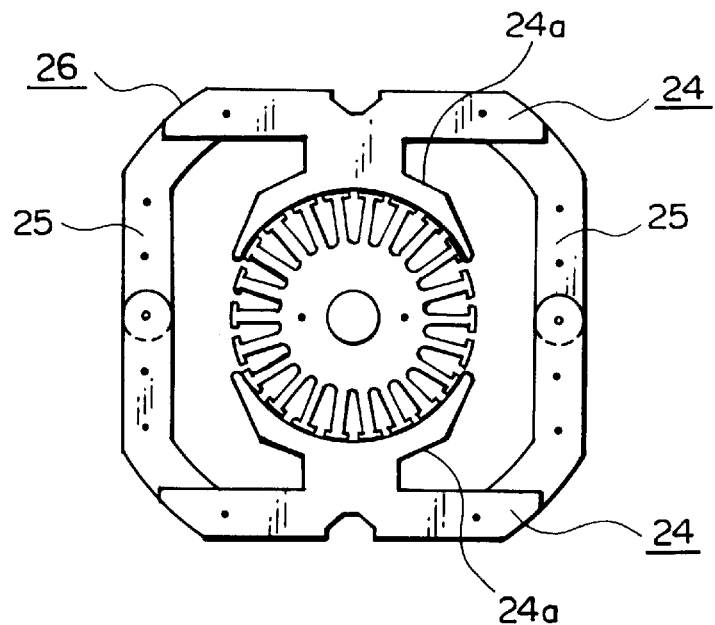
FIG. 24 is a front elevation view illustrating the structure of an iron core assembly constructed according to a sixth embodiment of the present invention.
Figure 25:
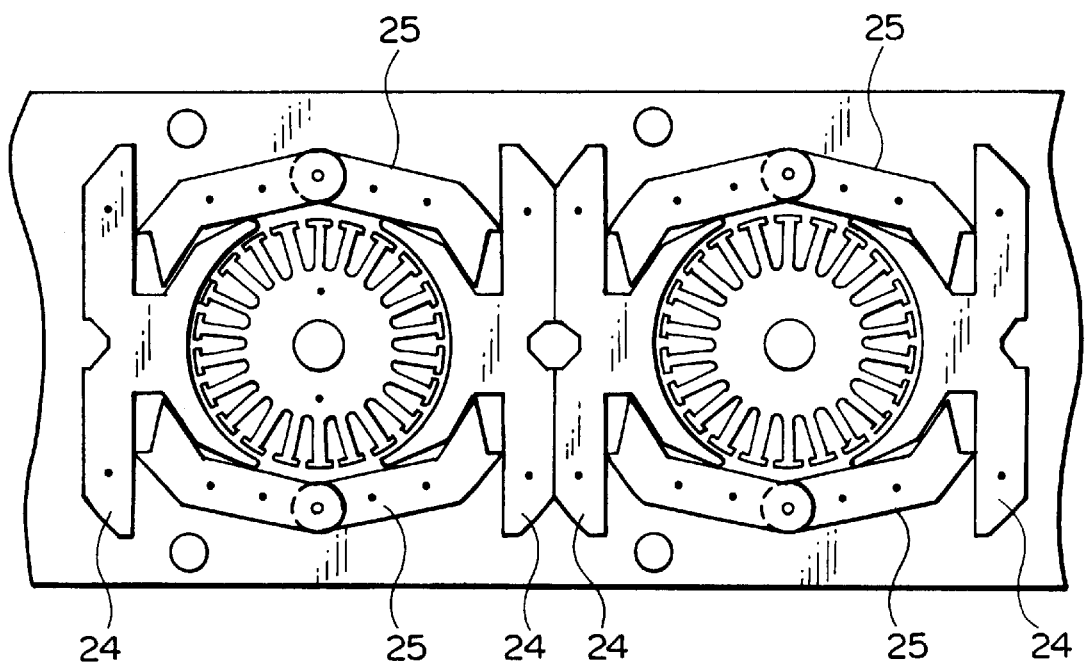
FIG. 25 is a plan view illustrating a material from which core members shown in FIG. 24 are formed by means of press punching.

FIG. 24 is a front view illustrating the structure of an iron core assembly constructed according to a sixth embodiment of the present invention. FIG. 25 is a plan view showing how core members of FIG. 24 are formed through press-punching.

In these figures, a reference numeral 24 generally represents a pair of first core members each having at the center thereof a protruding magnetic pole tooth 24a wound by a coil (not shown), and a reference numeral 25 generally represents a pair of second core members each having core segments rotatably or articulately connected with each other at their adjacent ends thereof. Each first core member 24 comprises a plurality of first core segments laminated one over another, and each second core member 25 comprises a plurality of core layers laminated one over another, each core layer including two second core segments disposed in a line and rotatably connected with each other through a coupling means or mechanism, as shown in FIG. 24. For example, each second core member 25 is equivalent to a core member 4 or 5 of the above-mentioned first embodiment which has two core segments 3 per layer. Thus, each second core member 25 can be constructed substantially in the same manner as the core members 4, 5. By rotating second core segments of the second core members 25 relative to each other through the coupling means, the pair of first core members 24 and the pair of second core members 25 are combined into abutting engagement with each other at their ends, thereby providing a ring-shaped (e.g., rectangular-shaped) iron core assembly 26.

In this way, according to the sixth embodiment of the present invention, since the ring-shaped iron core assembly 26 is constructed by properly connecting the first core members 24 and the second core members 25, when the first core members 24 and the second core members 25 are formed from a sheet of plate-shaped material by means of a press-punching processing, it is allowed to arrange the first and second core members 24 and 25 in the narrowest possible space, as shown in FIG. 25, thereby improving the yield of the core materials.

Embodiment 7

Figure 26:
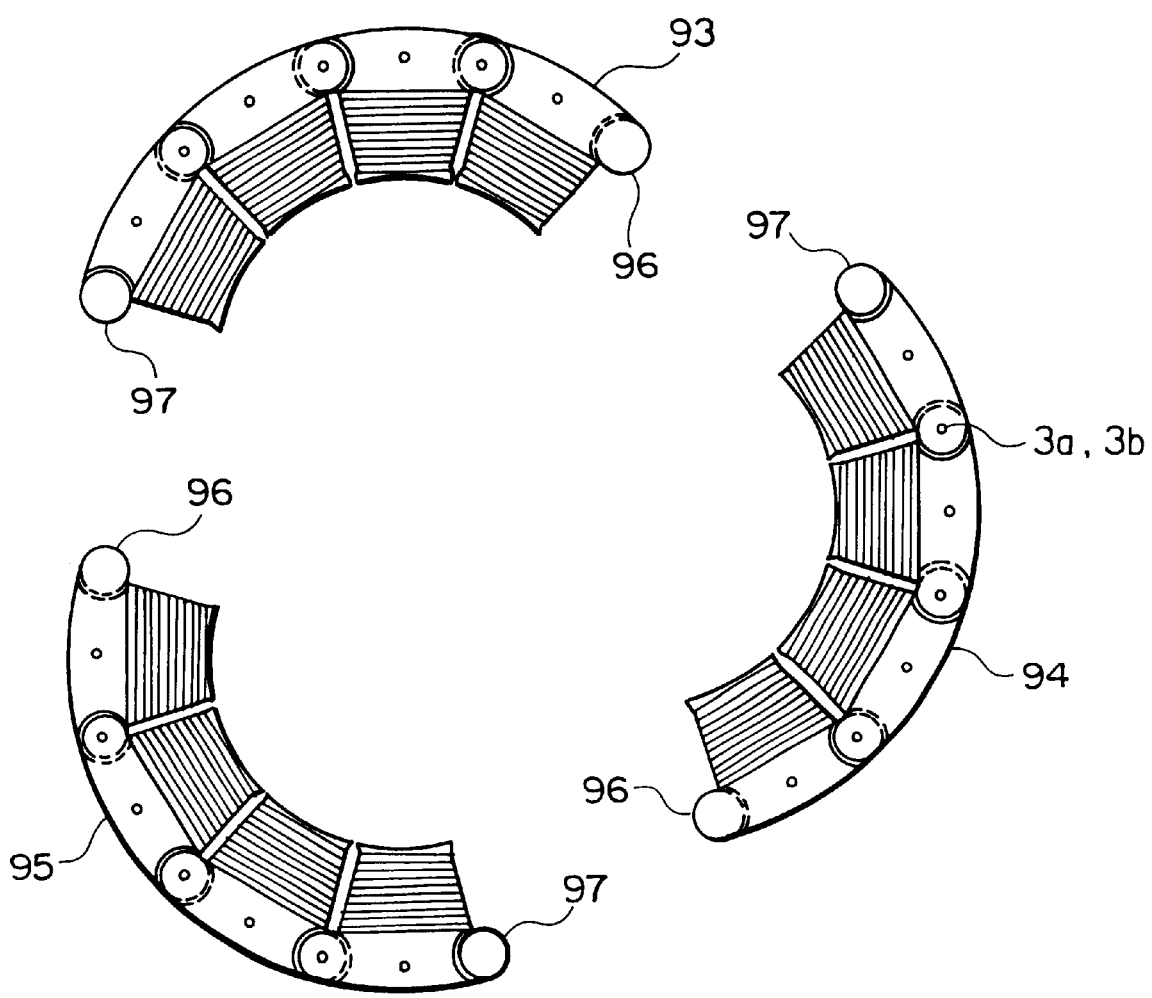
FIG. 26 is a plan view of divided laminated core units of an iron core assembly according to a seventh embodiment of the present invention.
Figure 27:
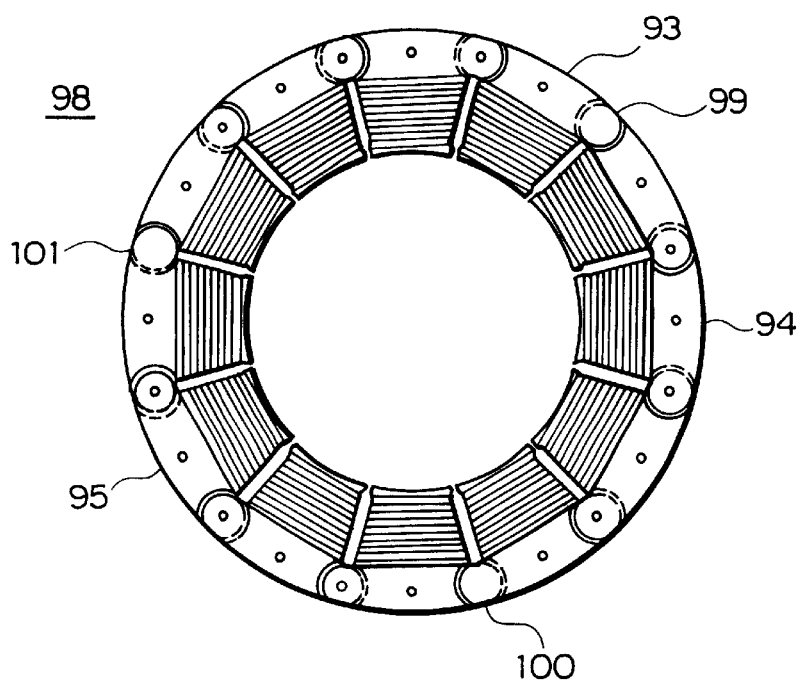
FIG. 27 is a plan view schematically illustrating the structure of an core iron core assembly completely constructed from the laminated core units of FIG. 26.

FIG. 26 is a plan view of an iron core assembly in accordance with a seventh embodiment of the present invention, but showing a state before assemblage thereof, and FIG. 27 is a plan view of the iron core assembly of FIG. 26, showing its completed state.

In FIG. 26, the iron core assembly of this embodiment comprises a first laminated core unit 93, a second laminated core unit 94 and a third laminated core unit 95. Here, note that these three core units 93, 94 and 95 are equivalent to three circumferentially divided components of the laminated iron core assembly of the above-mentioned first embodiment shown in FIG. 1. Thus, each of the three laminated core units 93, 94 and 95 are formed in the same as the laminated core members 4, 5 of the first embodiment. That is, each of the laminated core units 93, 94 and 95 includes a first core member comprising a plurality of flat or plate-shaped core segments successively disposed in a raw, and a second core member comprising a plurality of flat or plate-shaped core segments successively disposed in a raw. The first and second core members are laminated one over another with inter-segment positions of clearances between adjacent core segments of each first core member being displaced from those of an adjacent second core member in the longitudinal direction, so that edge portions of core segments adjoining each other in the laminating direction are overlapped with each other. Mutually adjacent edges of core segments adjoining each other are connected with each other through coupling means in the form of concave and convex portions 3a, 3b. At the opposite ends 96, 97 of each laminated core members, there is no provision of coupling means in order to allow the opposing ends 96, 97 to be combined into abutting engagement with each other.

Although in the first embodiment of FIG. 1, the respective core segments are rotated or articulated relative to each other to form the laminated core members as a single core unit into a ring-shaped configuration to provide a completed iron core assembly, according to the seventh embodiment shown in FIGS. 26, 27, the respective core segments of the laminated iron core assembly, after each being wound by a wire (not shown), are rotated through the coupling means to combine the first, second and third laminated core units 93, 94 and 95 together into a ring-shaped configuration, thus providing an iron core assembly 9 for use with an electric motor (see FIG. 27). In FIG. 27, reference numerals 99, 100 and 101 represent connector portions for coupling adjacent ends of the respective laminated core units 93, 94 and 95 with each other. In this manner, in the case of the circumferentially divided construction of the laminated core assembly, the core assembly can be divided into a plurality of core units each having a size suitable for expediting a variety of operations as desired, thus improving the operating efficiency.

Embodiment 8

Figure 28:
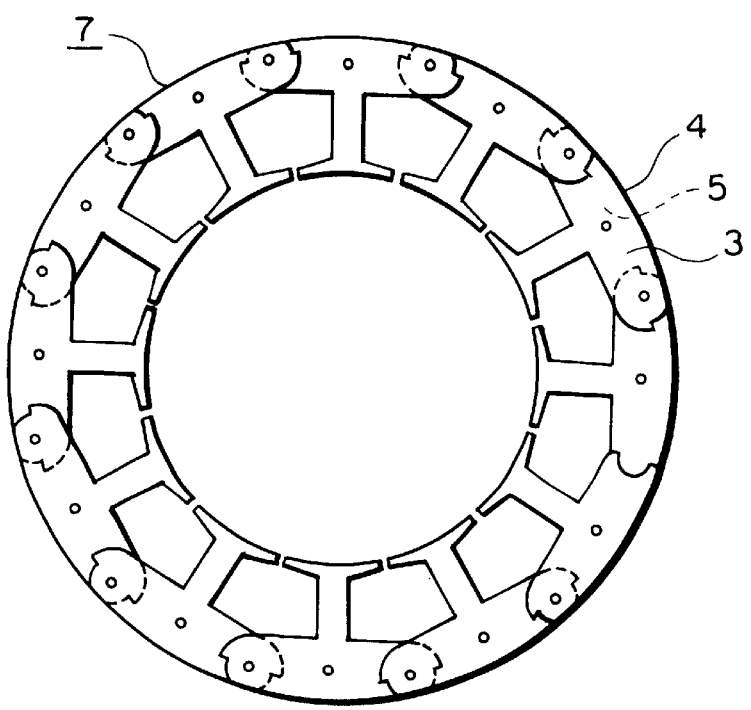
FIG. 28 is a plan view schematically illustrating the structure of an iron core assembly according to an eighth embodiment of the present invention.
Figure 29:
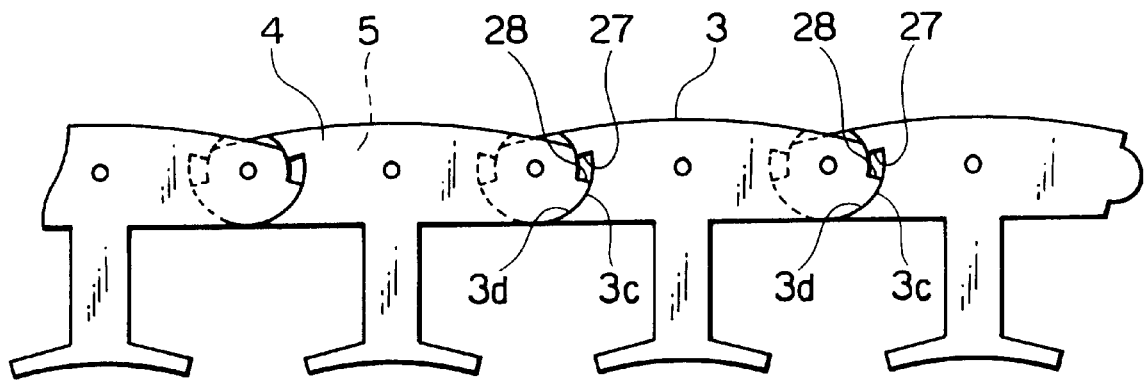
FIG. 29 is a plan view schematically illustrating the structure of core members shown in FIG. 28.
Figure 30:
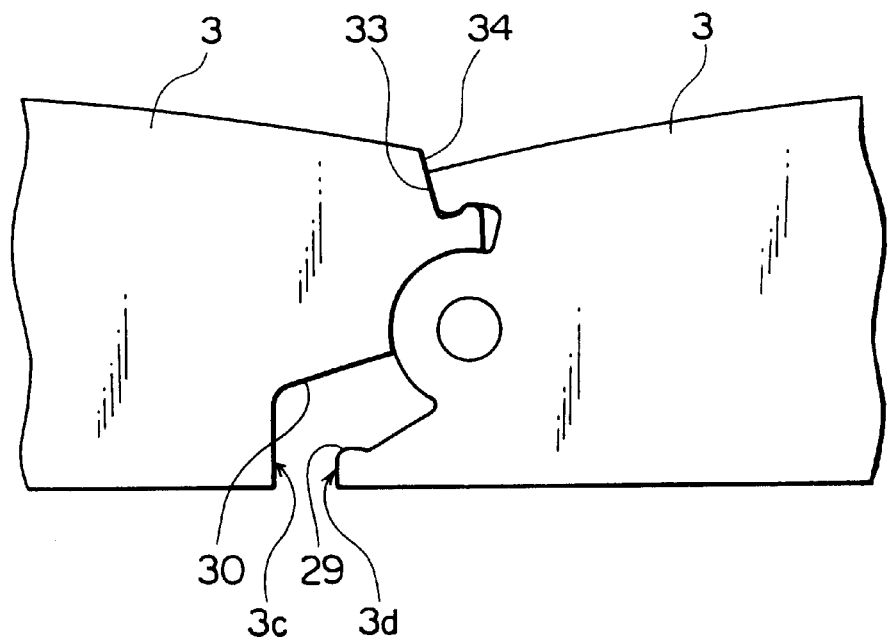
FIG. 30 is an enlarged plan view of essential portions of a core member of an iron core assembly according to the eighth embodiment, but showing a structure different from that shown in FIG. 29.
Figure 31:
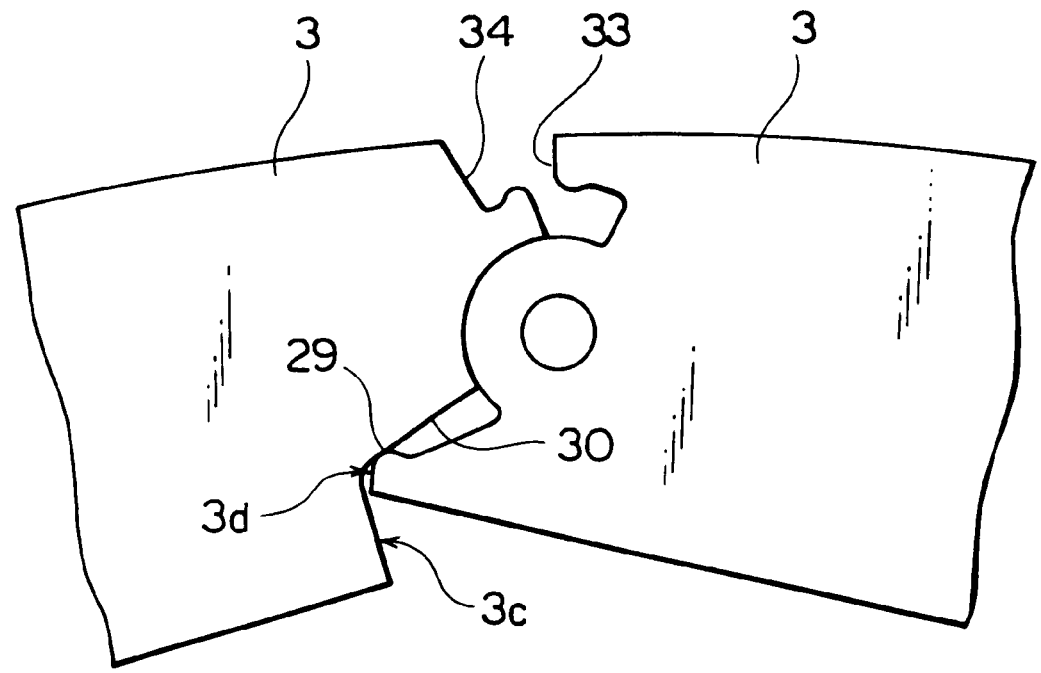
FIG. 31 is a plan view schematically illustrating a condition in which the core member shown in FIG. 30 has been formed into a ring-shaped configuration.
Figure 32:
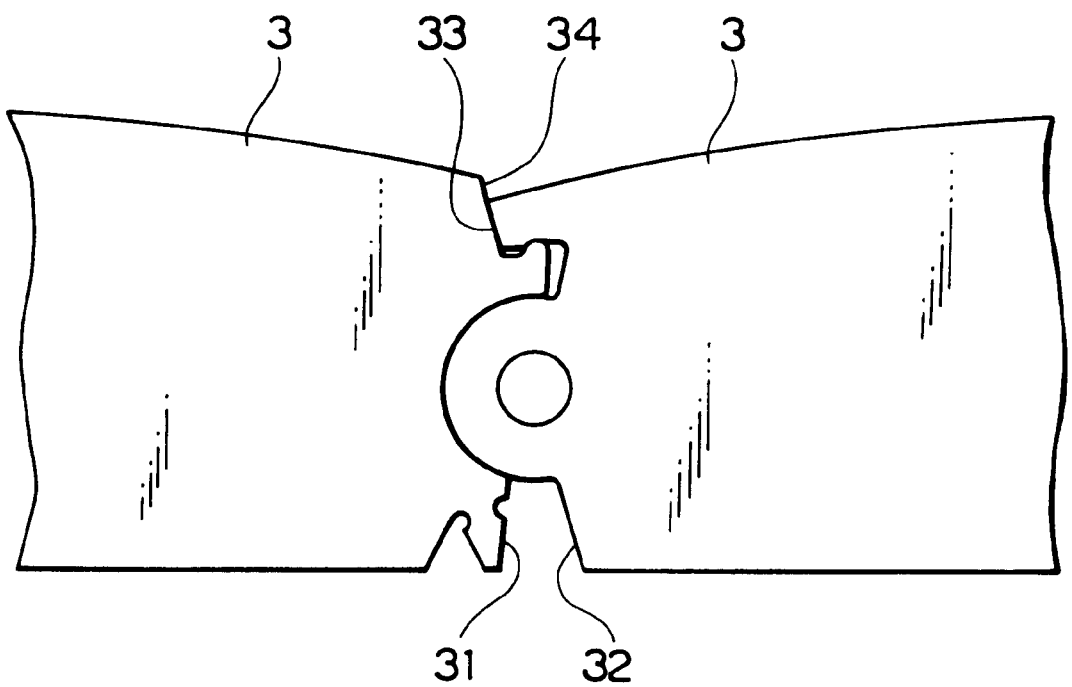
FIG. 32 is a view similar to FIG. 30, but illustrating a modified form of core member.
Figure 33:
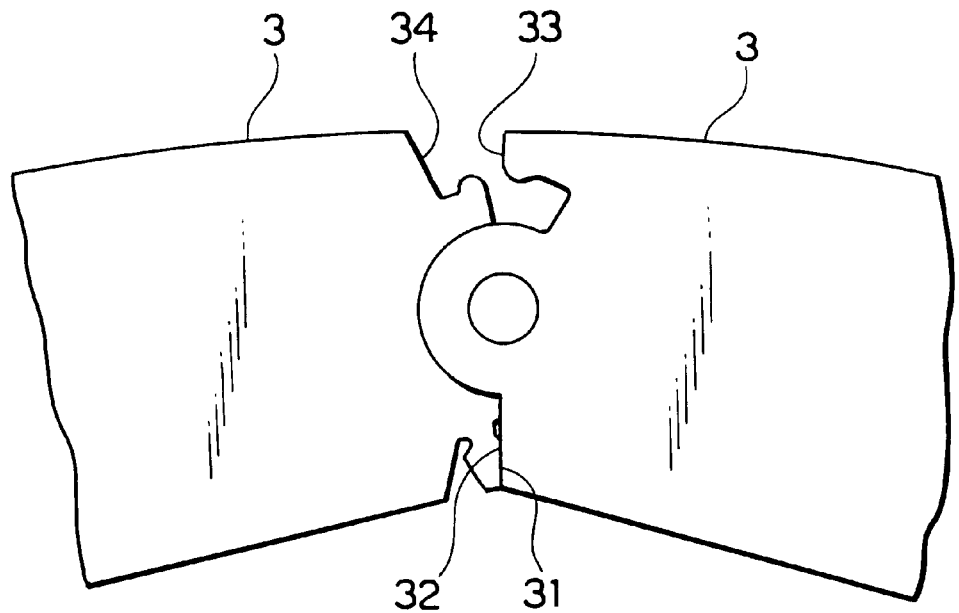
FIG. 33 is a plan view illustrating a condition where the core member shown in FIG. 32 has been formed into a ring-shaped configuration.

FIG. 28 is a plain view schematically showing the structure of an iron core assembly constructed according to an eight embodiment of the present invention. FIG. 29 is a plan view schematically showing the structure of core segments of FIG. 28. FIG. 30 is a plan view schematically showing essential portions of modified forms of core segments different from those shown in FIG. 29. FIG. 31 is a view similar to FIG. 30, but showing a different operating state in which the core segments of FIG. 30 have been formed into a ring-shaped configuration. FIG. 32 is a view similar to FIG. 30, but showing another modified forms of core segments. FIG. 33 is a view similar to FIG. 32, but showing a different operating state in which the core segments shown in FIG. 32 have been formed into a ring-shaped configuration.

In the above-identified figures, the same parts as those shown in the first embodiment are represented by the same reference numerals and hence a description thereof is omitted. In these figures, reference numerals 27 and 28 represent rotation restricting means in the form of engaging portions or projections which are formed on the end faces 3c, 3d of each core segment 3 to protrude in a direction to restrict the relative rotation of the core segments 3. The engaging projections 27, 28 on one and the other end faces 3c, 3d, respectively, of mutually adjacent core segments 3 of the first and second core members 4, 5 on the same planes or layers are placed in abutting engagement with each other to prevent relative rotation between the mutually adjacent core segments 3 when a plurality of core first and second members 4, 5 alternately laminated one over another are connected at their opposite ends to be formed into a ring-shaped configuration. With the engaging projections 27, 28 at their mutually contacted positions, the first and second core members 4, 5 are respectively connected at their ends to form a ring-shaped configuration, thereby providing a desired iron core assembly 7, as shown in FIG. 28.

In this way, according to the eighth embodiment of the present invention, on the respective end faces 3c, 3d of each core segment 3, there are formed engaging portions 27, 28 which can be placed into abutting engagement with each other to prevent relative rotation between the adjacent core segments 3 when the core members 4, 5 are respectively connected at their ends with each other to form a ring-shaped configuration. With this arrangement, it becomes easy to properly position the respective core segments 3 of the first and second core members 4, 5 in forming these core members 4, 5 into a ring-shaped configuration, thereby improving an operational efficiency when assembling an iron core assembly.

Further, as shown in FIG. 30 and FIG. 32, one 29 or 31 of engaging portions at one end of a core segment 3 may be formed into a deformable shape, and the respective core segments 3 can be properly positioned by use of jigs so as to form a ring-shaped configuration, so that the one engaging portion 29 or 31 is deformably forced into fitting engagement with the other engaging portion 30 or 32. With this construction, it is possible to bear a radial force acting on the first and second core members 4, 5, which are formed into a ring-shaped configuration, through the engaging portions of mutually adjacent core segments 3, thereby providing an iron core assembly suitable for use in an electric motor which requires an adequate mechanical strength in the radial direction thereof.

Moreover, as shown in FIG. 30 and FIG. 32, on the respective end faces 3c, 3d of each core segment 3 at positions different from the engaging portions 29, 30, 31 and 32, there may be formed a reverse-rotation restricting means in the form of additional engaging portions 33, 34 which can be placed into abutting engagement with each other upon a reverse rotation of adjacent core segments 3 in a direction opposite the rotating direction thereof in forming the ring-shaped configuration, thus for preventing the reverse rotation. With this construction, by restricting the reverse rotation at each connection point between adjacent core segments 3, it is sure to prevent a possible rebound of a core member during a process for winding a coil, thereby improving an assembling operation of an iron core assembly.

Figure 34:
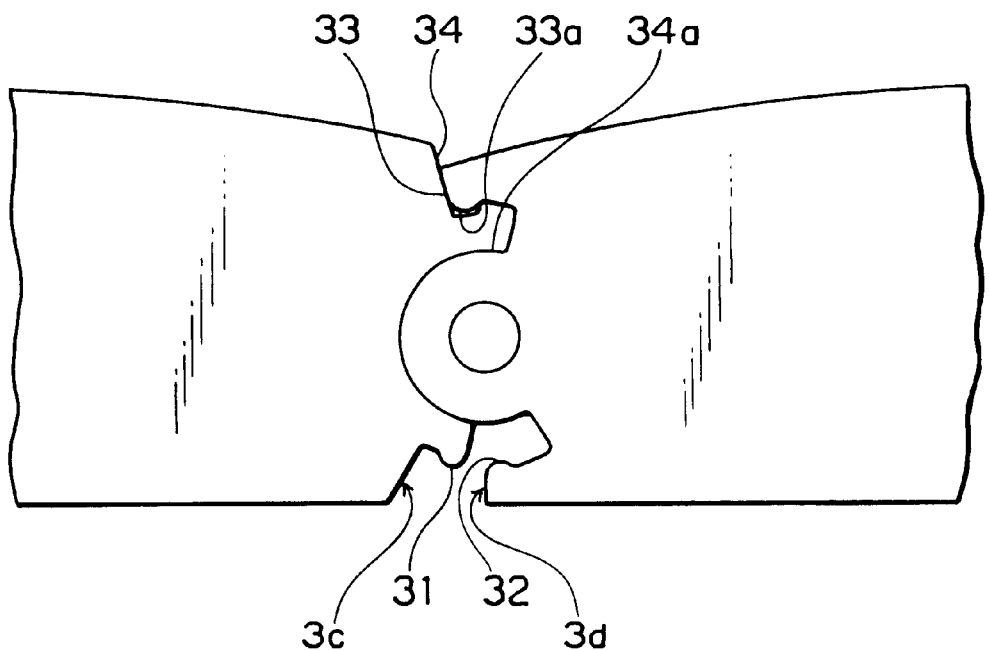
FIG. 34 is a view similar to FIG. 32, but illustrating another modified form of core member.
Figure 35:
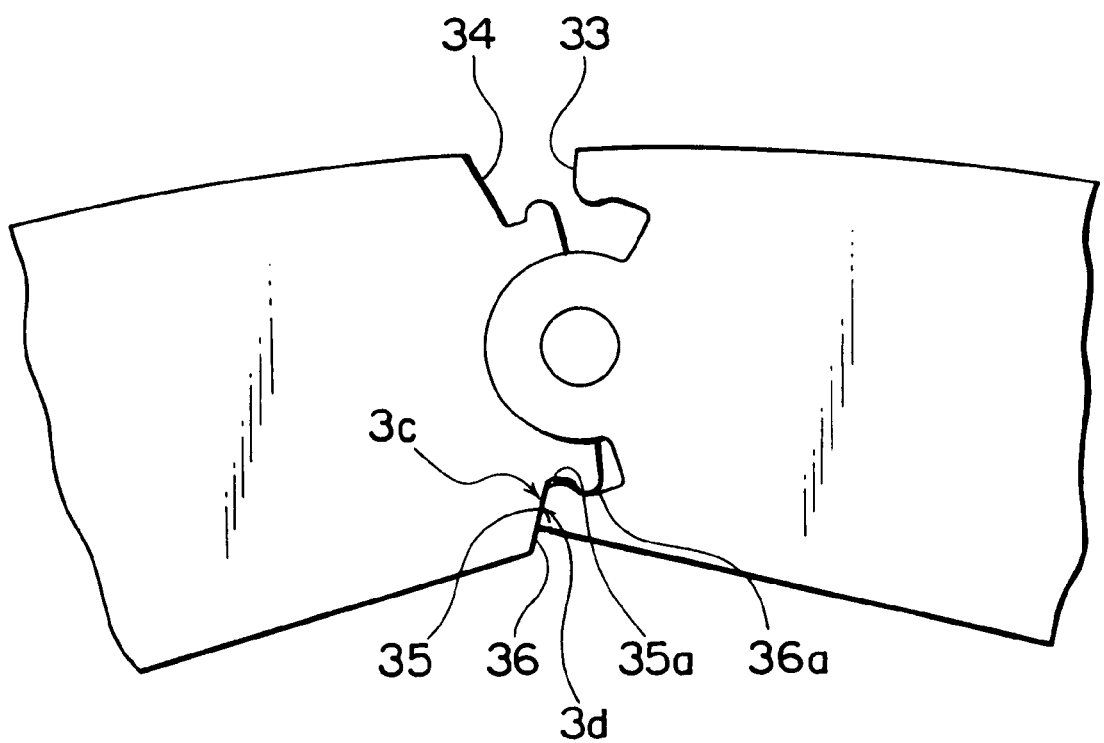
FIG. 35 is a plan view illustrating a condition where the core member shown in FIG. 34 has been formed into a ring-shaped configuration.

In addition, as shown in FIG. 34 and FIG. 35, on the engaging portions 33, 34, 35 and 36 of each core segments 3, there may be formed engaging projections 33a, 34a, 35a and 36a, respectively, so that when the engaging portions 33, 34 are in abutment with the engaging portions 35, 36, respectively, the engaging projections 33a, 34a will also come into abutment with the engaging portions 35a, 36a, respectively, thus temporarily fixing the core segments in such positions. As a result, it is sure to easily perform a wire winding operation for forming coils on the iron core assembly, and easily perform an operation for properly bending the core members, thereby improving an operational efficiency in assembling the iron core assembly.

Embodiment 9

Figure 36:
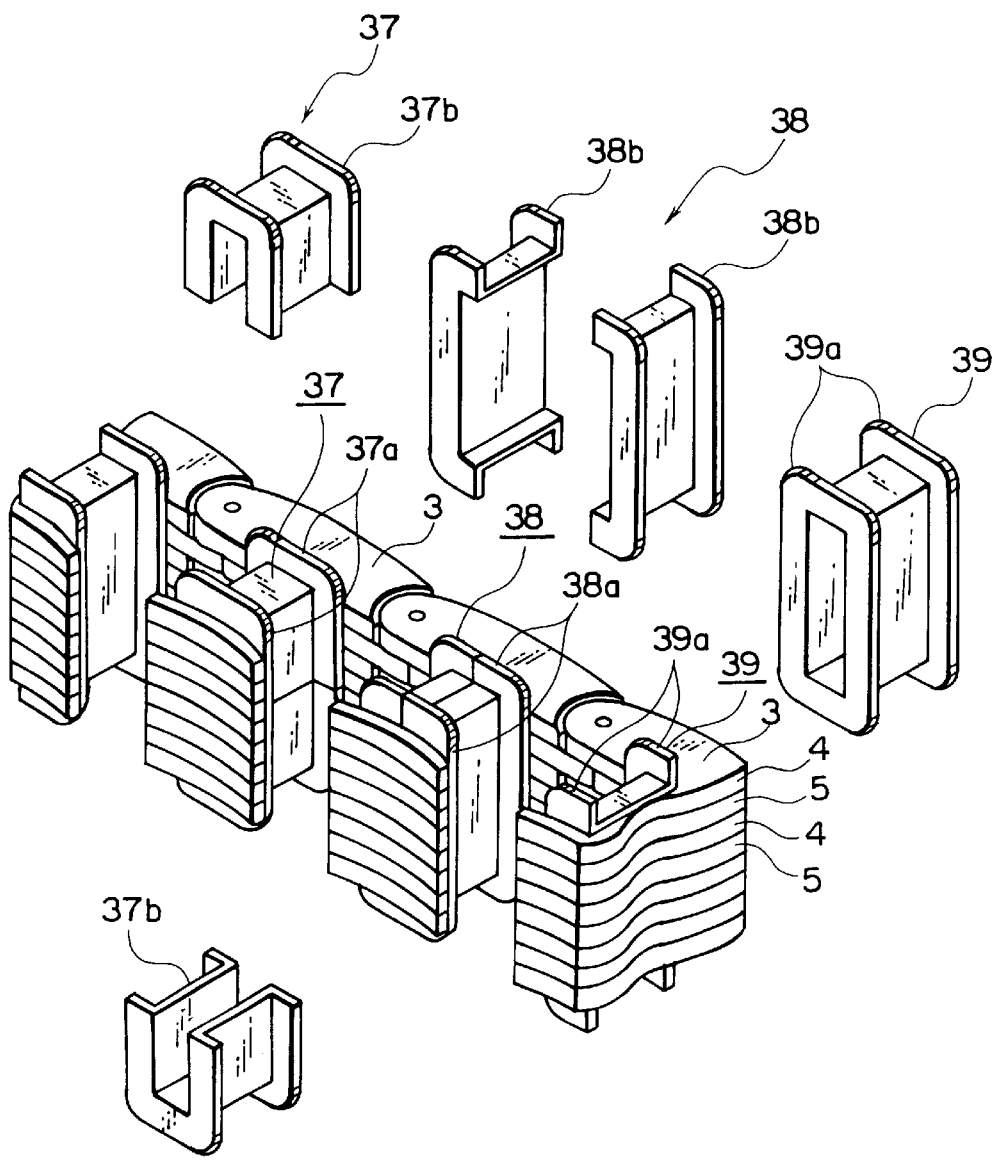
FIG. 36 is a developed perspective view schematically illustrating the structure of an iron core assembly constructed according to ninth embodiment of the present invention.

FIG. 36 is a developed perspective view showing the structure of an iron core assembly constructed according to a ninth embodiment of the present invention.

In FIG. 36, the same portions as those shown in the first embodiment are represented by the same reference numerals, and hence a description thereof is omitted. In this figure, reference numerals 37, 38, 39 represent a first, a second and a third cylindrical-shaped insulating bobbin each having a pair of flange portions 37a, 38a, 39a, respectively. The first insulating bobbin 37 is comprised of a pair of half-pieces 37b, 37b divided in the vertical direction. The second insulating bobbin 38 is comprised of a pair of half-pieces 38b, 38b divided in the longitudinal direction. The third insulating bobbin 39 is formed integral with core segments 3. Further, these insulating bobbins 37, 38, 39 serve to integrally hold a plurality of core segments 3 by means of their cylindrical bodies, the core segments 3 being disposed one over another in a laminating direction of the laminated first and second core members 4, 5.

In this manner, according to the ninth embodiment of the present invention, the plurality of core segments 3 disposed one over another in the laminating direction of the laminated first and second core members 4, 5 can be integrally held together by the insulating bobbins 37, 38, 39, ensuring a desired integration without bringing about any unfavorable influence such as a strain or distortion of the core segments 3. As a result, a possible increase in magnetic resistance can be effectively suppressed and thus a magnetic performance can be improved. Although in the above description three kinds of insulating bobbins 37,38,39 are employed, it goes without saying that one or two kinds of insulating bobbins, for example the insulating bobbin 37 alone, can be used to obtain substantially the same effects.

Though not mentioned in the above first through eighth embodiments, after the respective core segments are rotated relative to one another through the respective coupling portions so as to bend the respective core members into a ring-shaped configuration, the respective coupling portions may be fixedly secured through welding or the like, so that the rigidity of the respective core members can be significantly increased, making it possible to provide an iron core assembly with excellent mechanical strength.

Figure 37:
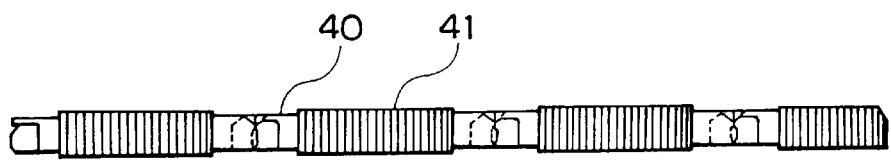
FIG. 37 is a plan view schematically illustrating the structure of core members of an iron core assembly according to the ninth embodiment, but having a different structure from that shown in FIG. 36.
Figure 38:
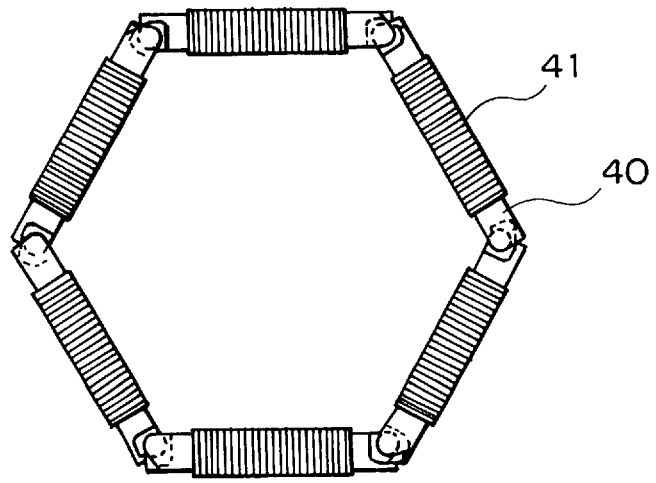
FIG. 38 is a plan view schematically illustrating an iron core assembly in which a plurality of core members shown in FIG. 37 have been formed into a ring-shaped configuration.

Further, although it has been described in the above first through ninth embodiments that the present invention is applied to an iron core assembly for an electric motor, it is to be understood that the present invention is not limited to such specific examples. For instance, as illustrated in FIG. 37, a laminated core may comprise a plurality of in-line core segments 40 (without any magnetic pole tooth) in place of the core segments each having a magnetic pole tooth as employed in the first embodiment. The laminated core, after having been wound with wires 41, are bent about coupling portions through their relative rotation to form a ring-shaped or rectangular-shaped iron core assembly, as shown in FIG. 38. The iron core assembly thus formed can off course be used for a transformer such as zero-phase-sequence current transformer and the like with substantially the same effects as described above. In the case of the iron core assembly used for a current transformer, it is preferred that the abutting engagement of the opposite ends of the laminated core be achieved by surface-to-surface abutments in the edge portions of core segments adjoining each other in the laminating direction thereof, so as to reduce magnetic resistance at the opposite ends of the laminated core.

Embodiment 10

Figure 39:
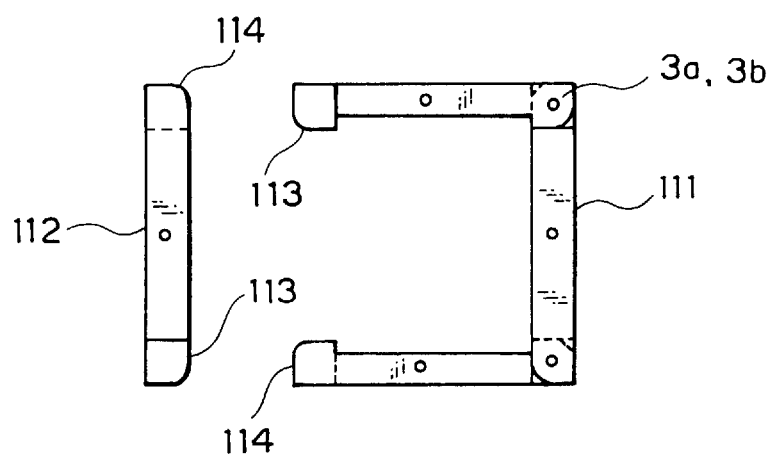
FIG. 39 is a plan view of laminated core units before assemblage of an iron core assembly according to a tenth embodiment of the present invention.
Figure 40:
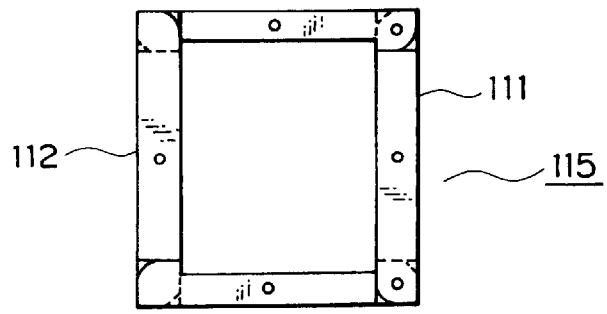
FIG. 40 is a plan view illustrating an iron core assembly constructed from the laminated core units of FIG. 39.

FIG. 39 is a plan view of an iron core assembly according to a tenth embodiment of the present invention, but showing its state before assembling, and FIG. 40 is a plan view of the iron core assembly of FIG. 39 after assemblage thereof.

In FIG. 39, the iron core assembly of this embodiment includes a first laminated core unit 111 and a second laminated core unit 112. In fact, the iron core assembly of this embodiment is equivalent to the laminated core of the ninth embodiment shown in FIG. 37 that is divided into two laminated core units, and the first and second laminated core units 111, 112 are constructed just in the same manner as the laminated core of FIG. 37.

Specifically, the first laminated core unit 111 is comprised of a plurality of first core members each having three plate-shaped first core segments (having no magnetic pole tooth) successively disposed in a line, and a plurality of second core members each having three plate-shaped second core segments (having no magnetic pole tooth) successively disposed in a line. The first and second core members are alternately laminated one over another in such a manner that respective first inter-segment positions (i.e., clearances or interstices between adjacent core segments of each first core member) are displaced or offset from respective second inter-segment positions (i.e., clearances or interstices between adjacent core segments of each second core member) in the longitudinal direction of the first and second core members, with end edge portions of the respective core segments adjoining each other in the laminating direction being overlapped each other. The adjacent end edges of the adjoining core segments are connected with each other by virtue of coupling means in the form of concave and convex portions 3a, 3b mutually engageable with each other. The first laminated core unit 111 has opposite ends 113, 114 each formed into a concave-convex configuration in which concaves and convexes defined by alternately laminated first and second core segments of the first and second core members are alternately disposed in the laminating direction.

The second laminated core unit 112 is comprised of a plurality of first core members each having one plate-shaped first core segment (having no magnetic pole tooth), and a plurality of second core members each having one plate-shaped second core segment (having no magnetic pole tooth). The first and second core members are alternately laminated one over another in such a manner that the first and second core members are displaced or offset from each other in the longitudinal direction of the first and second core members. Similar to the first laminated core unit 111, the second laminated core unit 112 has opposite ends 113,114 each formed into a concave-convex configuration in which concaves and convexes defined by alternately laminated first and second core segments of the first and second core members are alternately disposed in the laminating direction.

Here, note that in order for adjacent ends 113, 114 of the first and second laminated core units 111, 112 to be alternately inserted into each other and placed into mutual abutting engagement in a smooth manner, there is provided no coupling means (i.e., concave and convex portions 3a, 3b) at the opposite ends 113, 114 of the first core units.

Although in the ninth embodiment of FIG. 37, a single laminated core unit as a whole is formed into a rectangular configuration by rotating the respective core segments 40 relative to each other to provide an iron core assembly, in the tenth embodiment shown in FIGS. 39, 40, the respective core segments of the first laminated core unit 111, after having been wound with wires (not shown), are rotated relative to each other through the coupling means (i.e., the engaged concave and convex portions 3a, 3b) i so that the concaves and convexes at the opposite ends 113,114 of the first and second laminated core units 111, 112 are mutually inserted and combined with each other to form a rectangular configuration, thus producing an iron core assembly 40 for use with a transformer, as shown in FIG. 40. In this manner, assembling divided laminated core units serves to improve an operational efficiency because the entire laminated core can be divided into a plurality of core units having a size suitable for handling or working.

Embodiment 11

Figure 41:
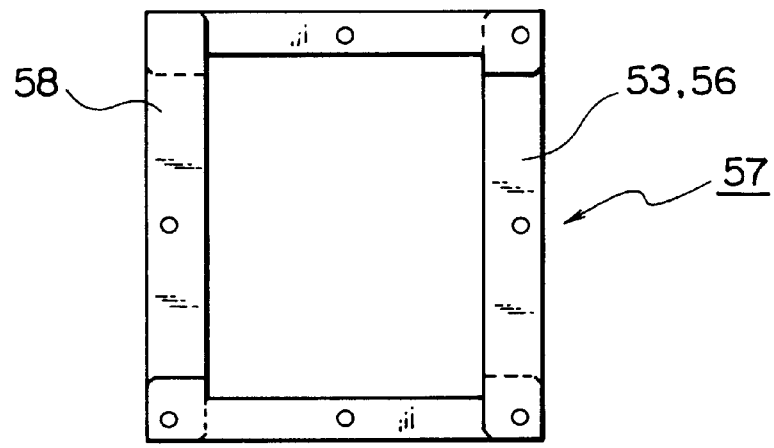
FIG. 41 is a front elevation view schematically illustrating the structure of an iron core assembly for a zero-phase-sequence current transformer according to an eleventh embodiment of the present invention.
Figure 42A:
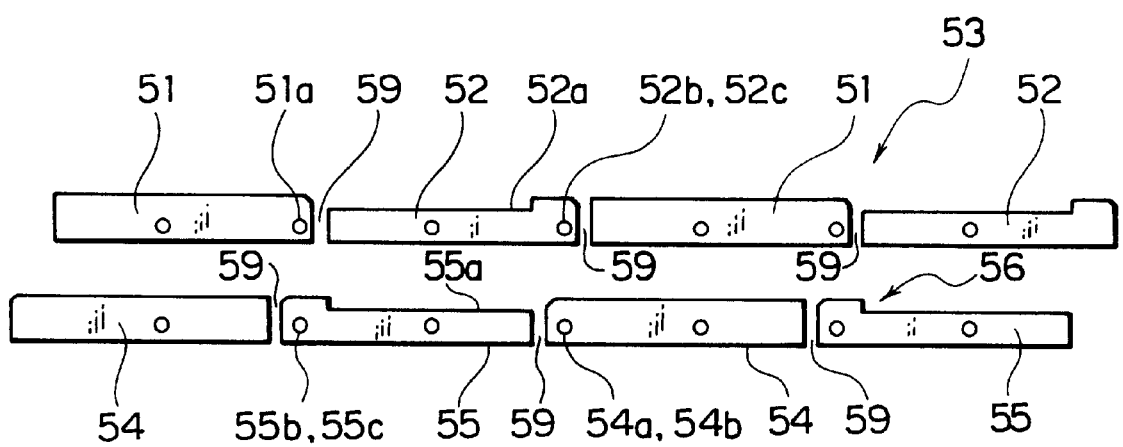
FIGS. 42(A) and 42(B) are plan views illustrating process steps for a method of assembling core members of the iron core assembly shown in FIG. 41.
Figure 42B:
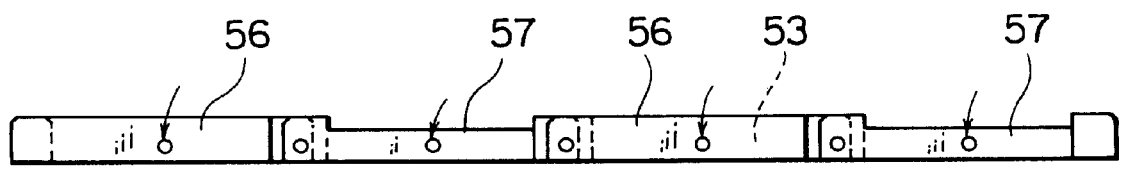
Figure 43:
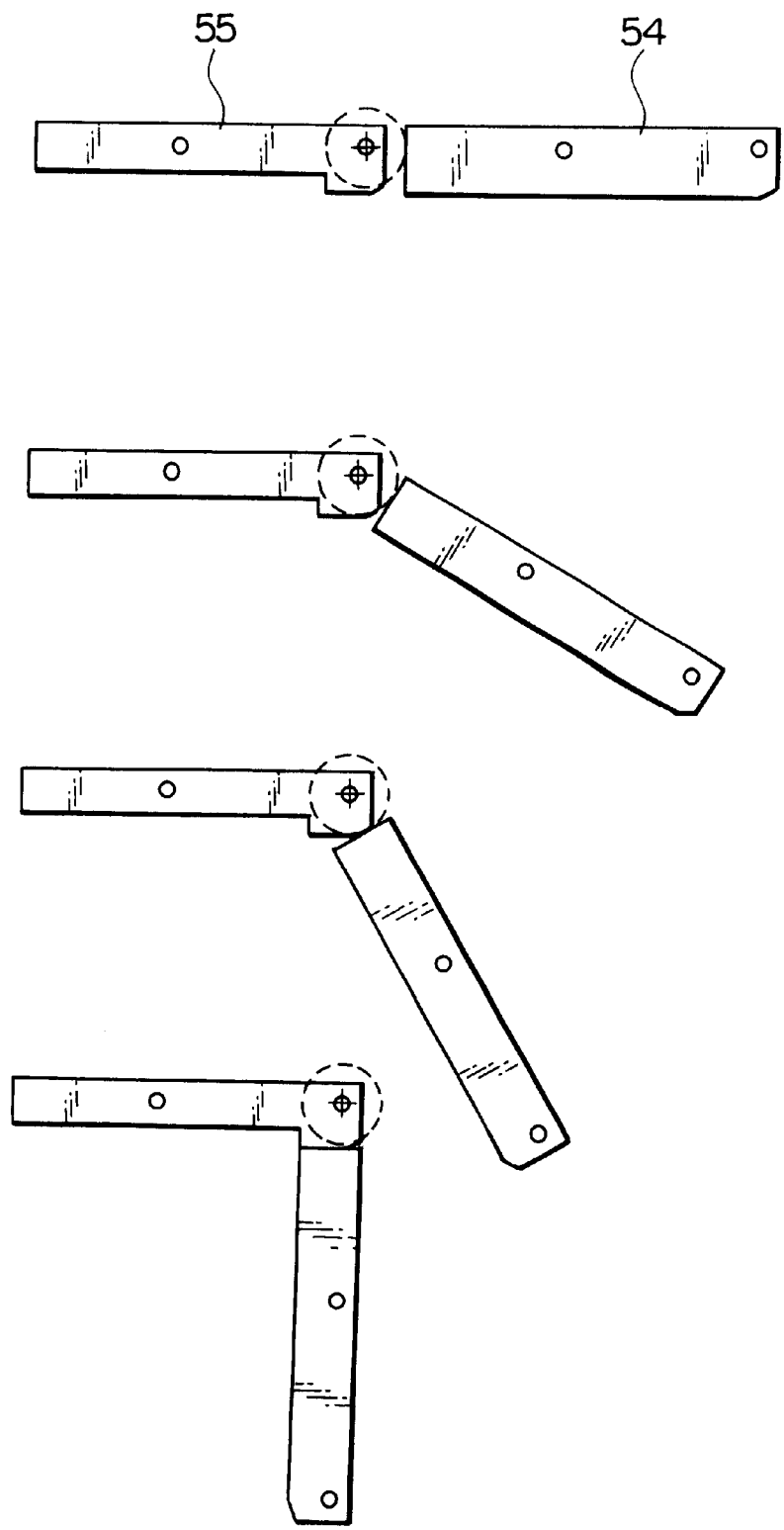
FIG. 43 is an operation diagram illustrating steps for bending a core member through rotation of coupling means.
Figure 44A:
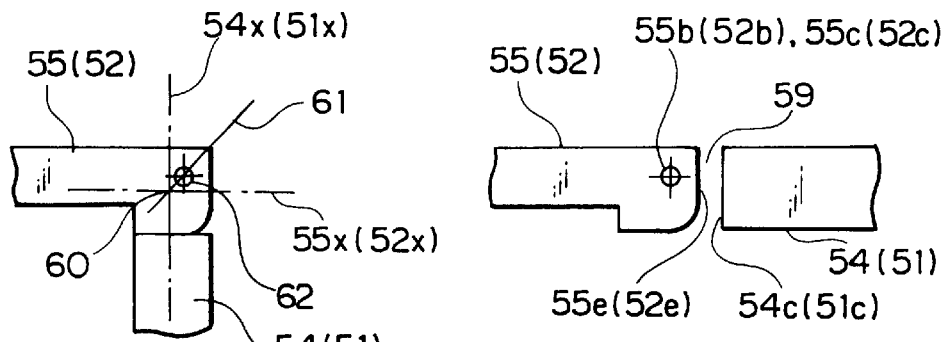
FIGS. 44(A) through 44(D) are view illustrating the principle of the present invention.
Figure 44B:
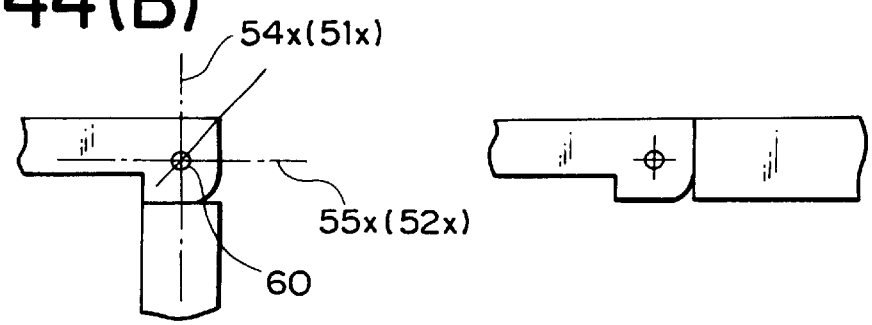

FIG. 41 is a front view showing the structure of an iron core assembly for a zero-phase-sequence current transformer according to a eleventh embodiment of the present invention. FIGS. 42(A) and 42(B) are plan views illustrative of process steps for a method of assembling core members of the iron core assembly of FIG. 1. FIG. 43 is an operation diagram illustrative of process steps for bending the core members by rotating or turning coupling means. FIGS. 44(A) through 44(B) are views for explaining the principle of the present invention.

In these figures, an iron core assembly 57 includes a plurality of first and second core members 53, 56 which are alternately laminated one over another.

As shown in FIG. 42(A), each first core member 53 comprises a plurality of two kinds of first core segments 51, 52 which are successively and alternately disposed in a line with a clearance formed therebetween. One kind of first core segments 51 are each made of a flat or plate-shaped magnetic material and provided on its front and back surfaces at its one end with a concave portion 51a and a convex portion 51b serving as a coupling means. The other kind of first core segments 52 are each made of a flat or plate-shaped magnetic material as in the case of the one kind of first core segments 51, and provided in its body with a notched portion 52a around which a wire (not shown) is wound, and on its front and back surfaces at its one end with a concave portion 52b and a convex portion 52c serving as a coupling means.

Similarly, each second core member 56 comprises a plurality of two kinds of second core segments 54, 55 which are successively and alternately disposed in a line with a clearance formed therebetween. One kind of second core segments 54 are each made of a flat or plate-shaped magnetic material and provided on its front and back surfaces at the other end thereof with a concave portion 54a and a convex portion 54b serving as a coupling means. The other kind of second core segments 55 are each made of a flat or plate-shaped magnetic material as in the case of the one kind of second core segments 54, and provided in its body with a notched portion 55a around which a wire (not shown) is wound, and on its front and back surfaces at the other end thereof with a concave portion 55b and a convex portion 55c serving as a coupling means.

The concave and convex portions 51a, 51b and 52b, 52c of the first core segments 51 and 52, respectively, and the concave and convex portions 54a, 54b and 55b, 55c of the second core segments 54 and 55, respectively, are provided at a location 62 which is on the outer side (i.e., on the side opposite the center of the iron core assembly for the zero-phase-sequence current transformer) away from an intersection 60 of widthwise centerlines 54x (51x) and 55x (52x) of the respective core segments 54 (51) and 55 (52), and which is on a bisector 61 for an angle formed by the two centerlines 54x (51x) and 55x (52x), as shown in FIG. 44(A). In this connection, note that the widthwise centerlines of the core segments 52,55 having the notched portions 52a, 55a, respectively, are the same as those of the core segments 52, 55 having no notched portions.

As shown in FIG. 42(B), a plurality of first core members 53 and a plurality of second core member 56 are alternately stacked or laminated in a manner such that first inter-segment positions (i.e., clearances or interstices between every two adjacent core segments 51, 52) of each first core member 53 are displaced or offset from second inter-segment positions (i.e., clearances or interstices between every two adjacent core segments 54, 55) of each second core member 56, with the edge portions of core segments adjoining each other in the laminating direction of the first and second core members 53, 56 being overlapped each other. In the end edge portions of core segments 51, 52, 54, 55 that are adjacent in the laminating direction, the concave and convex portions 51a, 52b and 51b, 52c of the core segments 51 and 52 of the first core member 53 are respectively engaged with the corresponding concave and convex portions 55b, 55c and 54a, 54b of the core segments 55 and 54 of the second core member 56 to rotatably couple the core segments.

Then, the first and second core members 53, 56 are formed in succession by press-punching, and in a step for stacking or laminating them, the respective concave and convex portions 51a, 52b and 51b, 52c, which are opposed to each other in the direction in which the core segments 51, 52, 54, 55 are stacked or laminated, are engaged with each other, and formed into one piece by caulking at, for example, the positions indicated by arrows in FIG. 42(B) thereby to make a laminated core unit 57. After wires (not shown) are wound around the notched portions 52a, 55a of the core segments 52, 55, the laminated first and second core members 53, 56 are bent by rotating or turning the laminated core segments 51, 52, 54, 55 around the engaged concave and convex portions 51a, 52b and 51b, 52c to form them into a rectangular shape, thus completing an iron core assembly 58, as shown in FIG. 41.

According to the iron core assembly 58 of the eleventh embodiment as constructed above, the position of each of coupling means or sections of the first core segments 51, 52 of the first core member 53 and the second core segments 54, 55 of the second core member 56, i.e., the position of each of concave and convex portions, is set at the location 62 which is on the outer side (i.e., on the side opposite the center of the iron core assembly for the zero-phase-sequence current transformer) away from the intersection 60 of the widthwise centerlines 54x (51x) and 55x (52x) of the core segments 54 (51) and 55 (52), and which is on the bisector 61 for the angle formed by the two centerlines 54x (51x) and 55x (52x), as shown in FIG. 44(A). Hence, the opposing end faces 51c, 52e and 54c, 55e of adjacent two core segments 51, 52 and 54, 55 are abutted against each other in full contact when the iron core assembly 58 has been fabricated, whereas an appropriate clearance or gap 59 can be allowed therebetween when press-cutting adjacent two core segments 51, 52 and 54, 55, as shown in FIG. 42(A). Thus, easy press-punching operation can be accomplished without causing deterioration in the magnetic performance of the iron core assembly 58.

If the position of each of concave and convex portions 54a (51a), 54b (51b) and 55b (52b), 55c (52c) were set at the same location where the intersection 60 of the centerlines 54x (51x) and 55x (52x) exists as shown in FIG. 4(B), then the opposing end faces 51c, 52e and 54c, 55e of adjacent two core segments 51, 52 and 54, 55 would be in contact at the time of press-punching. Therefore, the press-punching operation would be difficult although the magnetic performance would not be deteriorated.

Figure 44C:
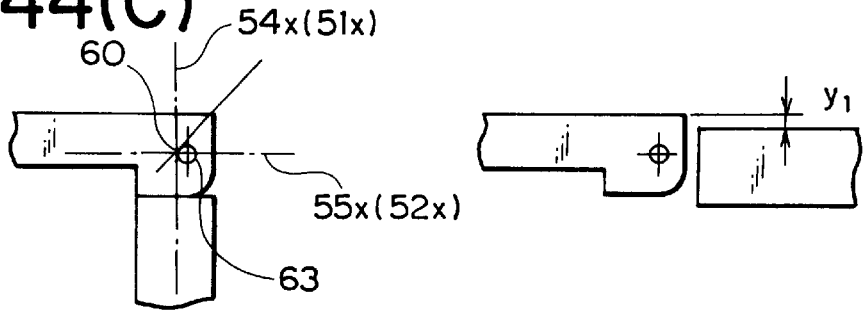

On the other hand, if the position of each of concave and convex portions 54a (51a), 54b (51b) and 55b (52b), 55c (52c) were set at a location 63 on the centerline 55x (52x) and on the outer side away from the intersection 60 of the centerlines 54x (51x) and 55x (52x) as shown in FIG. 44(C), then a clearance or gap would be formed between the opposing end faces 51c, 52e and 54c, 55e of adjacent two core segments 51,52 and 54,55 when press-punching them, making the press-punching operation easy, whereas the yield of the core materials would be reduced because of a difference $y_1$ in level produced between adjacent two core segments. In this regard, however, though it is preferred that the position of each concave and convex portion is set at the location 62 which is on the outer side away from the intersection 60 and on the bisector 61, if the difference $y_1$ is allowed, it is feasible to set the position of each concave and convex portions at a location on the centerline 55x (52x) and on the outer side a certain distance (within the allowable difference $y_1$) away from the bisector 61.

Figure 44D:
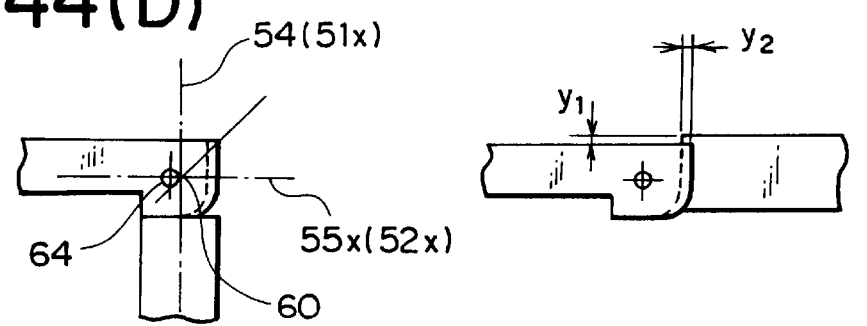

Further, if the position of each of concave and convex portions 54a (51a), 54b (51b) and 55b (52b), 55c (52c) were set at a location 64 on the centerline 55x (51x) and on the inner side from the centerline 54x (51x) as shown in FIG. 44(D), then a difference $y_1$ in level would be produced between adjacent two core segments 54 (51) and 55 (52) when press-punching them, with a resultant lower yield of the core materials as in the case shown in FIG. 4(C) and there would be also a problem in that the press-punching could not be effected because the end faces 51c, 52e and 54c, 55e of adjacent two core segments 51, 52 and 54, 55 would overlap each other by an amount of difference $y_2$.

Embodiment 12

Figure 45:
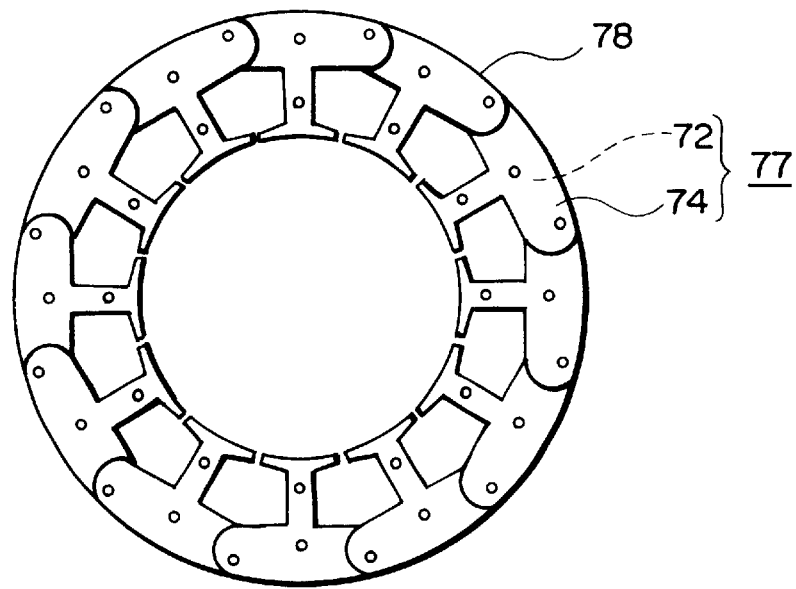
FIG. 45 is a front elevation view schematically illustrating the structure of an iron core assembly for an electric motor according to a twelfth embodiment of the present invention.
Figure 46A:
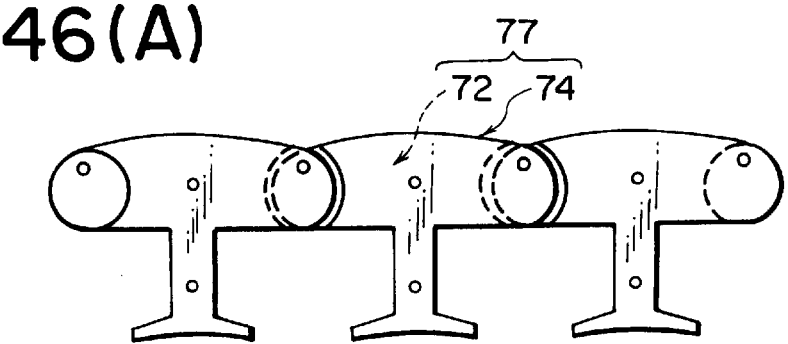
FIGS. 46(A) through 46(C) are plan views illustrating process steps for a method of assembling core members of the iron core assembly shown in FIG. 41.
Figure 46B:
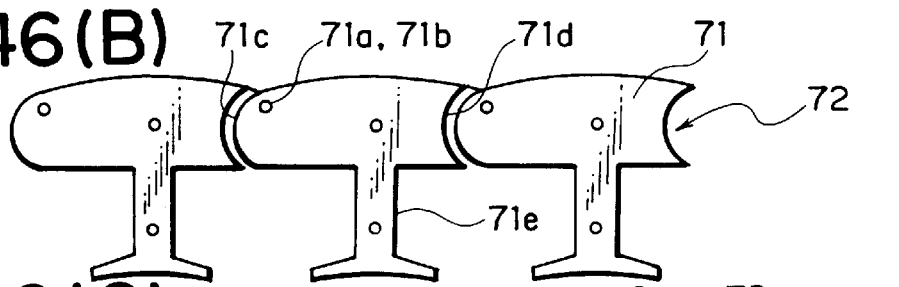
Figure 46C:
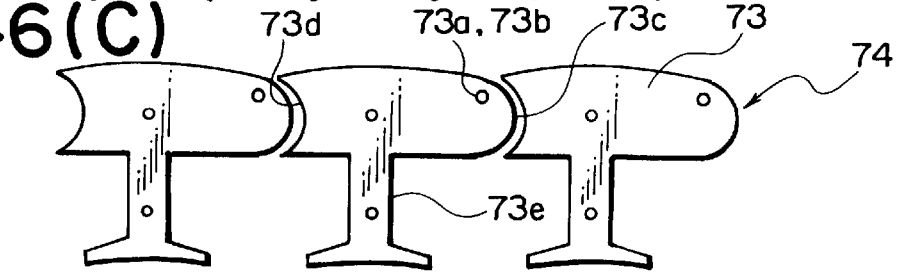
Figure 47A:
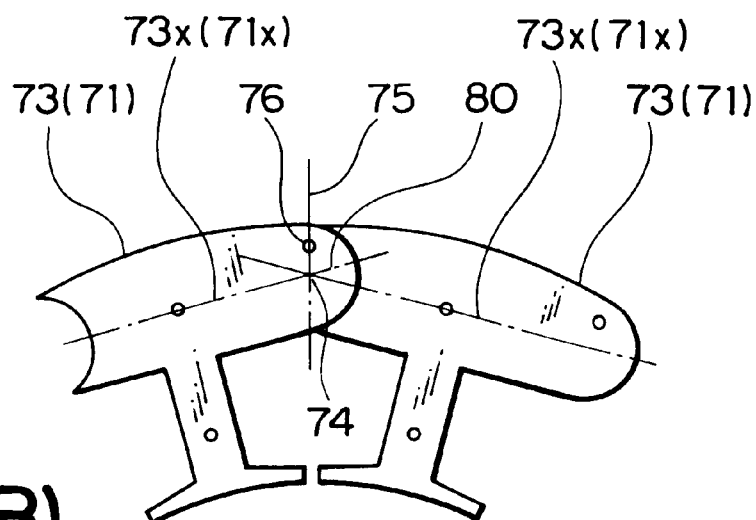
FIGS. 47(A) and 47(B) are plan views illustrating the structure of essential portions of a core member shown in FIG. 46, but respectively showing different operating conditions thereof.
Figure 47B:
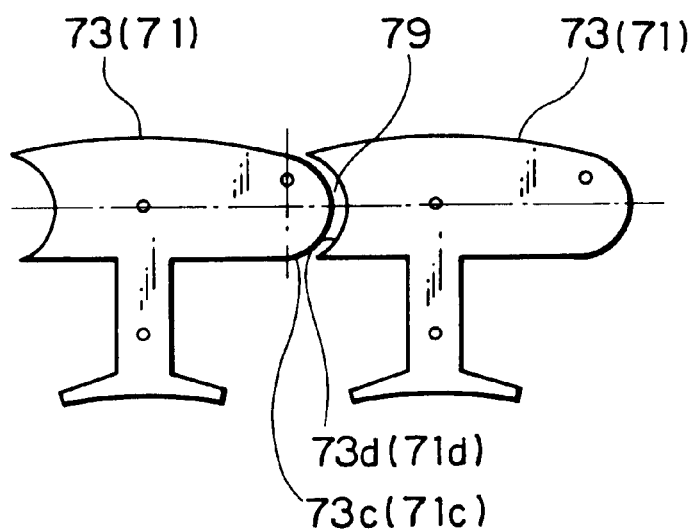

FIG. 45 is a front view showing the structure of an iron core assembly for an electric motor according to a twelfth embodiment of the present invention. FIGS. 46(A), 46(B) and 46(C) are plan views respectively showing process steps of a method of assembling core members of the iron core assembly of FIG. 45. FIGS. 47(A) and 47(B) are plan views respectively showing the structure of essential portions of the iron core assembly of FIG. 46 but in their different states.

In FIG. 45, an iron core assembly 77 includes a plurality of first and second core members 72,74 which are alternately laminated one over another, as shown in FIG. 46(A).

As shown in FIG. 46(B), each first core member 72 comprises a plurality of first core segments 71 which are successively disposed side by side in a line with a clearance or gap formed therebetween. The first core segments 71 are each made of a flat or plate-shaped magnetic material and provided on its front and back surfaces at its one end with a concave portion 71a and a convex portion 71b serving as a coupling means. Each of first core segments 71 has a convex-shaped end face 71c at one end thereof, a concave-shaped end face 71d at the other end thereof which is complementary in shape to and engageable with a convex-shaped end face 73c of an adjacent first core segment 71, and a magnetic pole piece 71e which extends inward from the center thereof and around which a wire (not shown) is wound.

Similarly, each second core member 74 comprises a plurality of second core segments 73 which are successively disposed side by side in a line with a clearance formed therebetween. The second core segments 73 are each made of a flat or plate-shaped magnetic material and provided on its front and back surfaces at the other end thereof with a concave portion 73a and a convex portion 73b serving as a coupling means. Each of second core segments 73 has a concave-shaped end face 73d at one end thereof, a convex-shaped end face 73c at the other end thereof which is complementary in shape to and engageable with a concave-shaped end face 73d of an adjacent second core segment 73, and a magnetic pole piece 73e which extends inward from the center thereof and around which a wire (not shown) is wound.

The concave and convex portions 71a, 73a and 71b, 73b of the first and second core segments 71 and 73, respectively, are each provided at a location 76 which is on the outer side (i.e., on the side opposite the center of the iron core assembly for the electric motor) away from an intersection 74 of widthwise centerlines 73x (71x) and 73x (71x) of the respective core segments 73 (71) and 73 (71), and which is on a bisector 75 for an angle formed by the two centerlines 73x (71x) and 73x (71x), as shown in FIG. 47(A). In this connection, note that the widthwise centerlines 73x, 71x of the core segments 73, 71, respectively, are a little different at their ends and center, but this makes substantially no difference from a practical point of view.

As shown in FIG. 46(A), a plurality of first core members 72 and a plurality of second core members 74 are alternately stacked or laminated in a manner such that first intersegment positions (i.e., clearances or interstices between every two adjacent core segments 71, 71) of each first core member 72 are displaced or offset from second intersegment positions (i.e., clearances or interstices between every two adjacent core segments 73, 73) of each second core member 74, with the edge portions of core segments adjoining each other in the laminating direction of the first and second core members 72, 74 being overlapped each other. In the end edge portions of core segments 71, 73 that are adjacent in the laminating direction, the concave and convex portions 71a, 71b of the core segments 71 of the first core member 72 are respectively engaged with the corresponding convex and concave portions 73b, 73a of the core segments 73 of the second core member 74 to rotatably couple the core segments.

Then, the first and second core members 72, 74 are formed in succession by press-punching, and in a step for stacking or laminating them, the respective concave and convex portions, which are opposed to each other in the direction in which the first and second core members 72, 74 are stacked or laminated, are engaged with each other, and formed into one piece by caulking at, for example, the central positions of the core segments thereby to make a laminated core unit 77, as shown in FIG. 46(A). After wires (not shown) are wound around the magnetic pole teeth 71e of the core segments 71, 73, the laminated first and second core members 72, 74 are bent by rotating or turning the laminated core segments 71, 73 around the engaged concave and convex portions 71a, 73b and 71b, 73a to form them into a rectangular shape, thus completing an iron core assembly 78, as shown in FIG. 45.

According to the twelfth embodiment as constructed above, the position of each of coupling means or sections of the respective core segments 71, 73, i.e., the position of each of concave and convex portions, is set at the location 76 which is on the outer side (i.e., on the side opposite the center of the iron core assembly for the electric motor) away from the intersection 74 of the widthwise centerlines 73x, 73x of the core segments 73 (71) and 73 (71) adjoining each other in the laminating direction, and which is on the bisector 75 for an angle formed by the two centerlines 73x (71x) and 73x (71x), as shown in FIG. 47(A). Thus, the opposing end faces 73c, 73d and 71c, 71d of adjacent two core segments 73, 73 and 71, 71 are abutted against each other in full contact when the iron core assembly 78 has been fabricated as shown in FIG. 47(A), whereas an appropriate clearance or gap 79 can be allowed therebetween when press-cutting adjacent two core segments 73, 73 and 71, 71, as shown in FIG. 47(B). Thus, easy press-punching operation can be accomplished without causing deterioration in the magnetic performance of the iron core assembly 79.

If the position of each of concave and convex portions 71a, 73a and 71b, 73b were set at a location 80 which is on a centerline 73x (71x) (i.e., left-hand one in FIG. 47(A)) of a core segment 73 and to the right from a bisector 75 for an angle formed by the centerlines 73x (71x) and 73x (71x) as shown in FIG. 47(A), then a clearance or gap would be formed between the opposing end faces 73c, 73d and 71c, 71d of adjacent two core segments 73, 73 and 71, 71 when press-punching them, making the press-punching operation easy, whereas the yield of the core materials would be reduced because of a difference $y_1$ in level produced between adjacent two core segments 73, 73 or 71, 71, as shown in FIG. 44(C). In this regard, however, though it is preferred that the position of each concave and convex portion is set at the location 76 which is on the outer side away from the intersection 74 and on the bisector 75, if the difference $y_1$ is allowed, it is feasible to set the position of each concave and convex portions at a location on the centerline 73x (71x) and on the outer side a certain distance (within the allowable difference $y_1$) away from the bisector 75.

Figure 48A:
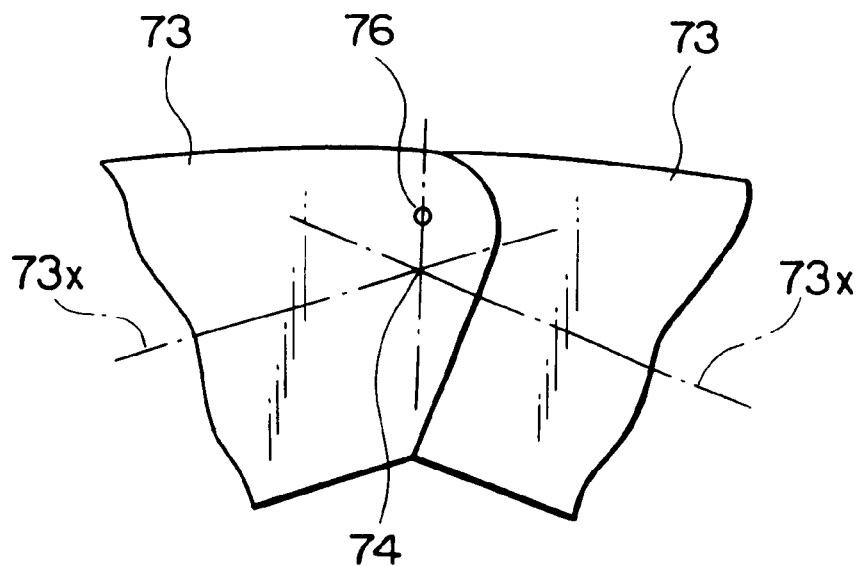
FIGS. 48(A) and 48(B) are plan views respectively illustrating essential portions of adjacent core segments with different coupling sections.
Figure 48B:
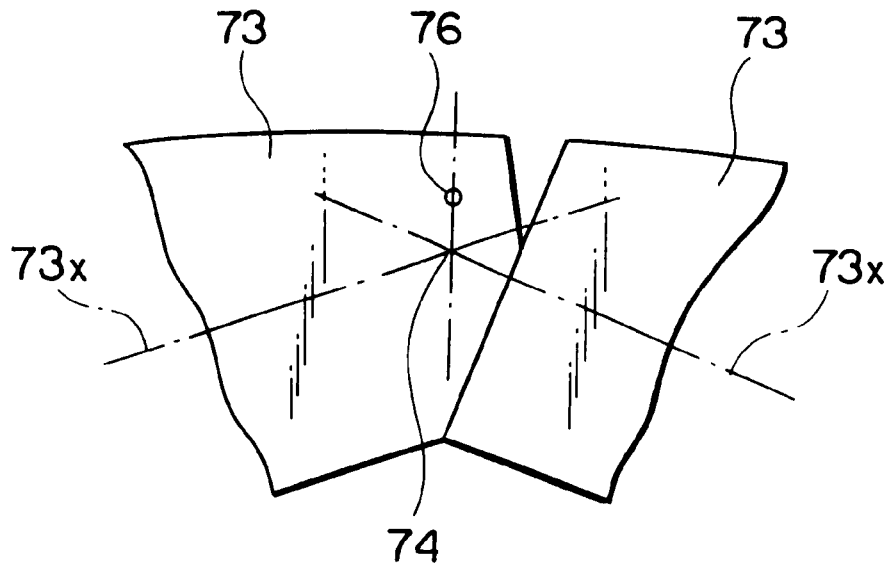

FIGS. 48(A) and 48(B) are plan views respectively showing essential portions of adjacent core segments disposed in a circumferential direction of the core assembly but with different coupling means between the adjacent core segments. In FIGS. 48(A) and 48(B), the same symbols as those in FIG. 47 designate the corresponding parts in FIG. 47. In FIG. 48(A), a core segment 73 is formed at one end thereof with one end face which comprises a concave arc-shaped portion and a straight line portion, and at the other end with the other end face which comprises a convex arc-shaped portion complementary in shape to the concave arc-shaped portion and a straight line portion. When the adjacent core segments 73 are turned or rotated relative to each other around a location 76 of a coupling means or section to form an annular or ring-shaped iron core assembly, the adjacent end faces thereof come into abutting engagement along their entire length with each other. FIG. 48(A) shows the state of such abutting engagement. In FIG. 48(B), each core segment 73 has one end face comprising a straight line, and the other end face formed into a convex-shaped or angular configuration comprising two straight lines. When the adjacent core segments are relatively turned or rotated about a location 76 of a coupling means to form an annular or ring-shaped core assembly, the adjacent end faces thereof are partially placed into abutting engagement with each other. FIG. 48(B) shows the state of such partial abutting engagement.

Here, note that in the eleventh and twelfth embodiments, the coupling means may comprise a pin and hole connection, as shown in FIG. 3, in place of the concave and convex connection.

Moreover, although in the above-mentioned eleventh and twelfth embodiments reference has been made to an iron core assembly for a zero-phase-sequence current transformer and one for an electric motor, respectively, it goes without saying that the present invention is not limited to these but may be applied to other electric equipment such as general transformers with substantially the same effects.

Embodiment 13

Figure 49A:
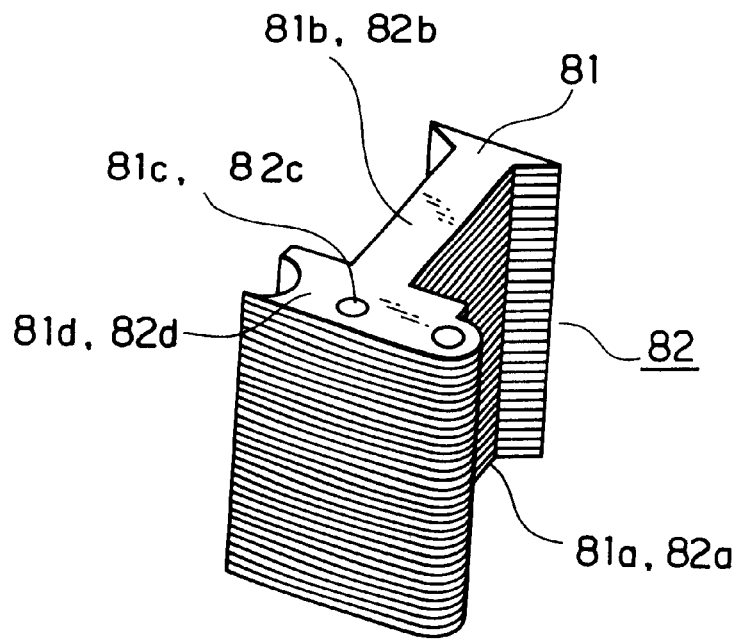
FIGS. 49(A) and 49(B) are perspective views of a first and a second core segment block, respectively, illustrating a core pressing process according to a thirteenth embodiment of the present invention.
Figure 49B:
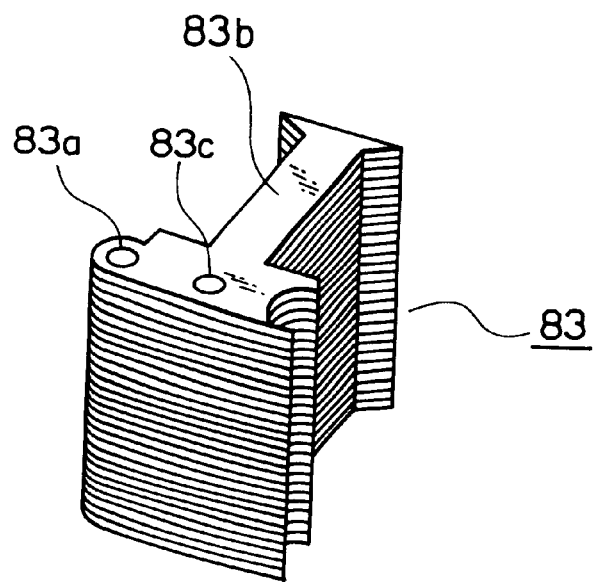
Figure 50:
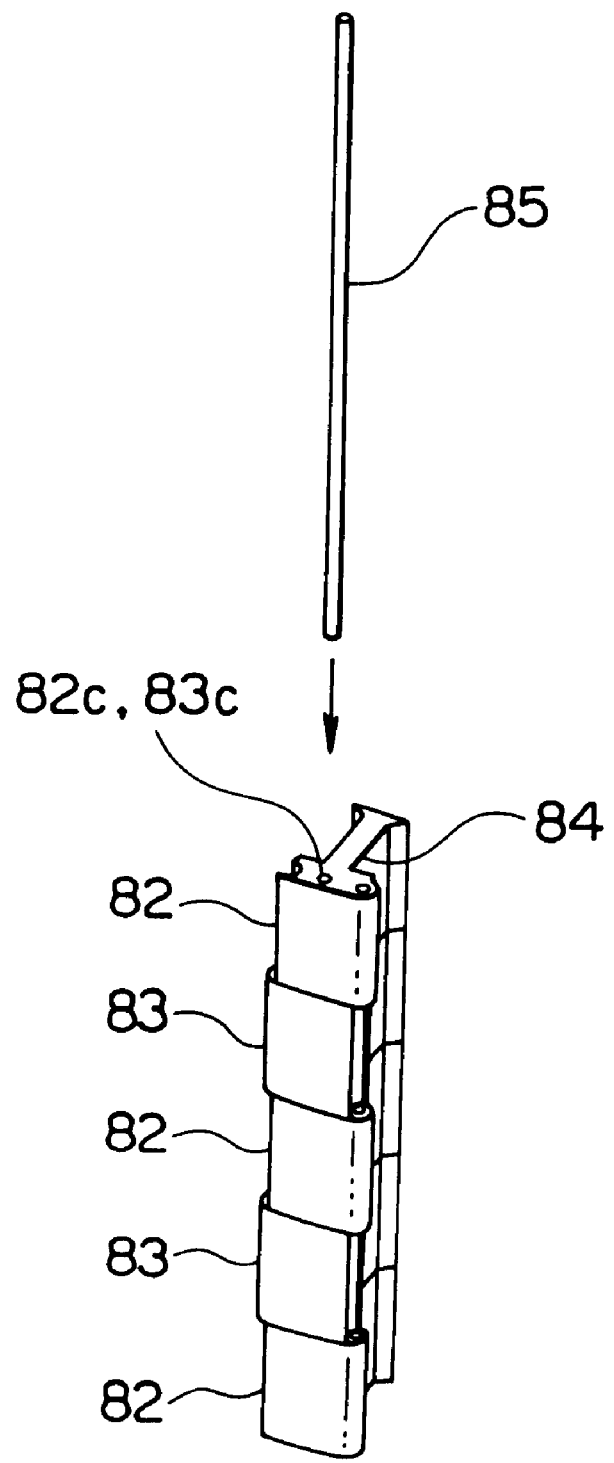
FIG. 50 is a perspective view illustrating an axially coupling process for axially coupling a plurality of core segment blocks stacked in a row.
Figure 51:
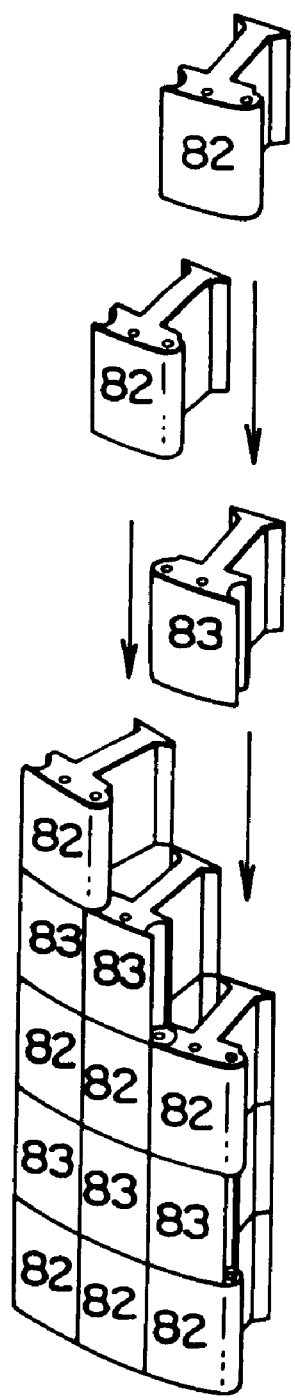
FIG. 51 is a developed perspective view of three-teeth core segment blocks, illustrating a stacking and arraying process.
Figure 52:
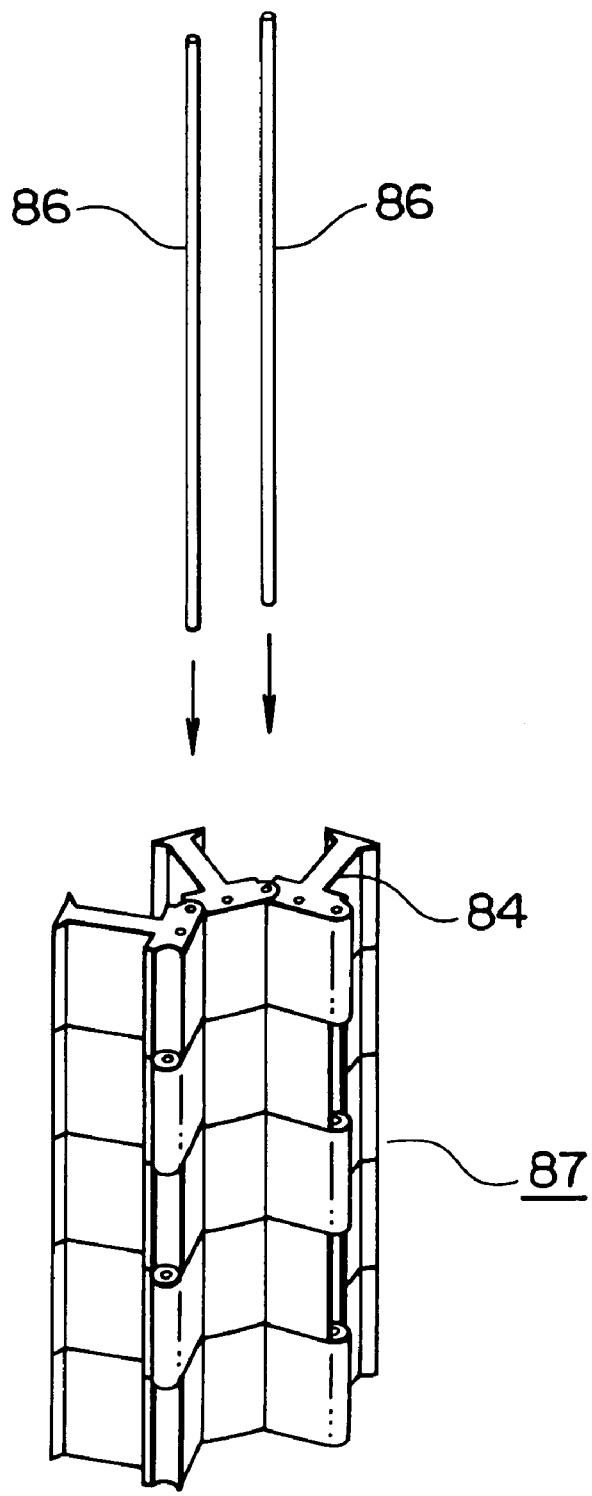
FIG. 52 is a developed perspective view of three-teeth core segment blocks, illustrating a temporal coupling process.
Figure 53:
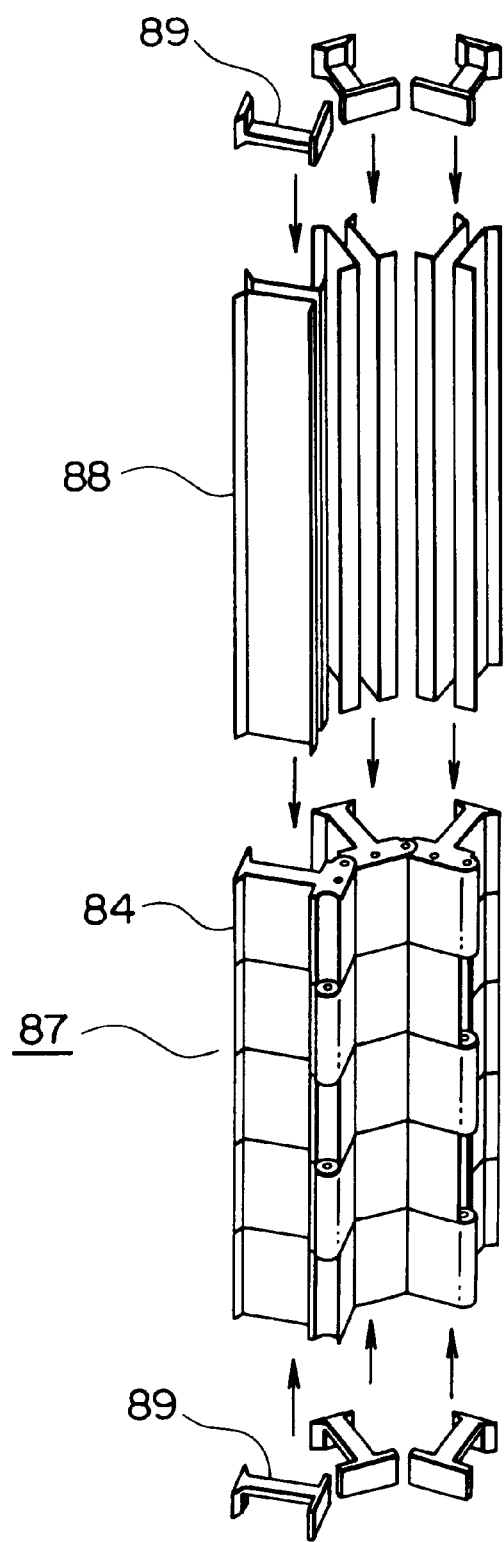
FIG. 53 is a developed perspective view of three-teeth core segment blocks, illustrating an insulation piece assembling process.
Figure 54:
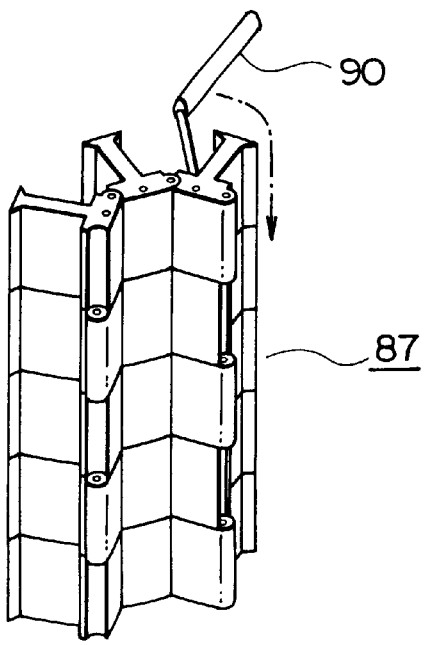
FIG. 54 is a perspective view of three-teeth core segment blocks, illustrating a wire-winding process.
Figure 55:
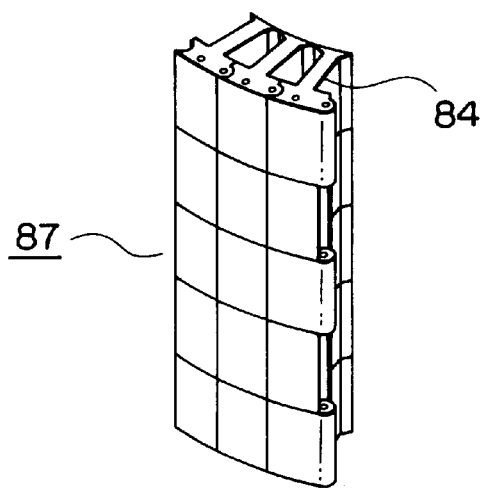
FIG. 55 is a perspective view, illustrating a three-teeth blocking and fixing process.
Figure 56:
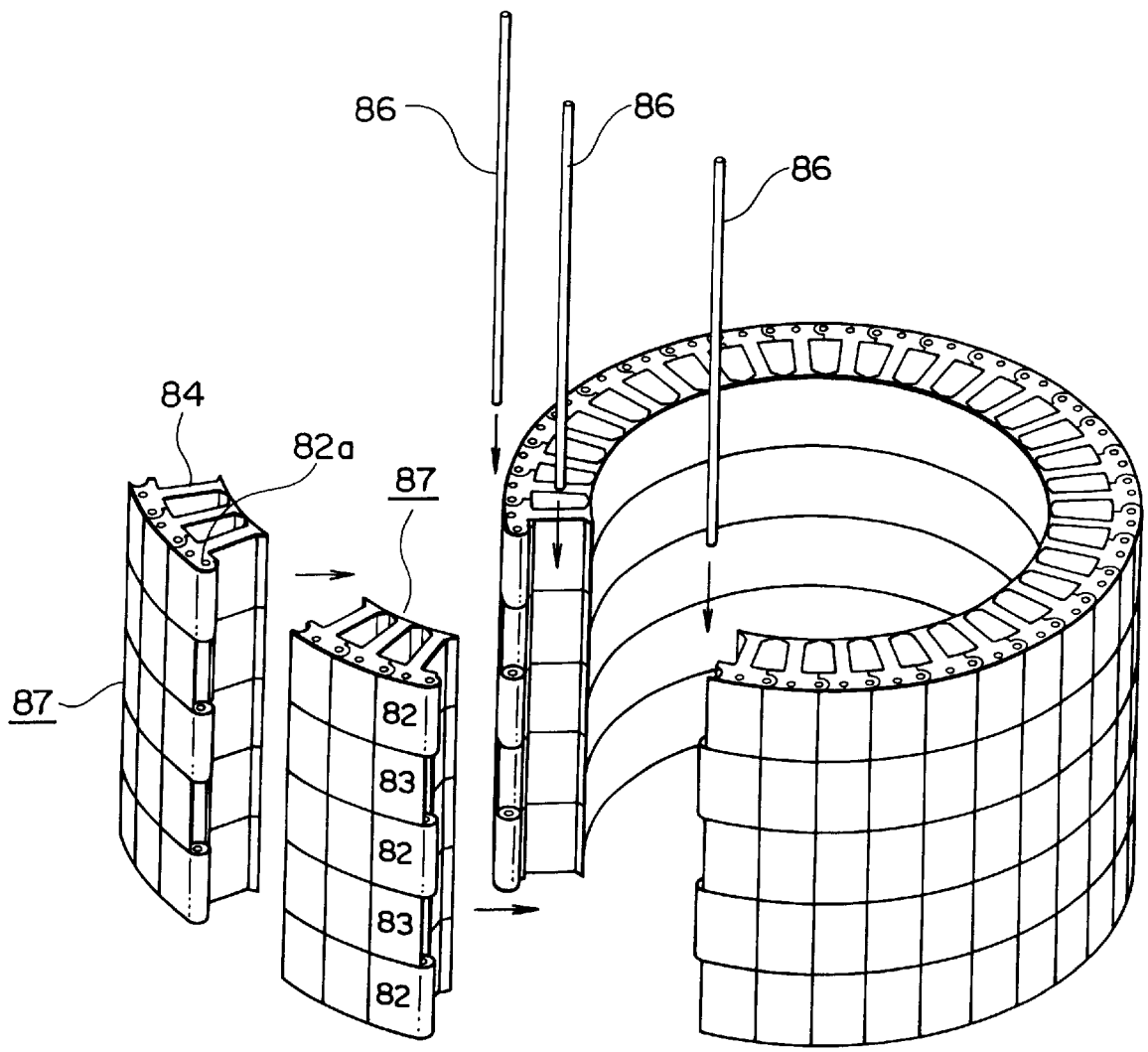
FIG. 56 is a development view of an iron core assembly, illustrating a circularly coupling process.
Figure 57:
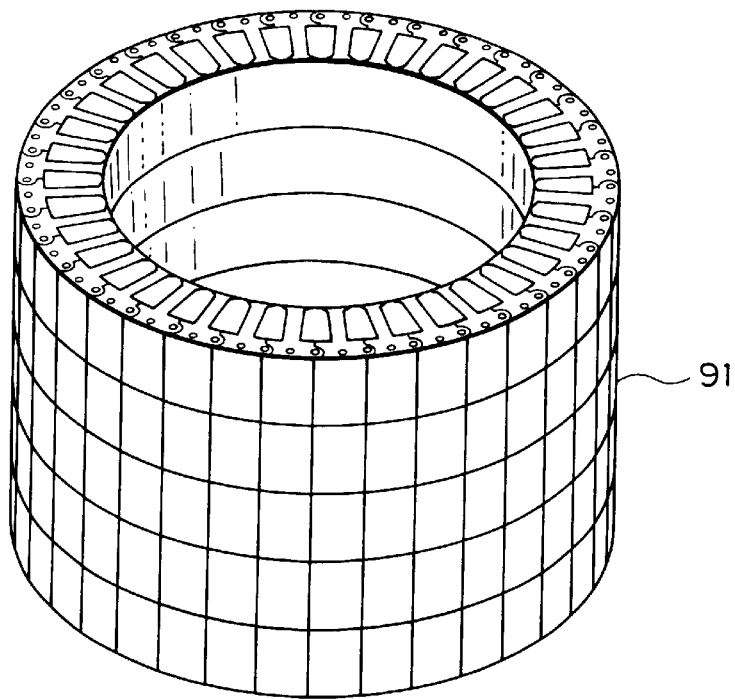
FIG. 57 is a perspective view of the iron core assembly, illustrating a wiring, varnishing, and shrinkage fitting process.
Figure 58:
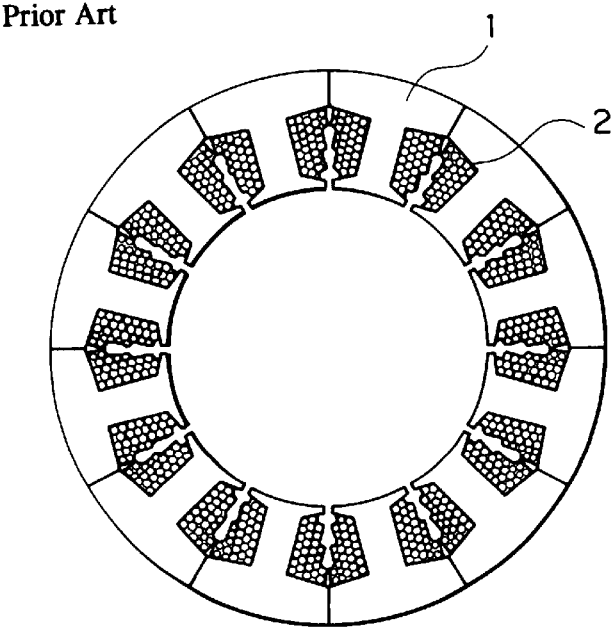
FIG. 58 is a plan view schematically illustrating the structure of a conventional iron core assembly for an electric motor.
Figure 59:
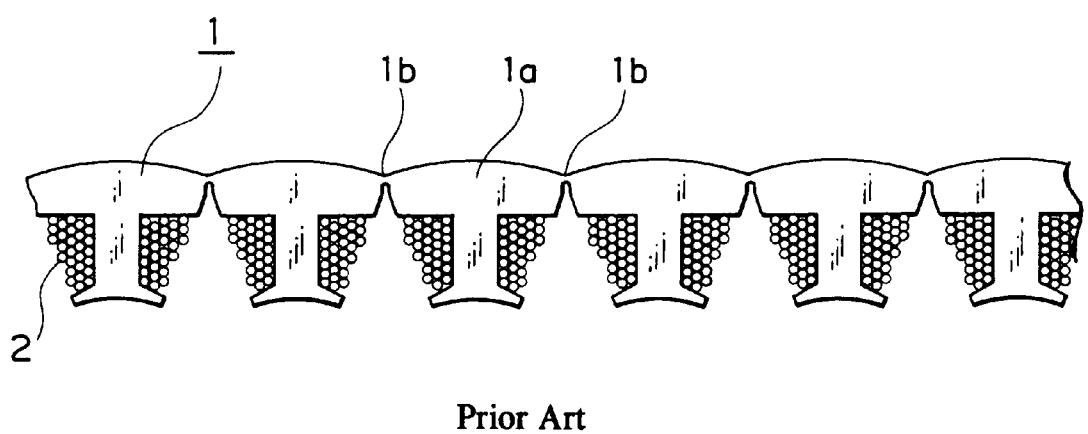
FIG. 59 is a plan view schematically illustrating the structure of a core member shown in FIG. 58.

FIGS. 49 through 57 are perspective views sequentially showing process steps for fabricating an iron core assembly suitable for a medium-sized electric motor in accordance with a thirteenth embodiment of the present invention. FIGS. 49(A) and 49(B) are perspective views of a core segment block, showing a core pressing process. FIG. 50 is a perspective view of core segment blocks stacked or laminated in a row, showing an axially coupling process therefor. FIG. 51 is a developed perspective view of three-teeth core segment blocks, showing a stacking and arraying process. FIG. 52 is a developed perspective view of three-teeth core segment blocks, showing a three-teeth temporal or preliminary coupling process. FIG. 53 is a developed perspective view of three-teeth core segment blocks showing an insulation piece assembling process. FIG. 54 is a perspective view of three-teeth core segment blocks showing a wire-winding process. FIG. 55 is a perspective view showing a three-teeth blocking and fixing process. FIG. 56 is a development view of an iron core assembly, showing a circularly coupling process. FIG. 57 is a perspective view of the iron core assembly, showing a wiring, varnishing, and shrinkage fitting process.

In the iron core assembly according to the thirteenth embodiment, a plurality of core segments 14 as in FIG. 17 of the third embodiment are stacked or laminated to form a core segment block, and hence a first core member is not formed of a single layer but of a plurality of layers (for instance, 100 layers). Also, a second core member is not formed of a single layer but of a plurality of layers. The fabrication process according to this embodiment will be described below in sequence.

In FIG. 49(A), a reference numeral 81 designates a planar or flat generally T-shaped core segment formed of a magnetic material. Each core segment 81 has a magnetic pole tooth 81b with a hole 81c formed therethrough and a head or cross piece 81d integrally formed therewith. The cross piece 81d has a hole 81a formed therethrough at one end edge portion thereof. The cross piece 81d is formed at one end thereof with a convex arc-shaped end face and at the other end with a concave arc-shaped end face which is complementary in shape to and engageable with a convex arc-shaped end face of an adjacent core segment. The core segment 81 is about 0.5 mm thick for example, and formed by press-punching, and about 100 pieces of core segments 81 are stacked to form a first core segment block 82. Though not shown, the respective core segments of the first core segment block 82 are, for example, placed into concave-convex engagement with each other so as to be integrally united together through caulking.

To this end, the first core segment block 82 as a whole has a hole 82a formed therethrough in the one end edge portion thereof, the hole 82a constituting a part of the coupling means. In this case, the hole 82a comprises a plurality of holes 81a in the respective core segments 81 of the first core segment block 82. The first core segment block 82 as a whole has a convex arc-shaped end face formed at one end thereof and a concave arc-shaped end face formed at the other end thereof so as to be engageable with an end face of an adjacent core segment block. Moreover, the first core segment block 82 has a magnetic pole tooth 82b which comprises a plurality of magnetic pole teeth 81b of the respective core segments 81 thereof, and a hole 82c which comprises a plurality of holes 81*c* in the respective core segments 81 thereof. A plurality of first core segment blocks 82 are disposed or arrayed in succession to form a first core segment member.

A second core segment block 83 shown in FIG. 49(B) is the reverse of the first core segment block 82, i.e., the one end edge portion thereof and the other end edge portion thereof being reversed with respect to each other. The second core segment block 83 has a hole 83*a* formed therethrough in the other end edge portion thereof, serving as a part of the coupling means, and a convex arc-shaped end face formed at one end thereof. The second core segment block 83 is formed at one end thereof with a concave arc-shaped end face engageable with an end face of an adjacent core segment block, a magnetic pole tooth 83*b* and a hole 83*c*. A plurality of second core segment blocks 83 are disposed or arrayed in succession to form a second core member.

FIG. 50 shows a plurality of first core segment blocks 82 and a plurality of second core segment blocks 83 alternately stacked or laminated one over another to form a one-tooth layer. In this case, three first core segment blocks 82 and two second core segment blocks 83 are stacked. In this regard, however, note that three first core segment blocks 82 may be successively stacked, and two second core segment blocks 83 may then be stacked successively thereon. A reference numeral 84 generally designates one tooth. of stacked or laminated core segment blocks. A pin member 85 is passed through the holes 82*c* and 83*c* in the first and second core segment blocks 82 and 83 to hold the one-tooth stacked core segment blocks 84 in their entirety in such a manner that they are rotatable relative to each other but coupled or jointed with each other in an axial direction. The pin member 85 may comprise a bolt and a nut.

When three-teeth first core segment blocks 82 and three-teeth second core segment blocks 83 are stacked in an array, they are stacked, for example, as shown in FIG. 51, but they can otherwise be stacked in any different and efficient manner independently of the direction of stacking and the direction of arraying. Thereafter, the thus stacked blocks are axially connected with each other tooth by tooth by means of the pin members 85 so as to be rotatable therearound relative to each other. Here, note that reference numerals 82 and 83 in FIG. 51 designate a first core segment block and a second core segment block, respectively.

In an initial state shown in FIG. 52, the hole 82*a* (part of the coupling means) in the one end edge portion of each first core segment block 82 and the hole 83*a* (part of the coupling means) in the other end edge portion of each second core segment block 83 are aligned in communication with each other in the stacking or laminating direction. Thus, the pin member 86 (part of the coupling means) is passed through these holes 82*a*, 83*a* to connect or joint the respective first and second core segment blocks 82, 83 with respect to each other tooth by tooth for rotation relative to each other. In this manner, three-teeth temporal or preliminary connections of three-teeth blocks 87 having stacked three teeth 84 are effected.

Next, an insulation piece assembling process will be described while referring to FIG. 53. In the three-teeth blocks 87 comprising the first and second core segment blocks 82 and 83 thus stacked and arrayed, the opposite sides of each tooth 84 are covered with insulation pieces 88, and the opposite ends of each tooth 84 are covered with insulation caps 89. In this manner, the teeth portions are covered with an insulating material in order to protect windings. In FIGS. 54 and 55 which illustrate the following assembling process steps, neither insulation pieces 88 nor insulation caps 89 are shown.

FIG. 54 illustrates a wire winding process in which three teeth 84 of the three-teeth blocks 87, being connected with each other by the coupling means comprising holes 82*a*, 83*a* and pins 86 inserted therethrough, are respectively turned or rotated tooth by tooth about the related pin members 86 with respect to each other so as to open or warp in a reversely or outwardly turned manner with an interval or span between the tip ends of adjacent teeth 84 being expanded from each other. In this reversely or outwardly warped state, each tooth 84 is wound by a winding wire by means of a wire supply nozzle 90 of a wire winding machine. Note that the winding wires are omitted and not shown in the figures showing the following process steps.

FIG. 55 shows a three-teeth blocking and fixing process in which the teeth 84 of the three-teeth blocks 87 are respectively turned about the coupling means so as to take a positively or inwardly warped or curved state, thus reducing the intervals or spans between the tip ends of the adjacent teeth 84 each having wires wound therearound. Then, the three-teeth blocks 87, which constitute a part of the annular or ring-shaped iron core assembly, are fixed.

FIG. 56 shows a circularly coupling process. In this figure, a plurality of three-teeth blocks 87 each having the winding wire and fixed are disposed and combined so as to form a part of a complete circle or ring, and then assembled with each other in such a manner that the holes 82*a* in the respective first core segment blocks 82 and the holes 83*a* in the respective second core segment blocks 83 are aligned in communication with each other in the stacking or laminating direction. A pin member 86 is inserted into associated aligned holes 82*a*, 83*a* in the adjacent three-teeth blocks 87 to connect or joint these three-teeth blocks 87. The following three-teeth blocks 87 are similarly connected with the thus connected body of the blocks. Repeating the above process, a complete enclosed or ring-shaped core structure is obtained.

FIG. 57 shows a wire-connecting process, a varnishing process and a shrinkage fitting process. In this figure, with the complete annular core structure thus formed, the respective windings on the three-teeth blocks 87 are connected with each other. Subsequently, a varnishing process and a shrinkage fitting process are carried out. Thus, an annular or ring-shaped core assembly 91 for an electric motor has been completed.

In this manner, the first core segment block 82 formed of a plurality of stacked first plate-shaped core segments and the second core segment block 83 formed of a plurality of plate-shaped stacked second core segments are arrayed and stacked or laminated. Then, a first core member comprising a plurality of successively arrayed first core segment blocks 82 and a second core member comprising a plurality of successively arrayed second core segment blocks 83 are alternately disposed in the stacking or laminating direction in such a manner that respective inter-block positions (i.e., clearances or gaps between adjacent core segment blocks) of the first core segment blocks 82 are displaced or offset from those of the respective second core segment blocks 83 in the longitudinal direction thereof, with the adjacent edges of respective core segment blocks adjoining each other in the stacking direction being overlapped one over another. The edge portions of the respective adjoining core segment blocks are connected mutually by coupling means 82*a*, 83*a*, 86. Thereafter, the respective teeth of the core segment blocks are turned or rotated tooth by tooth around the related coupling means to form a ring or rectangular shape, thus completing an iron core assembly.

In a medium-sized electric motor such as one according to the thirteenth embodiment, however, the first core member, if formed of a monolithic core segment, would result in a substantial increase in the number of component parts and hence resultant complicated structure, thus making it difficult or inefficient to manufacture. In view of this, according to the thirteenth embodiment, a plurality of core segments are stacked and united to form a core segment block so that the total number of component parts as required can be reduced, thereby improving productivity. Moreover, each core segment block is small and compact in size and weight, and simple in configuration and structure, and a first core segment block when reversed or turned inside out can be used as a second core segment block, as a result of which a single common pressing mold can be used for the first and second core segment blocks, and thus the pressing mold can be minimized in size, simplified in structure and reduced in-the manufacturing cost. In addition, if a plurality of core segments are stacked or laminated to provide three-teeth blocks 87, the respective teeth can readily be turned tooth by tooth around related coupling means with reduced friction, in comparison with the case in which monolithic core members are stacked in an alternate manner, as illustrated in FIG. 17.

It should be understood that in the present invention, the term "enclosed or ring-like" is not limited to "circular", but instead includes "rectangular", "triangular", "polygonal" and the like. Thus, the term "enclosed or ring-like" used in the appended claims should be construed broadly as including the above-mentioned meanings.

What is claimed is:

1. An iron core assembly comprising:
   a plurality of layers of plate-shaped core segments having end portions, said core segments disposed in planar succession in a planar direction in each of the plurality of layers; and
   couplers coupling the end portions of the core segments of a first layer of the plurality of layers to the end portions of the core segments of a second layer of the plurality of layers;
   wherein said core segments of the first layer are laminated to the core segments of the second layer in such a manner that the end portions of the core segments of the first layer are offset from the end portions of adjacent core segments of the second layer which adjoin each other in a laminating direction that is perpendicular to the planar direction, and
   wherein said core segments are rotatable relative to each other through said couplers so as to form an enclosed configuration, and
   wherein the couplers each include a protruding element at one end of the core segments and a recessed element at another end of the core segments, wherein one of the protruding elements rotatably engages with one of the recessed elements of an adjacent one of the core segments.

2. The iron core assembly according to claim 1, wherein said couplers couple together the end portions of those core segments which adjoin each other in said laminating direction.

3. The iron core assembly according to claim 2, where a center of rotation of said couplers which rotates each core segment is disposed at a location which is substantially on a bisector for an angle formed by widthwise centerlines of mutually adjacent two core segments of the same layer and which is outwardly away from an intersection of said widthwise centerlines.

4. The iron core assembly according to claim 1, wherein said couplers couple adjacent end portions of successively disposed adjacent core segments of a same layer with each other.

5. The iron core assembly according to claim 4, wherein said couplers comprise opposing end faces of mutually adjacent end portions of successively disposed core segments of said first or second layers, said opposing end faces being formed into an articulated configuration.

6. The iron core assembly according to claim 1, wherein said first layer and said second layer are laminated to form a laminated core unit which has opposite ends formed into complementary stepped configurations in which edge portions of mutually opposed core segments at the opposite ends of said laminated are superposed each other in a stepwise fashion in said laminating direction.

7. The iron core assembly according to claim 1, wherein said first layer and said second layer are laminated to form a laminated core unit which is formed at opposite ends thereof with a concave portion and a convex portion which are formed on core segments mutually adjoining each other in said laminating direction and which are detachably engageable with each other.

8. The iron core assembly according to claim 1, further comprising rotation restrictors provided on opposing end faces of adjacent end portions of successively disposed core segments of said first or second layer for restricting rotation of said couplers when said laminated first and second layers are formed into the enclosed or ring-like configuration.

9. The iron core assembly according to claim 1, further comprising reverse-rotation restrictors provided on opposing end faces of adjacent end portions of successively disposed core segments of said first or second layer for restricting reverse rotation of said couplers.

10. An iron core assembly comprising:
    a plurality of layers of plate-shaped core segments having end portions, said core segments disposed in planar succession in a planar direction in each of the plurality of layers; and
    couplers coupling the end portions of the core segments of a first layer of the plurality of layers to the end portions of the core segments of a second layer of the plurality of layers;
    wherein said core segments of the first layer are laminated to the core segments of the second layer in such a manner that the end portions of the core segments of the first layer are offset from the end portions of adjacent core segments of the second layer which adjoin each other in a laminating direction that is perpendicular to the planar direction, and
    wherein said core segments are rotatable relative to each other through said couplers so as to form an enclosed configuration,
    wherein said couplers couple together the end portions of those core segments which adjoin each other in said laminating direction;
    wherein said couplers comprise:
      first concave and convex portions respectively formed on a top surface and a bottom surface of each of said core segments of said first layer at one end portion thereof; and
      second concave and convex portions respectively formed on a top surface and a bottom surface of each of said core segments of said second layer at another end portion thereof;
      wherein one of said first concave and convex portions are engageable with one of said second concave and convex portions thereby to couple said end portions of those core segments which adjoin each other in said laminating direction.

11. An iron core assembly comprising:
a plurality of layers of plate-shaped core segments having end portions, said core segments disposed in planar succession in a planar direction in each of the plurality of layers; and
couplers coupling the end portions of the core segments of a first layer of the plurality of layers to the end portions of the core segments of a second layer of the plurality of layers;
wherein said core segments of the first layer are laminated to the core segments of the second layer in such a manner that the end portions of the core segments of the first layer are offset from the end portions of adjacent core segments of the second layer which adjoin each other in a laminating direction that is perpendicular to the planar direction, and
wherein said core segments are rotatable relative to each other through said couplers so as to form an enclosed configuration,
wherein said couplers couple together the end portions of those core segments which adjoin each other in said laminating direction;
wherein each core segment of said first layer has one end face at least partially formed into a convex arc-shaped configuration and another end face at least partially formed into a concave arc-shaped configuration, with the convex arc-shaped one end face of each core segment being disposed in abutment with the other concave arc-shaped end face of a core segment adjoining in a direction in which said core segments are disposed in succession; each core segment of said second layer has one end face at least partially formed into a concave-arc-shaped configuration and another end face at least partially formed into a convex arc-shaped configuration, with the concave arc-shaped one end face of each core segment being disposed in abutment with the other convex arc-shaped end face of a core segment adjoining in a direction in which said core segments are disposed in succession; and a center of rotation of said couplers which couple the end portions of mutually adjacent core segments of the same layer with each other is disposed at a location which is substantially on a bisector for an angle formed by widthwise centerlines of mutually adjacent two core segments of the same layer and which is outwardly away from an intersection of said widthwise centerlines.

12. An iron core assembly comprising:
a plurality of layers of core segment blocks having end portions, said core segment blocks disposed in planar succession in a planar direction in each of the plurality of layers, said core segment blocks each having a plurality of plate-shaped core segments laminated one over another;
couplers for coupling the end portions of the core segment blocks of a first layer of the plurality of layers to the end portions of the core segment blocks of a second layer of the plurality of layers;
wherein said core segment blocks of the first layer are laminated to the core segment blocks of the second layer in such a manner that the end portions of the core segment blocks of the first layer are offset from the end portions of adjacent core segment blocks of the second layer which adjoin each other in a laminating direction that is perpendicular to the planar direction, and
wherein said core segment blocks are rotatable relative to each other through said couplers so as to form an enclosed configuration, and
wherein the couplers each include a protruding element at one end of the core segment blocks and a recessed element at another end of the core segment blocks, wherein one of the protruding elements rotatably engages with one of the recessed elements of an adjacent one of the core segment blocks.

13. The iron core assembly according to claim 12, wherein said couplers couple together end portions of those core segment blocks which adjoin each other in said laminating direction.

14. The iron core assembly according to claim 13, wherein end portions of successively disposed core segment blocks of said first or second layer have opposing end faces one of which is formed into a convex arc-shaped configuration, and another of which is formed into a concave arc-shaped configuration, a convex arc-shaped end face of one of said mutually adjacent core segment blocks being disposed in abutment with a concave arc-shaped end face of the other of said mutually adjacent core segment blocks which is adjacent said one core segment block of the same layer.

15. An iron core assembly comprising:
a first laminated core unit; and
a second laminated core unit;
said first laminated core unit comprising;
a first layer having a plurality of plate-shaped core segments disposed in planar succession in a planar direction;
a second layer having a plurality of plate-shaped core segments disposed in planar succession; and
first couplers for coupling end portions of adjacent core segments of said first and second layers;
wherein said first and second layers are alternately laminated one over another in such a manner that first inter-segment positions each defined between adjacent core segments of said first layer are offset from second inter-segment positions each defined between adjacent core segments of said second layer in a planar direction of said first and second layers, with those end portions of said respective core segments which adjoin each other in a laminating direction that is perpendicular to the planar direction in which said first and second layers are laminated being overlapped with each other; and
said second laminated core unit comprising;
a third layer having a plurality of plate-shaped core segments disposed in planar succession;
a fourth layer having a plurality of plate-shaped core segments disposed in planar succession; and
second couplers for coupling end portions of adjacent core segments of said third and fourth layers;
wherein said third and fourth layers are alternately laminated one over another in such a manner that third inter-segment positions each defined between adjacent core segments of said third layer are offset from fourth inter-segment positions each defined between adjacent core segments of said fourth layer in the planar direction of said third and fourth layers, with those end portions of said respective third and fourth layers which adjoin each other in a laminating direction that is perpendicular to the planar direction in which said first and second layers are laminated being overlapped with each other; and wherein said core segments of said first and second core units are rotated relative to each other through said first and second couplers so as to form an enclosed configuration, and wherein the couplers each include a protruding element at one end of the core segments and a recessed element at another end of the core segments, wherein one of the protruding elements rotatably engages with one of the recessed elements of an adjacent one of the core segments.

16. An iron core assembly comprising;

a first laminated core unit which comprises:
- a first layer having a plurality of plate-shaped core segments disposed in planar succession in a planar direction;
- a second layer having a plurality of plate-shaped core segments disposed in planar succession; and
- couplers for coupling end portions of adjacent core segments of said first and second layers;
- wherein said first and second layers are alternatively laminated one over another in such a manner that first inter-segment positions each defined between adjacent core segments of said first layers are offset from second inter-segment positions each defined between adjacent core segments of said second layer in the planar direction of said first and second layers, with those end portions of said respective core segments which adjoin each other in a laminating direction that is perpendicular to the planar direction in which said first and second layers are laminated being overlapped with each other; and a second laminated core unit having a plurality of plate-shaped core segments laminated one over another;

wherein said core segments of said first laminated core unit are rotated relative to each other through said couplers thereby to combine said first and second core units so as to form an enclosed configuration, and wherein the couplers each include a protruding element at one end of the core segments and a recessed element at another end of the core segments, wherein one of the protruding elements rotatably engages with one of the recessed elements of an adjacent one of the core segments.

17. An iron core assembly comprising:

a plurality of layers of independent plate-shaped core segments having end portions, said core segments disposed in planar succession in a planar direction in each of the plurality of layers; and couplers coupling the end portions of the core segments of a first layer of the plurality of layers to adjacent ones of the end portions of the core segments of the first layer;

wherein said core segments of the first layer are laminated to the core segments of a second layer of the plurality of layers in such a manner that the end portions of the core segments of the first layer are offset in a planar direction from the end portions of adjacent core segments of the second layer which adjoin each other in a laminating direction that is perpendicular to the planar direction, and wherein said core segments of said first and second layers are rotatable relative to each other through said couplers so as to form an enclosed configuration, and wherein the couplers each include a protruding element at one end of the core segments and a recessed element at another end of the core segments, wherein one of the protruding elements rotatably engages with one of the recessed elements of an adjacent one of the core segments.

18. The iron core assembly according to claim 17, further comprising second couplers coupling the end portions of the core segments of the first layer to adjacent ones of the end portions of the core segments of the second layer.

19. The iron core assembly according to claim 17, wherein said couplers comprise opposing end faces of mutually adjacent end portions of successively disposed core segments of said first or second layers, said opposing end faces being formed into an articulated configuration.

20. The iron core assembly according to claim 17, further comprising rotation restrictors provided on opposing end faces of adjacent end portions of successively disposed core segments of said first or second layers for restricting rotation of said couplers when said laminated first and second layers are formed into the enclosed or ring-like configuration.

21. The iron core assembly according to claim 17, further comprising reverse rotation restrictors provided on opposing end faces of adjacent end portions of successively disposed core segments of said first or second layers for restricting reverse rotation of said couplers.

22. An iron core stator assembly in a motor, comprising:

a plurality of layers of plate-shaped core segments having end portions, said core segments disposed in planar succession in a planar direction in each of the plurality of layers; and couplers coupling the end portions of the core segments of a first layer of the plurality of layers to the end portions of the core segments of a second layer of the plurality of layers;

wherein said core segments of the first layer are laminated to the core segments of the second layer in such a manner that the end portions of the core segments of the first layer are offset from the end portions of adjacent core segments of the second layer which adjoin each other in a laminating direction that is perpendicular to the planar direction, and wherein said core segments are rotatable relative to each other through said couplers so as to form an enclosed configuration.

* * * * *